(12) United States Patent
Capps

(10) Patent No.: US 12,741,169 B2
(45) Date of Patent: Sep. 22, 2026

(54) FIRE SERVICE AND EQUIPMENT INSPECTION TEST AND MAINTENANCE SYSTEM AND METHOD

(71) Applicant: David Sean Capps, San Diego, CA (US)

(72) Inventor: David Sean Capps, San Diego, CA (US)

( * ) Notice: Subject to any disclaimer, the term of this patent is extended or adjusted under 35 U.S.C. 154(b) by 240 days.

(21) Appl. No.: 18/585,001

(22) Filed: Feb. 22, 2024

(65) Prior Publication Data

US 2024/0278054 A1 Aug. 22, 2024

Related U.S. Application Data

(63) Continuation-in-part of application No. 17/672,649, filed on Feb. 15, 2022, now Pat. No. 12,450,676.

(51) Int. Cl.
*A62C 37/50* (2006.01)
*G06Q 10/047* (2023.01)
(Continued)

(52) U.S. Cl.
CPC .......... *A62C 37/50* (2013.01); *G06Q 10/047* (2013.01); *G06Q 10/20* (2013.01); *G06Q 50/265* (2013.01);
(Continued)

(58) Field of Classification Search
None
See application file for complete search history.

(56) References Cited

U.S. PATENT DOCUMENTS 6,675,091 B2 * 1/2004 Navab .................. G01C 21/206 701/515
7,483,917 B2 * 1/2009 Sullivan .................. G06F 16/29 707/999.102

(Continued)

FOREIGN PATENT DOCUMENTS

WO WO-2009105603 A1 * 8/2009 ............ G08B 25/14

OTHER PUBLICATIONS

K. Singh, S. K. Bedi and p. Gaur, "Identification of the most efficient algorithm to find Hamiltonian Path in practical conditions," 2020 10th International Conference on Cloud Computing, Data Science & Engineering (Confluence), Noida, India, 2020, pp. 38-44, doi: 10.1109/Confluence47617.2020.9058283. (Year: 2020).*

(Continued)

*Primary Examiner* — Lashonda Jacobs-Burton
(74) *Attorney, Agent, or Firm* — José W. Jimenez; Robert L. Cantrell; JIMENEZ LAW FIRM

(57) ABSTRACT

A decision-support system and method for documenting, monitoring, testing, inspecting, and maintaining fire safety equipment that has at least one computer processor and memory system accessible by way of a computer network, the at least one computer programmed designed to receive data, information, and analysis about the status of at least one set of fire safety equipment. The at least one computer processor and memory system is designed to create from the at least one set of fire safety equipment at least one related set of fire safety equipment for maintenance actions along at least one substantially Hamiltonian path to each equipment element of the at least one related set of fire safety equipment wherein the at least one substantially Hamiltonian path is recommended to at least one user from a set of at least one user along with a maintenance toolset to perform maintenance actions.

20 Claims, 51 Drawing Sheets

(51) Int. Cl.

| | |
|---|---|
| ***G06Q 10/20*** | (2023.01) |
| ***G06Q 50/26*** | (2012.01) |
| ***H04L 67/02*** | (2022.01) |
| *G05B 15/02* | (2006.01) |
| *G08B 7/06* | (2006.01) |
| *G08B 21/02* | (2006.01) |

(52) U.S. Cl.
CPC .............. *H04L 67/02* (2013.01); *G05B 15/02* (2013.01); *G08B 7/062* (2013.01); *G08B 21/02* (2013.01); *Y04S 40/18* (2018.05)

(56) References Cited

U.S. PATENT DOCUMENTS

| | | | | |
|---|---|---|---|---|
| 7,649,450 | B2 * | 1/2010 | Campion, Jr. | G08B 29/145 340/506 |
| 7,832,638 | B2 * | 11/2010 | Wetzel | G07C 1/20 235/385 |
| 7,924,149 | B2 * | 4/2011 | Mendelson | G06Q 90/20 340/572.1 |
| 8,059,151 | B2 * | 11/2011 | Ersue | G01N 21/9515 348/86 |
| 8,210,047 | B2 * | 7/2012 | Mcsheffrey, Jr. | A62C 37/50 73/753 |
| 8,271,321 | B1 * | 9/2012 | Kestenbaum | G06Q 10/10 705/14.1 |
| 8,311,510 | B2 * | 11/2012 | Cradick | H04W 76/50 340/531 |
| 8,538,687 | B2 * | 9/2013 | Plocher | G01C 21/20 701/434 |
| 8,706,718 | B2 * | 4/2014 | Gerstner | G06F 16/29 707/723 |
| 8,810,387 | B2 * | 8/2014 | Hall | G08B 29/12 340/508 |
| 8,842,016 | B1 * | 9/2014 | Cazanas | G06Q 10/20 42/70.07 |
| 9,041,534 | B2 * | 5/2015 | McSheffrey | A62C 13/76 340/286.07 |
| 9,467,662 | B2 * | 10/2016 | Childers | H04N 7/181 |
| 9,552,720 | B2 * | 1/2017 | Moffa | G08B 25/14 |
| 9,672,486 | B1 * | 6/2017 | Turpin | G01N 21/8851 |
| 9,767,679 | B2 * | 9/2017 | Piccolo, III | G08B 29/145 |
| 10,048,077 | B2 * | 8/2018 | Direkwut | G01C 21/3852 |
| 10,097,982 | B2 * | 10/2018 | Kwan | H04W 76/14 |
| 10,216,164 | B2 * | 2/2019 | Brown | G08B 29/145 |
| 10,740,696 | B2 * | 8/2020 | Smith | G06Q 10/103 |
| 11,126,966 | B2 * | 9/2021 | Moren | G06Q 30/018 |
| 2003/0065522 | A1 * | 4/2003 | Wepfer | G06Q 10/0875 705/29 |
| 2003/0116329 | A1 * | 6/2003 | McSheffrey | A62C 13/76 169/30 |
| 2004/0065451 | A1 * | 4/2004 | McSheffrey | G08B 25/12 169/30 |
| 2004/0070506 | A1 * | 4/2004 | Runyon | E05G 1/10 340/572.8 |
| 2004/0210348 | A1 * | 10/2004 | Imhof | H04L 67/12 700/275 |
| 2005/0006109 | A1 * | 1/2005 | McSheffrey | A62C 13/76 340/531 |
| 2005/0108038 | A1 * | 5/2005 | Cober | G06Q 90/205 705/324 |
| 2006/0108241 | A1 * | 5/2006 | Smith | A62B 99/00 206/214 |
| 2007/0028673 | A1 * | 2/2007 | McSheffrey | G01F 23/62 73/40 |
| 2007/0208438 | A1 * | 9/2007 | El-Mankabady | G05B 15/02 700/83 |
| 2007/0219645 | A1 * | 9/2007 | Thomas | G05B 15/02 700/29 |
| 2008/0021718 | A1 * | 1/2008 | Kaartinen | G06Q 50/265 705/325 |
| 2008/0021905 | A1 * | 1/2008 | Kaartinen | G06Q 10/06 |
| 2008/0071392 | A1 * | 3/2008 | Brown | G05B 15/02 700/23 |
| 2008/0084291 | A1 * | 4/2008 | Campion | G08B 29/145 340/514 |
| 2008/0314681 | A1 * | 12/2008 | Patel | A62B 3/00 182/18 |
| 2009/0319180 | A1 * | 12/2009 | Robinson | G06Q 10/10 701/532 |
| 2010/0153168 | A1 * | 6/2010 | York | G06Q 10/0637 705/28 |
| 2010/0163168 | A1 * | 7/2010 | Saita | H05K 1/185 156/247 |
| 2010/0174974 | A1 * | 7/2010 | Brisebois | G06Q 10/00 715/780 |
| 2010/0185549 | A1 * | 7/2010 | York | G06Q 10/0637 705/317 |
| 2011/0173127 | A1 * | 7/2011 | Ho | G06Q 10/00 705/317 |
| 2011/0175750 | A1 * | 7/2011 | Anderson | H02J 3/00 340/870.16 |
| 2012/0065944 | A1 * | 3/2012 | Nielsen | G06Q 50/06 703/1 |
| 2012/0154141 | A1 * | 6/2012 | Piccolo, III | G08B 25/14 340/539.11 |
| 2012/0188076 | A1 * | 7/2012 | McSheffrey | F17C 13/02 340/539.17 |
| 2012/0260313 | A1 * | 10/2012 | Gomez | H04L 63/08 707/E17.032 |
| 2012/0320058 | A1 * | 12/2012 | Stephen | G06T 15/20 345/428 |
| 2013/0176124 | A1 * | 7/2013 | Brinton | G06Q 10/20 340/539.13 |
| 2013/0262497 | A1 * | 10/2013 | Case | G06F 40/174 715/224 |
| 2013/0342325 | A1 * | 12/2013 | Wang | G06K 19/06 340/10.1 |
| 2014/0032433 | A1 * | 1/2014 | Eick | G06Q 10/10 705/314 |
| 2014/0130140 | A1 * | 5/2014 | Abhyanker | G06Q 10/10 726/4 |
| 2014/0243036 | A1 * | 8/2014 | Kouwe | H04M 11/04 455/521 |
| 2014/0252086 | A1 * | 9/2014 | Talley | G06Q 10/06398 235/376 |
| 2014/0258825 | A1 * | 9/2014 | Ghosh | G06V 30/40 715/222 |
| 2014/0331176 | A1 * | 11/2014 | Cheng | G09B 29/106 715/808 |
| 2015/0002290 | A1 * | 1/2015 | Wang | G08B 29/043 340/506 |
| 2015/0335927 | A1 * | 11/2015 | McManama | A62C 37/50 340/691.8 |
| 2017/0004427 | A1 * | 1/2017 | Bruchal | G06Q 10/06311 |
| 2017/0104823 | A1 * | 4/2017 | Capps | H04L 67/52 |
| 2019/0005465 | A1 * | 1/2019 | Taylor | G06F 3/0482 |
| 2021/0287318 | A1 * | 9/2021 | Sterpin | H04W 4/33 |
| 2022/0292240 | A1 * | 9/2022 | Murphy | G06F 30/13 |
| 2022/0327264 | A1 * | 10/2022 | Murphy | G06F 30/13 |
| 2023/0179978 | A1 * | 6/2023 | Mucho | H04W 4/80 455/41.1 |
| 2023/0241440 | A1 * | 8/2023 | Biglen | G06V 10/764 348/159 |

OTHER PUBLICATIONS

Jui-Sheng Chou et at, “Optimal path planning in real time for dynamic building fire rescue operations using wireless sensors and visual guidance”, 2019 Automation in Construction, http://www.elsevier.com/lcate/autocon, Taipei, Taiwan, pp. 1-17. (Year: 2019).*

* cited by examiner

FIG. 3

FIG. 6
61
Cancel
New Employee
Save
ORGANIZATION
no organization selected
Bruce George
organization selection list
title
CONTACT
office
extension
fax
website

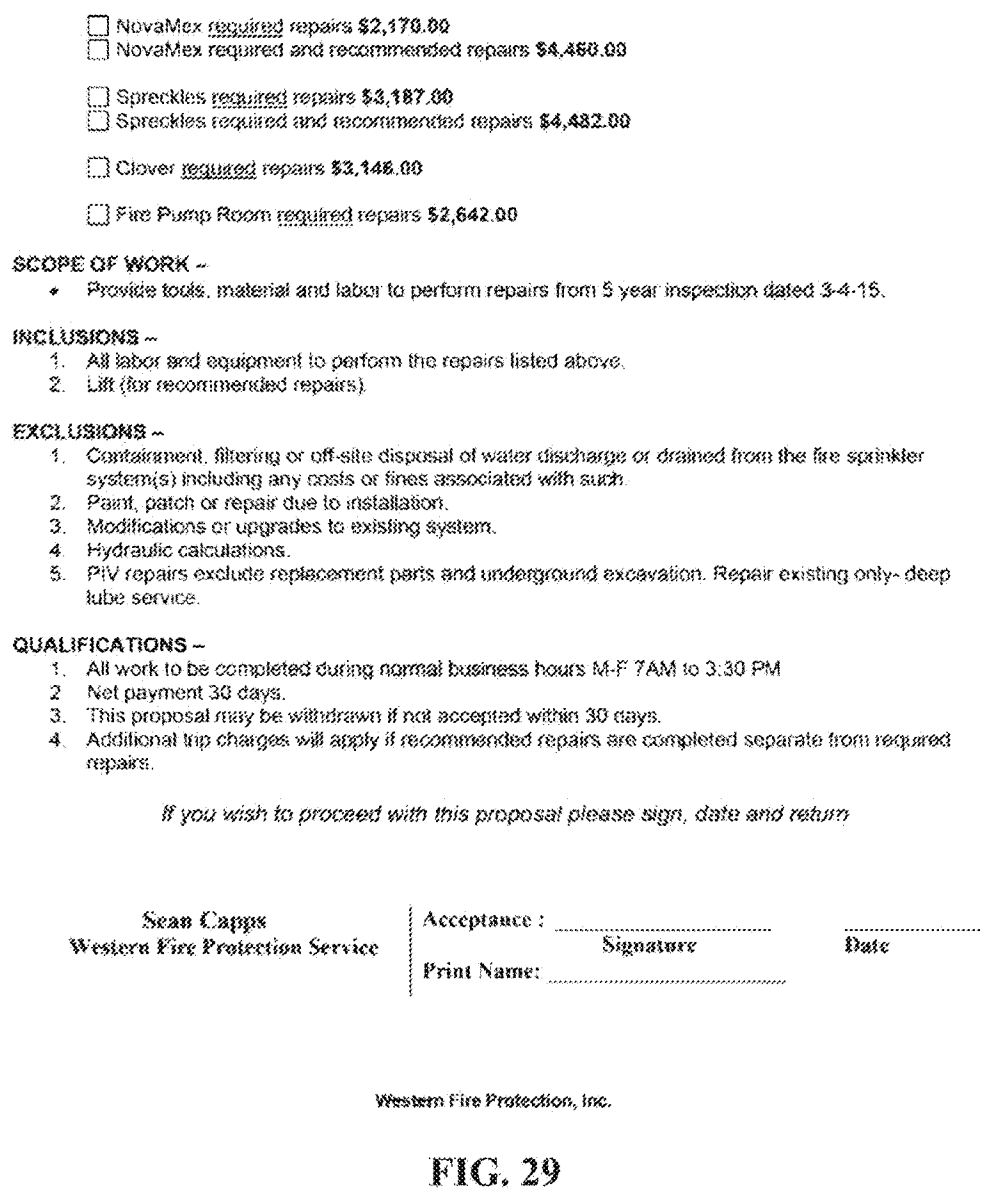

☐ NovaMex required repairs $2,170.00
☐ NovaMex required and recommended repairs $4,460.00

☐ Spreckles required repairs $3,187.00
☐ Spreckles required and recommended repairs $4,482.00

☐ Clover required repairs $3,148.00

☐ Fire Pump Room required repairs $2,642.00

SCOPE OF WORK ~

- Provide tools, material and labor to perform repairs from 5 year inspection dated 3-4-15.

INCLUSIONS ~

1. All labor and equipment to perform the repairs listed above.
2. Lift (for recommended repairs).

EXCLUSIONS ~

1. Containment, filtering or off-site disposal of water discharge or drained from the fire sprinkler system(s) including any costs or fines associated with such.
2. Paint, patch or repair due to installation.
3. Modifications or upgrades to existing system.
4. Hydraulic calculations.
5. PIV repairs exclude replacement parts and underground excavation. Repair existing only- deep lube service.

QUALIFICATIONS ~

1. All work to be completed during normal business hours M-F 7AM to 3:30 PM
2. Net payment 30 days.
3. This proposal may be withdrawn if not accepted within 30 days.
4. Additional trip charges will apply if recommended repairs are completed separate from required repairs.

*If you wish to proceed with this proposal please sign, date and return*

Sean Capps
Western Fire Protection Service

Acceptance : ........................................ ........................
Signature Date
Print Name: ........................................

Western Fire Protection, Inc.

FIG. 29

JOB NAME: PWIP
INSPECTION DATE: 3/4/15

JOB NUMBER: ITC-01007
INSPECTOR: Jack C. and Sean A.

| | Location | Description |
|---|---|---|
| *Required repairs* | | $2,170.00 |
| 1 | NovaMex - Warehouse | (4) - 1 1/2" Rack Hose are 2007 (1) 1 1/2" Rack Hose are 2004 |
| 2 | NovaMex | System 2 Bell Doesn't ring |
| *Recommended repairs* | | ***Not required for certification*** |
| 3 | NovaMex - Warehouse Break Room & Storage Room | Add sprinkler head $995.00 |
| 4 | NovaMex - Driver Check In | Add (2) sprinkler heads $1,295.00 |

| | Location | Description |
|---|---|---|
| *Required repairs* | | $3,187.00 |
| 1 | Spreckels - Warehouse | (7) 2007 1 1/2" Rack Hose |
| 2 | Spreckels | (2) Bell signs missing |
| 3 | Spreckels | System 2 PIV Frozen |
| *Recommended repairs* | | ***Not required for certification*** |
| 4 | Spreckels - Warehouse | Add (2) sprinkler heads $1,295.00 |

| | Location | Description |
|---|---|---|
| *Required repairs* | | $3,146.00 |
| 1 | Clover 325 Bldg | Office (6) 1/2" 155* QR SRC Globe |
| 2 | Clover 325 Bldg - North end warehouse 1st&2nd Floor | (15) 1/2" 155* QR SRC Globe |
| 3 | Clover 325 Bldg - Warehouse | (1) 1 1/2" Rack Hose 2007 SE Corner |
| 4 | Clover 325 | Bell did not ring |
| 5 | Clover 325 | PIV Frozen |
| 6 | Clover 315 Bldg | (3) 1 1/2" Rack Hose 2007 |
| 7 | Clover 315 Bldg - Lobby Mens Room | (1) 1/2" 155* QR SRC Viking Corroded |
| 8 | Clover 315 | PIV Frozen |

| | Location | Description |
|---|---|---|
| *Required repairs* | | $2,642.00 |
| 9 | Fire Pump Room | 8" Butterfly Valve does not close all the way supply to 315 & 325 |

Access at least one computer processor and memory system accessible by way of the computer network and receiving data, information, and analysis about the status of at least one set of fire safety equipment.

4405

Create, with the at least one computer processor and memory system, and from the at least one set of fire safety equipment, at least one related set of fire safety equipment wherein there is at least one or more of the material, temporal, spatial, risk, skillset, and responsibility element for maintaining the fire safety equipment in the at least one related set of fire safety equipment, wherein each of the at least one related set of fire safety equipment includes all and only the fire safety equipment that at least one user from the set of at least one user will maintain on one maintenance action.

4410

Determine the location of each equipment element of the at least one set of fire safety equipment and the at least one related set of fire equipment by way of at least one or more of Global Positioning Data, the sensor, and the map.

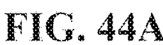

FIG. 44A

FIRE SERVICE AND EQUIPMENT INSPECTION TEST AND MAINTENANCE SYSTEM AND METHOD

CLAIM OF PRIORITY

This application claims priority to and the benefit of U.S. Publication number US20170104823A1, filed on Oct. 10, 2015 (with Ser. No. 14/880,209), now U.S. Pat. No. 11,805,170, with the title FIRE SERVICE AND EQUIPMENT INSPECTION TEST AND MAINTENANCE SYSTEM, and U.S. Publication number US20220188955A1, filed on Feb. 15, 2022 (with Ser. No. 17/672,649), now U.S. Pat. No. 12,450,676, with the title FIRE SERVICE AND EQUIPMENT INSPECTION TEST AND MAINTENANCE SYSTEM AND METHOD which are incorporated herein by reference in their entirety.

FIELD OF THE INVENTION

The present invention relates to a decision support system and method for maintaining fire safety equipment, and in particular, to locations, mapping, maintenance, and coordinated use of fire safety equipment.

BACKGROUND

As part of modern society, buildings and structures are required to have fire equipment on the premises. Fire sprinkler systems, fire alarm systems, fire extinguishers, and other fire safety equipment must be properly located and maintained. Business owners must be very careful to ensure that their equipment meets any legal obligations as well as obligations required by insurance companies. Often, business owners rely on fire service companies to conduct fire equipment inspections, advise customers of deficiencies, and conduct repairs. Fire service companies have the expertise and the resources to effectively maintain multiple customers. But as the number of customers increases, and the amount of fire equipment increases, it becomes more challenging to efficiently track and monitor everything required.

Included are requirements for the proficient use of fire and safety equipment considering that the better firefighters command space, time, equipment, and risk, the better their odds of achieving a positive firefighting outcome. Acting even a few seconds earlier than otherwise can determine whether lives and structures are saved. Therefore, there currently exists a need in the market for improved systems and methods for locating, mapping, maintaining, and coordinating the use of fire safety equipment.

Responders, however, cannot respond effectively if equipment does not work or if they cannot find that equipment, and such preparation begins with the maintenance of fire safety equipment. A considerable amount of time, however, associated with maintaining fire safety equipment is devoted to tasks other than maintaining the equipment, such as traveling to, from, and about the facility where the fire safety equipment is deployed and planning maintenance actions wherein minimizing burdens around ancillary activities could improve the speed, quality, and cost-effectiveness of inspecting fire safety equipment. Therefore, there is a need in the market for an improved system to support decision-making when maintaining fire safety equipment.

SUMMARY OF THE INVENTION

The present invention provides a system for monitoring, testing, inspecting, and maintaining fire safety equipment located at the property of secondary customers. Secondary customers include people, organizations, and properties, added that these people, organizations, and properties may fall into categories of users, places, and tools, to be further detailed. The system saves information collected on a server computer accessible via a computer network. This information is reviewable and editable by primary customers. In one embodiment, the server computer is disposed in the cloud and the computer network is substantially the Internet. In a representative embodiment, primary customers include fire inspection/repair/monitoring companies and fire departments using mobile computer devices. In another embodiment, the software application has a customer relationship management tool allowing fire safety equipment, people, properties, and organizations to be easily associated with one another. In another embodiment, each piece of fire safety equipment is geographically mapped to a specific location via GPS or other mapping reference. Additionally, fire safety equipment associated with a specific property, building, or floor has relevant information digitally captured and recorded into the cloud database. In another embodiment, a fire department accesses fire safety equipment information during an exercise or emergency to direct responders. In another embodiment, secondary customers with authorized access receive data and information regarding the status of the fire safety equipment and receive analysis and recommendations from the service entities. Primary customers receive data and information regarding the status of fire safety equipment from the cloud database, and transmit analysis, records, and recommendations to the secondary customers.

Further disclosed is a system and method for firefighting and fire prevention of structures that includes at least one computer processor and memory system operationally accessible by at least one networked computerized device. At least one database is accessible by the at least one computer processor designed to send and receive data collected on at least one or more from the group of: users, places, and tools, the data further including datapoints from which to calculate qualities of the users, places, and tools from at least one or more from a group consisting of who, what, when, where, why, how, cost, power, environment, and event-conditions from which to calculate at least one or more of past, present, projected-future states and rates of change of the users, places, and tools. Users include at least one or more from a group of: firefighters, maintenance technicians, facilities managers, and members of associated business entities. Places include at least one or more from a group of: installation facilities, supply facilities, vehicles, power generation, resource transmission, nexus of work, and points of control. Tools include at least one or more of firefighting, fire prevention, fire detection, and alerting, supersystems, systems, and subsystems, a system including at least one or more of software, hardware, vehicles, data, and fire retarding chemicals. The at least one computer processor and memory system is further operably coupled to at least one user interface wherein a user receives and can retrieve calculations of states of the users, places, and tools from which to assess situations, facilitate decision making, and take actions, the decisions and actions including at least one or more from a group of: firefighting system use, firefighting system maintenance, and firefighting system replacement. The data is at least one or more of pushed to the at least one user and pulled by the at least one user and may indicate its presence to a user by at least one or more of visually, audibly, and through vibration. The data is updated between, inclusively, periodically to substantially continuously by at least one or more from a group of: manually, automatically, and by at least one or more sensor members, the at least one or more sensor members including at least one or more from a group of: visual, audible, pressure, motion, acceleration, temporal, seal, connection, heat, particle, chemical, radio, radiation, electricity, biometric, global positioning, and computer readable code. The data is measured against at least one or more of safety codes, codes of compliance, vendor codes, performance standards, and industry standards.

In one embodiment of the system for firefighting and fire prevention of structures, the collected data is recorded at least one or more of unencrypted, encrypted, encrypted with blockchain, and encrypted with biometrics, the recorded data stored for at least a pre-defined period on the at least one computer processor and memory and operationally accessible by at least one networked computerized device.

In one embodiment of the system for firefighting and fire prevention of structures, the data is processed by machine learning to facilitate situation assessment, decision making, and taking actions, the decisions and actions taken at least one or more of manually, automatically, and autonomously.

In one embodiment of the system for firefighting and fire prevention of structures, the at least one user interface presents at least one or more of a two-dimensional schematic image, a three-dimensional schematic image, a photographic image, a three-dimensional virtual image, a holographic image, a projected image, and combinations of the images, the images designed to illustrate the places and at least one or more of the tools to at least one or more of the users.

In one embodiment of the system for firefighting and fire prevention of structures, the data is structured by at least one or more of system type, system scope, system ownership, system responsibility, system user, system service schedule, system service provider, system cluster, and related systems, the related systems which may further be cross matrixed by at least one or more of type, scope, ownership, responsibility, user, service schedule, service provider, cluster, and related systems, the related systems which may further be at least one or more of a supersystem, a subsystem, and a complementing system.

In one embodiment of the system for firefighting and fire prevention of structures, at least one or more of the systems, supersystems, and subsystems are networked, and hardware includes at least one or more operational sensors designed to communicate data through the network about at least one or more of the operational status, environmental status, and event status of the hardware, software, vehicles, data, and associated chemicals.

In one embodiment of the system for firefighting and fire prevention of structures, the at least one user interface presents at least one or more of a two-dimensional schematic image, a three-dimensional schematic image, a photographic image, a three-dimensional virtual image, a holographic image, a projected image, and combinations of the images, the images designed to illustrate the places and at least one or more of the tools to at least one or more of the users, wherein the users may retrieve data associated with at least one system by system type, system scope, system ownership, system responsibility, system user, system service schedule, system service provider, system cluster, related systems, and individual units.

In one embodiment of the system for firefighting and fire prevention of structures, the states and the changes in the states of the users, places, and tools from which to assess situations, facilitate decisions, and take actions—the decisions and actions including at least one or more from the group of: firefighting system use, firefighting system maintenance, and firefighting system replacement—are simulated.

In one embodiment of the system for firefighting and fire prevention of structures, the states and changes in the states of the users, places, and tools from which to assess situations, facilitate decision making, and take actions—the decisions and actions including at least one or more from the group of: firefighting system use, firefighting system maintenance, and firefighting system replacement—are played back.

Added is a decision-support system for documenting, monitoring, testing, inspecting, and maintaining fire safety equipment that has at least one computer processor and memory system accessible by way of a computer network, the at least one computer programmed to receive data, information, and analysis about the status of at least one set of fire safety equipment. The at least one computer processor and memory system is designed to create from the at least one set of fire safety equipment at least one related set of fire safety equipment wherein there is at least one or more of a material, temporal, spatial, risk, skillset, and responsibility element for maintaining the fire safety equipment in the at least one related set of fire safety equipment. Each of the at least one related set of fire safety equipment includes the fire safety equipment that at least one user from a set of at least one user will maintain on one maintenance action. The location of each equipment element of the at least one set of fire safety equipment and the at least one related set of fire safety equipment is determined by at least one or more of Global Positioning Data, a sensor, a coordinate, and a map. The at least one computer processor and memory system is further designed to create from each related set of fire safety equipment at least one substantially Hamiltonian path to each equipment element of the at least one related set of fire safety equipment wherein the at least one substantially Hamiltonian path is recommended to the at least one user from the set of at least one user. The at least one computer processor and memory system is designed to present to each the at least one user from the set of at least one user the at least one related set of fire safety equipment, the location of each equipment element of the at least one related set of fire safety equipment, the at least one substantially Hamiltonian path to each equipment element, the required maintenance action for each equipment element of the at least one related set of fire safety equipment, and maintenance toolsets to perform required maintenance actions.

In some embodiments of the decision-support system for documenting, monitoring, testing, inspecting, and maintaining fire safety equipment, the at least one user interface presents at least one or more of a two-dimensional schematic image, a three-dimensional schematic image, a photographic image, a three-dimensional virtual image, and combinations of the images, the images designed to illustrate the places and at least one or more of the maintenance toolsets to at least one or more of the at least one set of fire safety equipment and the at least one related set of fire safety equipment.

In some embodiments of the decision-support system for documenting, monitoring, testing, inspecting, and maintaining fire safety equipment, the location of the at least one user from the set of at least one user is monitored as the at least one user from the set of at least one user inspects the at least one related set of fire safety equipment.

In some embodiments of the decision-support system for documenting, monitoring, testing, inspecting, and maintaining fire safety equipment, the at least one set of fire safety equipment and the at least one related set of fire safety equipment is determined by at least one or more of equipment type, equipment scope, equipment ownership, equipment responsibility, equipment user, equipment service schedule, equipment service provider, equipment cluster, related equipment, and the location of each piece of equipment.

In some embodiments of the decision-support system for documenting, monitoring, testing, inspecting, and maintaining fire safety equipment, at least one or more sensor on at least one or more element of fire safety equipment permits at least one or more of self-maintenance and at least partially remote maintenance.

In some embodiments of the decision-support system for documenting, monitoring, testing, inspecting, and maintaining fire safety equipment, the data cycle for each the at least one user from the set of at least one user is designed to be collected and recorded, the recorded data stored for at least a pre-defined period on the at least one computer processor and memory and operationally accessible by at least one networked computerized device.

In some embodiments of the decision-support system for documenting, monitoring, testing, inspecting, and maintaining fire safety equipment, at least one or more of material, temporal, spatial, risk, skillset, and responsibility elements are used to create each the at least one related set of fire safety equipment from the at least one set of fire safety equipment.

In some embodiments of the decision-support system for documenting, monitoring, testing, inspecting, and maintaining fire safety equipment, at least one or more of the at least one related set of fire safety equipment is at least partly determined by at least one artificial intelligence program, the artificial intelligence program further comprising at least one or more of machine learning, natural language processing, graphing algorithms, and set algorithms from which to combine one or more at least one related set of fire safety equipment from the set of fire safety equipment, at least one user from the set of at least one user, and at least one substantially Hamiltonian path oriented toward at least one or more of the goal based on maintenance speed, cost-effectiveness, and maintenance quality.

In some embodiments of the decision-support system for documenting, monitoring, testing, inspecting, and maintaining fire safety equipment supported by the artificial intelligence program, data is designed to be collected as data vectors wherein the data vector components can be categorized by at least one or more of the material, temporal, spatial, risk, skillset, and responsibility quality.

In some embodiments of the decision-support system for documenting, monitoring, testing, inspecting, and maintaining fire safety equipment supported by the artificial intelligence program, the at least one or more of the material, temporal, spatial, risk, skillset, and responsibility quality are used by the artificial intelligence system to create the at least one related set of fire safety equipment.

In some embodiments of the decision-support system for documenting, monitoring, testing, inspecting, and maintaining fire safety equipment supported by the artificial intelligence program, at least one user interface presents at least one or more of the two-dimensional schematic image, the three-dimensional schematic image, the photographic image, the three-dimensional virtual image, and combinations of the images, the images designed to illustrate the places and at least one or more of the maintenance toolsets to at least one or more of the at least one set of fire safety equipment and the at least one related set of fire safety equipment.

In some embodiments of the decision-support system for documenting, monitoring, testing, inspecting, and maintaining fire safety equipment supported by the artificial intelligence program, the location of the at least one user from the set of at least one user is monitored as the at least one user from the set of at least one user inspects the at least one related set of fire safety equipment.

In some embodiments of the decision-support system for documenting, monitoring, testing, inspecting, and maintaining fire safety equipment supported by the artificial intelligence program, the at least one set of fire safety equipment and the at least one related set of fire safety equipment is determined by at least one or more of equipment type, equipment scope, equipment ownership, equipment responsibility, equipment user, equipment service schedule, equipment service provider, equipment cluster, related equipment, and the location of each piece of equipment.

In some embodiments of the decision-support system for documenting, monitoring, testing, inspecting, and maintaining fire safety equipment supported by the artificial intelligence program, at least one or more sensor on at least one or more element of fire safety equipment permits at least one or more of self-maintenance and at least partially remote maintenance.

In some embodiments of the decision-support system for documenting, monitoring, testing, inspecting, and maintaining fire safety equipment supported by the artificial intelligence program, data on each maintenance cycle for each the at least one user from the set of at least one user is designed to be collected and recorded, the recorded data stored for at least the period on the at least one computer processor and memory and operationally accessible by at least one networked computerized device.

Disclosed herein and as will be detailed is a corresponding method for using the decision support system for documenting, monitoring, testing, inspecting, and maintaining fire safety equipment supported inclusive of artificial intelligence.

The inventive concept now will be described more fully hereinafter with reference to the accompanying drawings, which are intended to be read in conjunction with both this summary, the detailed description, and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

BRIEF DESCRIPTION OF THE DRAWINGS

FIGS. 1-7 illustrate representative screens for viewing and editing people.

FIGS. 29-30 illustrate a representative proposal.

FIGS. 40A-40E illustrate a representative method of using the system for firefighting and fire prevention of structures.

FIGS. 44A-44C illustrate a decision support method for maintaining fire safety equipment.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

FIGS. 1-36 illustrate the inventive concept supportive of improvements illustrated in FIGS. 37-40A-40E. Improvements further the use of the inventive concept as a decision support tool for assuring readiness of supported firefighting tools and the application of those tools during an emergency.

Figure 33:
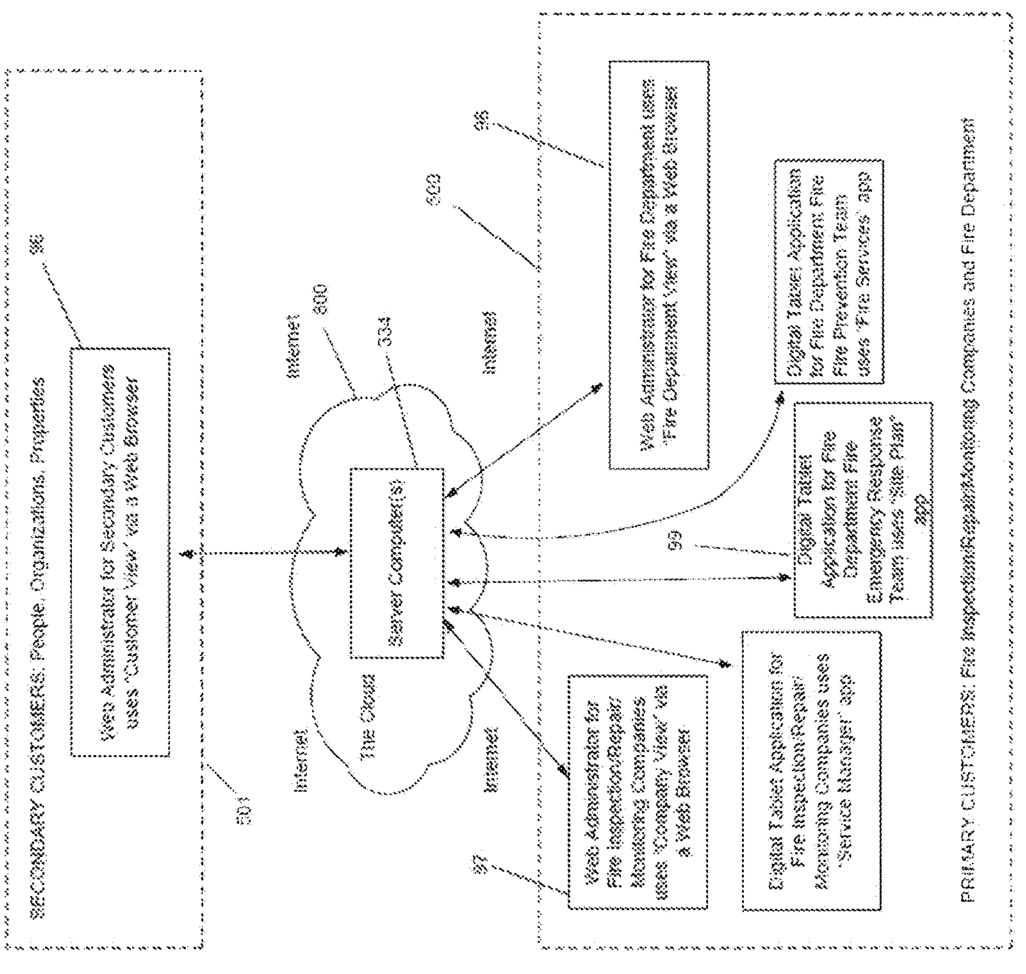
FIG. 33 illustrates representative connectivity.
Figure 34:
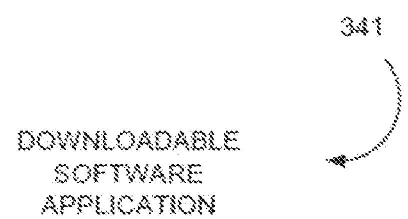
FIG. 34 illustrates a representative software application.
Figure 35A:
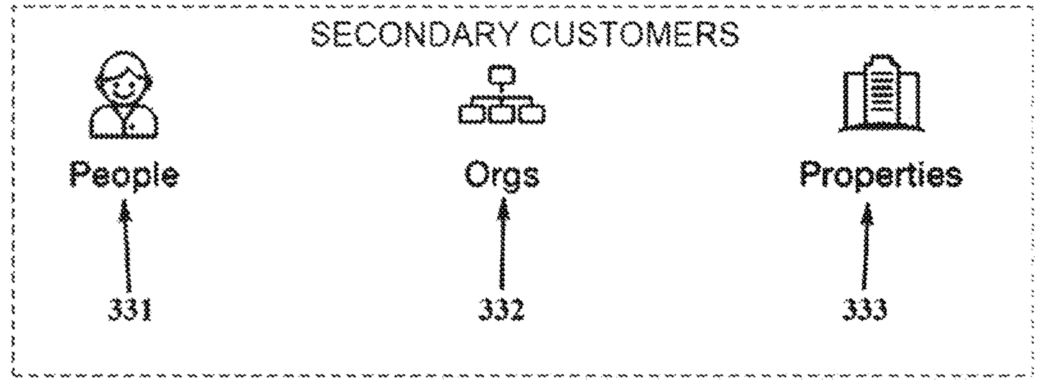
FIGS. 35A-35B illustrate representative secondary customers and primary customers.
Figure 35B:
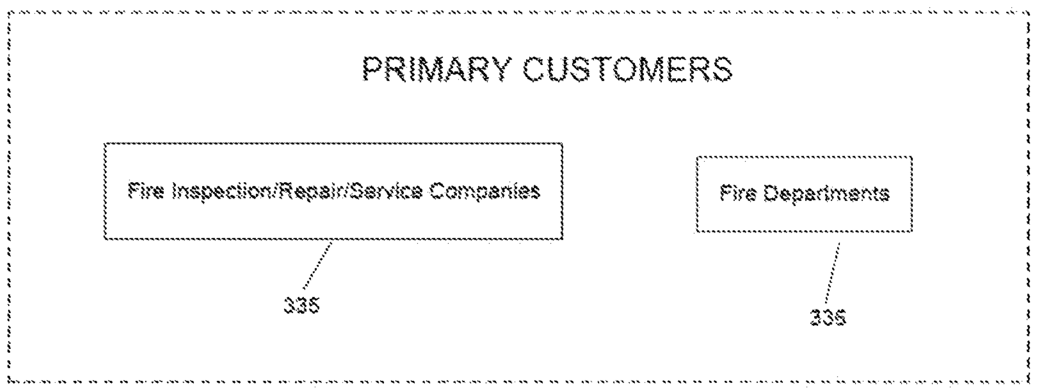
Figure 36:
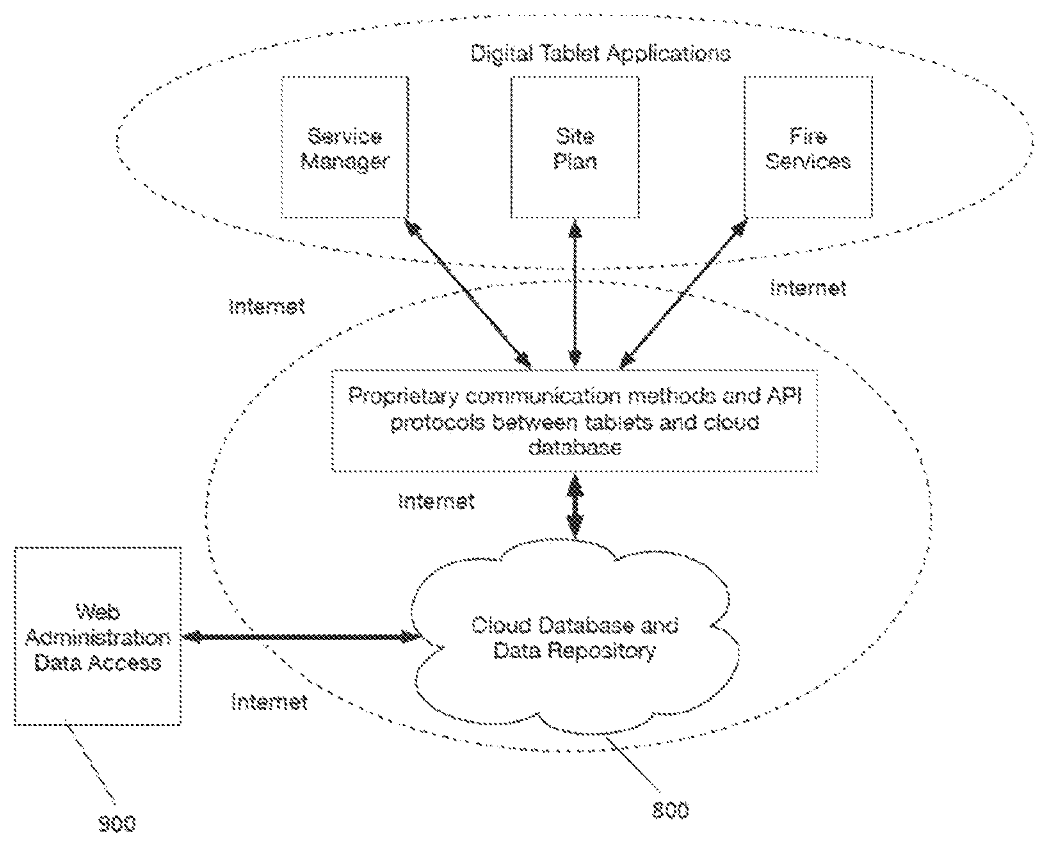
FIG. 36 illustrates representative connectivity.

FIG. 33 illustrates a block diagram illustrating representative connectivity of the present inventive concept. In a representative embodiment, information regarding secondary customers 501 is uploaded to a central cloud database 800 having server computers 334. Added is the use of a distributed architecture in some embodiments. Secondary customers 501 include people 331, organizations 332, and properties 333 (FIG. 35A). Primary customers 500 are then able to access this uploaded information. Primary customers 500 include fire inspection/repair/service companies 335 and fire departments 336 (FIG. 35B).

In one embodiment, primary customers 500 have downloaded application programming 341 (FIG. 34) via a computer network (such as the Internet). Primary customers 500 use the application to collect, store, view, and access information from central cloud database 800. Secondary customers can view via web browser information about their particular property, buildings, and safety equipment. This allows the secondary customer's computers to connect via the Internet to their relevant information regarding their specific information properties, building and allows secondary customers to view reports, budgets, and other relevant information. Connected entities may then access the uploaded information accessible on cloud server 800 and connect with each other as illustrated.

In one embodiment, software applications programming 341 is downloaded to mobile computer devices such as, but not limited to, the iPad made by Apple Computers. Other computers that are programmed utilizing app 341 include: programmable smartphones, laptop computers, desktop personal computers, and other programmable devices capable of connecting to a computer network. The app 341 allows the primary customers 500 to access listings of people, organizations and properties that have had their identifying information entered into a database on cloud server 800. A primary customer can also view maps and photographs of properties in the database. A primary customer can ascertain the location of fire safety equipment at the properties. Fire safety inspections can be planned, assigned, and conducted at the properties. Inspection reports and deficiency lists can be generated. Service and repair companies can view the reports and generate sales proposals for consideration by the customers. During the repair process, the service and repair companies can update the repair progress immediately as repairs are made. Likewise, the secondary customers can view the repairs as they occur. Upon completion of the repairs, the primary customer's accounting department can generate bills that are transmitted to the secondary customers.

Also, in one embodiment, fire department 336 can view properties, people, and organizations that have been uploaded to the database. In the event of a fire, the fire department can access maps that show the property of interest. The fire department will then immediately know available firefighting equipment and its exact location, its current operating condition, and the date it was last inspected. With this information, a fire marshal at the fire department can view the property and fire safety equipment at the property and use this information to more intelligently direct the actions of fire fighters at the scene.

More specific examples of the utilization of representative embodiments of the present inventive concept are provided below.

People: In one embodiment of the present inventive concept, information on people is gathered and associated with organizations and properties that are related to the people.

Figure 1:
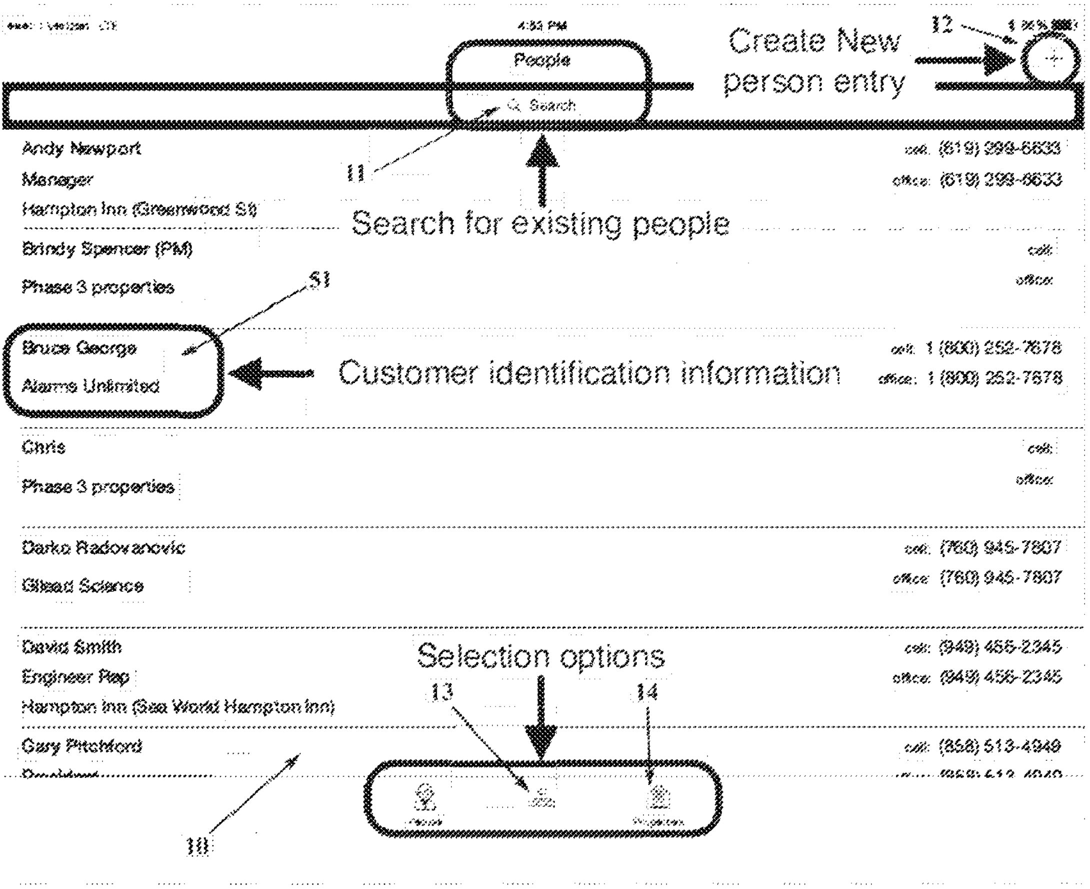
Figure 37:
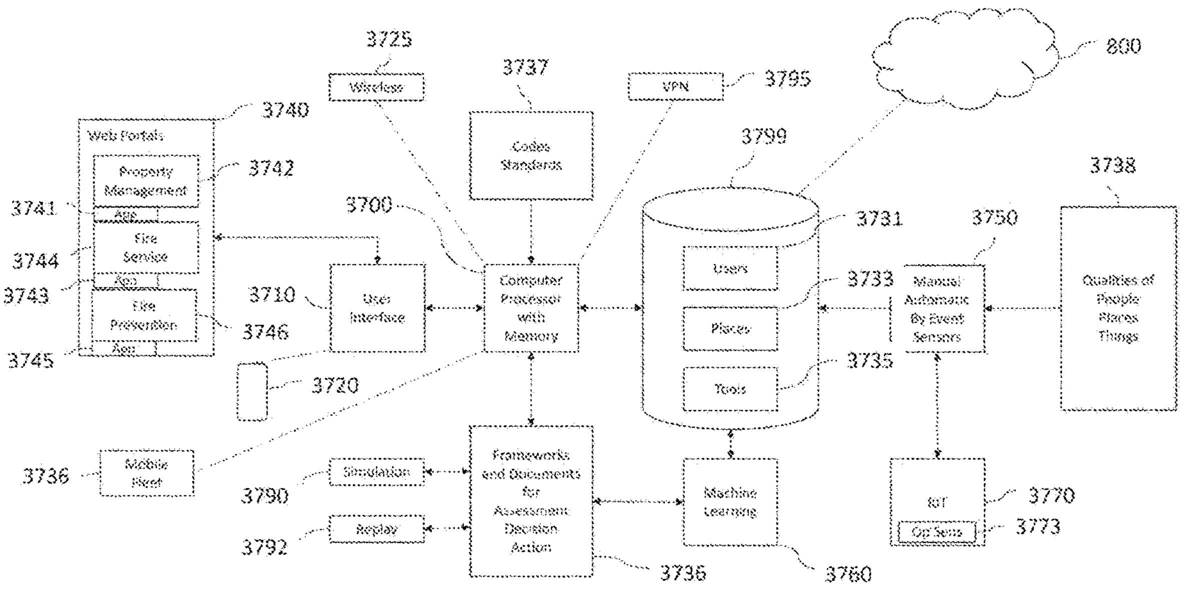
FIG. 37 illustrates the added system for firefighting and fire prevention of structures.

As illustrated in FIG. 37, the inventive concept may include the addition of an at least one user interface 3710 operatively coupled to the at least one computer processor and memory system defined as such, the at least one user interface 3710 in some embodiments including for display aforementioned elements in FIGS. 1-36, the user interface 3710 presenting screens such as 10, 50, 60, 70, 80, 90, 91, 101, 120, 153, 154, and 155. In FIG. 1 and FIG. 37, the user 3731 has app 341 installed on his programmable device. He has clicked on the People tab shown on the home page and has been brought to screen 10. People who have been entered into the database are listed alphabetically. From here, the user can search for a specific person by clicking on search button 11. The user can also add a new person to the database by clicking on button 12. In FIG. 1, the user is viewing the People screen 10. The user can view the Organizations screen by clicking on button 13 or he can view the Properties screen by clicking on button 14.

Figure 2:
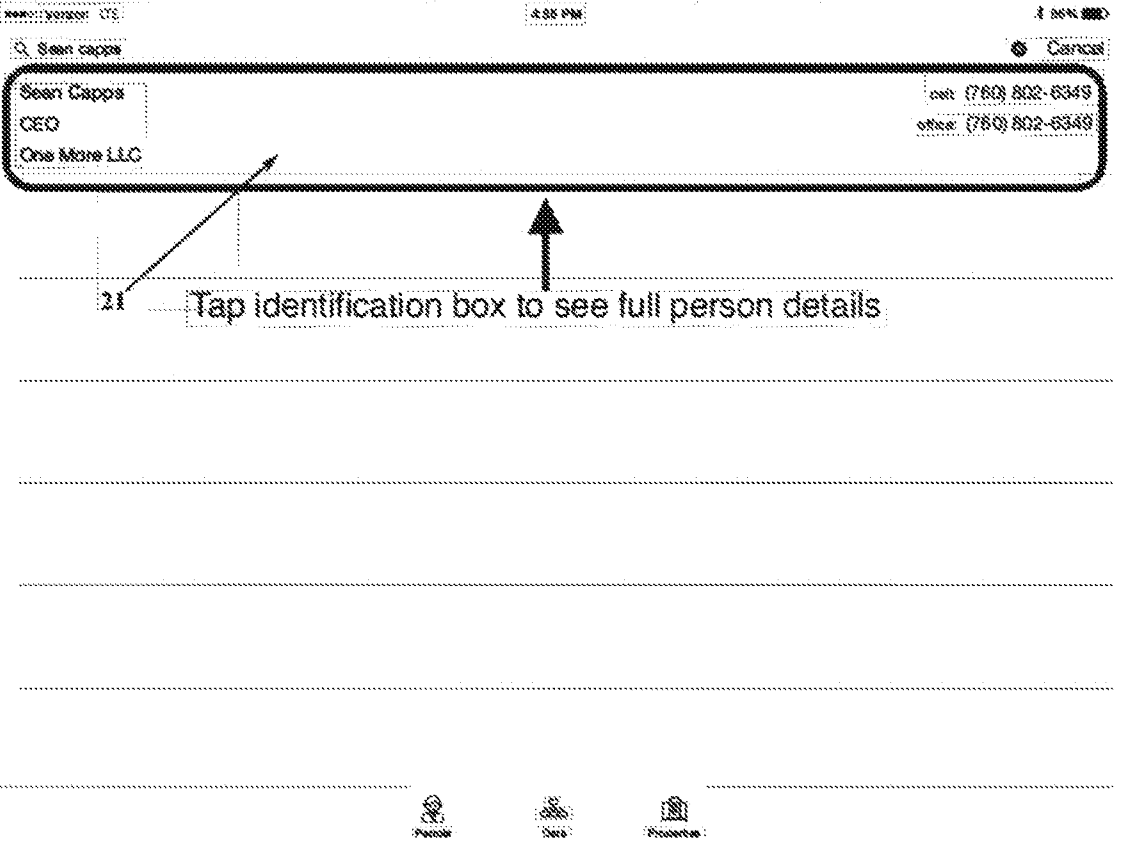
Figure 3:
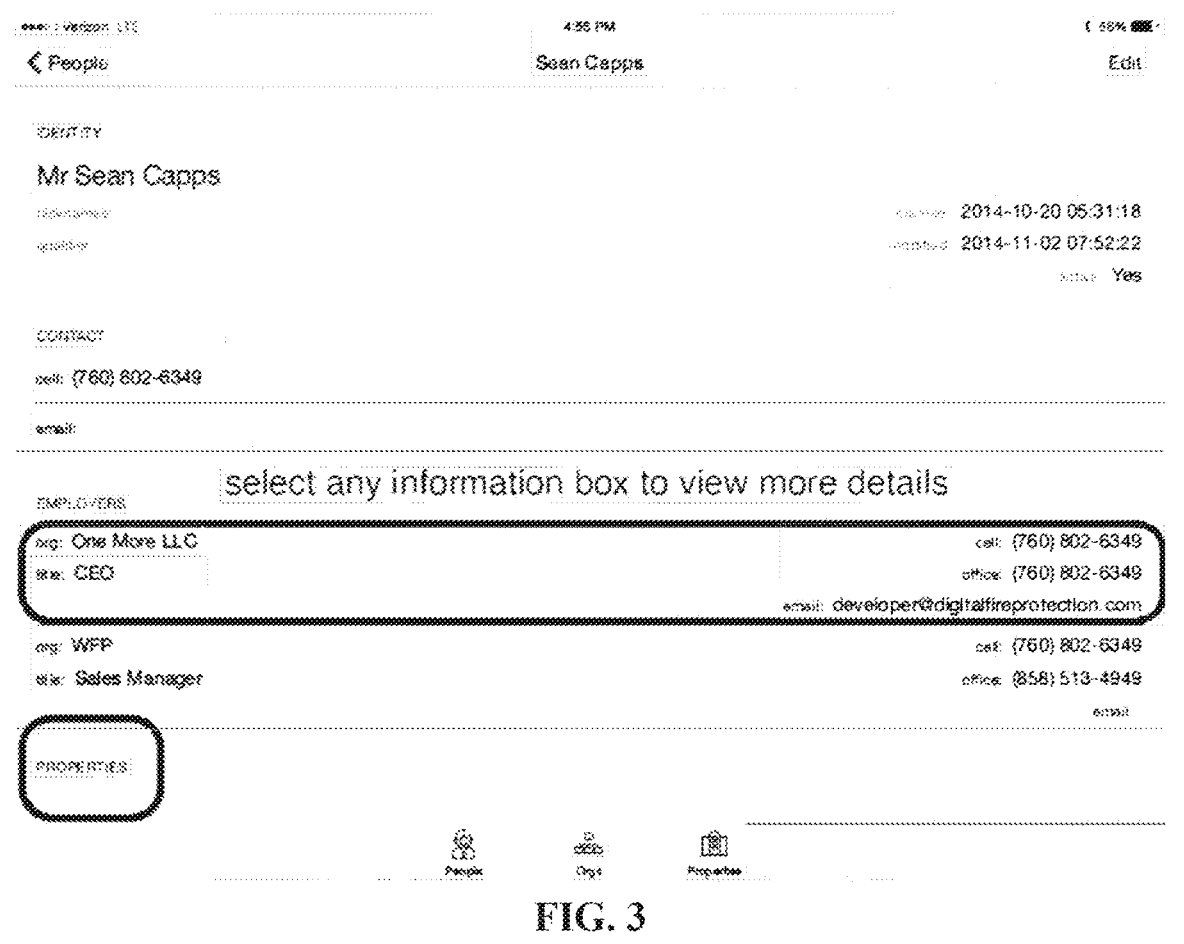

In FIG. 2 the user has scrolled down to person "Sean Capps". To access more information on Sean Capps, the user taps on identification box 21. In FIG. 3 the user has clicked on identification box 21 (FIG. 1) and more detailed information regarding Sean Capps is displayed.

Figure 4:
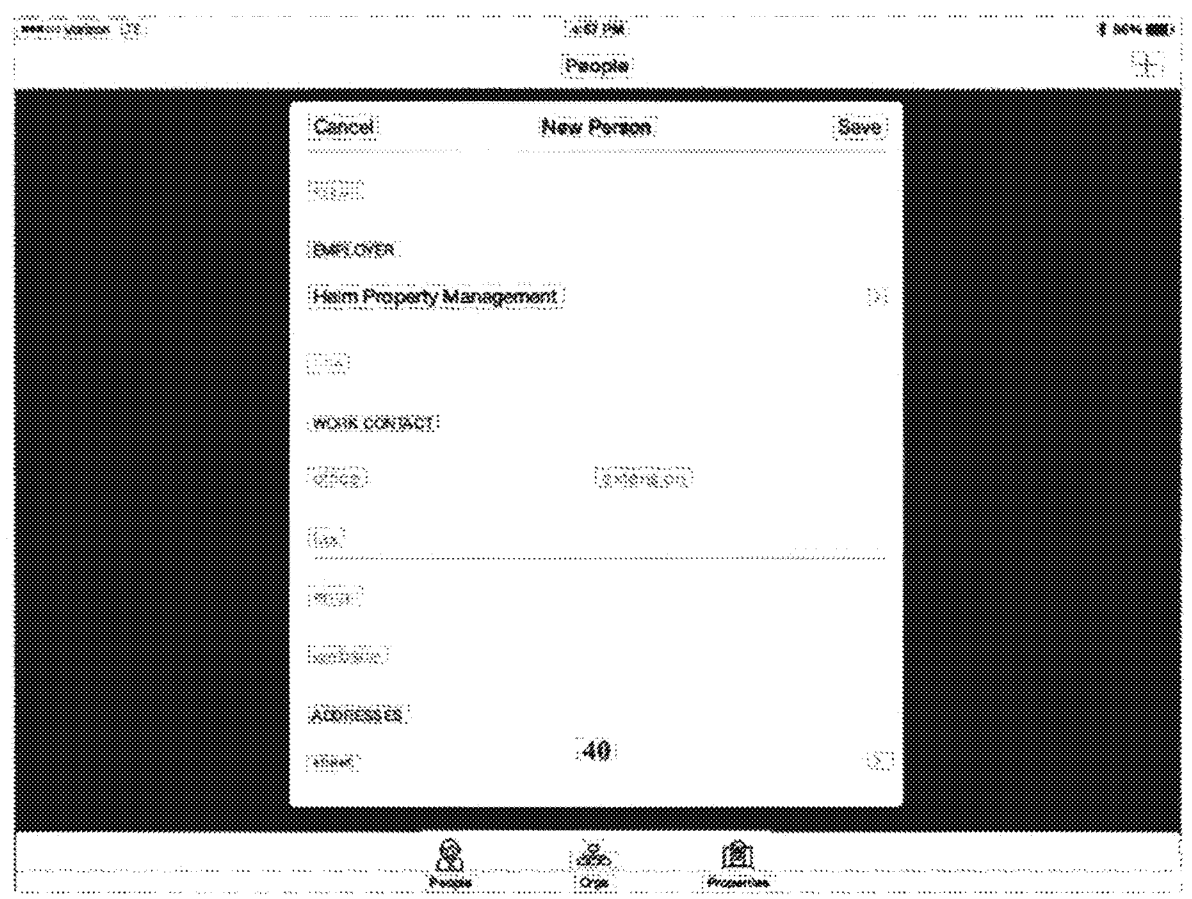

In FIG. 4, the user has clicked on button 12 (FIG. 1) to add a new person to the database and screen 40 is displayed. Information relating to the new person may be entered in the appropriate locations listed.

In FIG. 1, the user has clicked on button 51 for person "Bruce George" (FIG. 5) so that screen 50 is now displayed. The user can now edit or add more information. For example, the user can edit Bruce George information by clicking on button 52. The user can also add an employer organization for Bruce George by clicking on button 54. The user can view and access properties associated with Bruce George by viewing and clicking on section 55.

Figure 5:
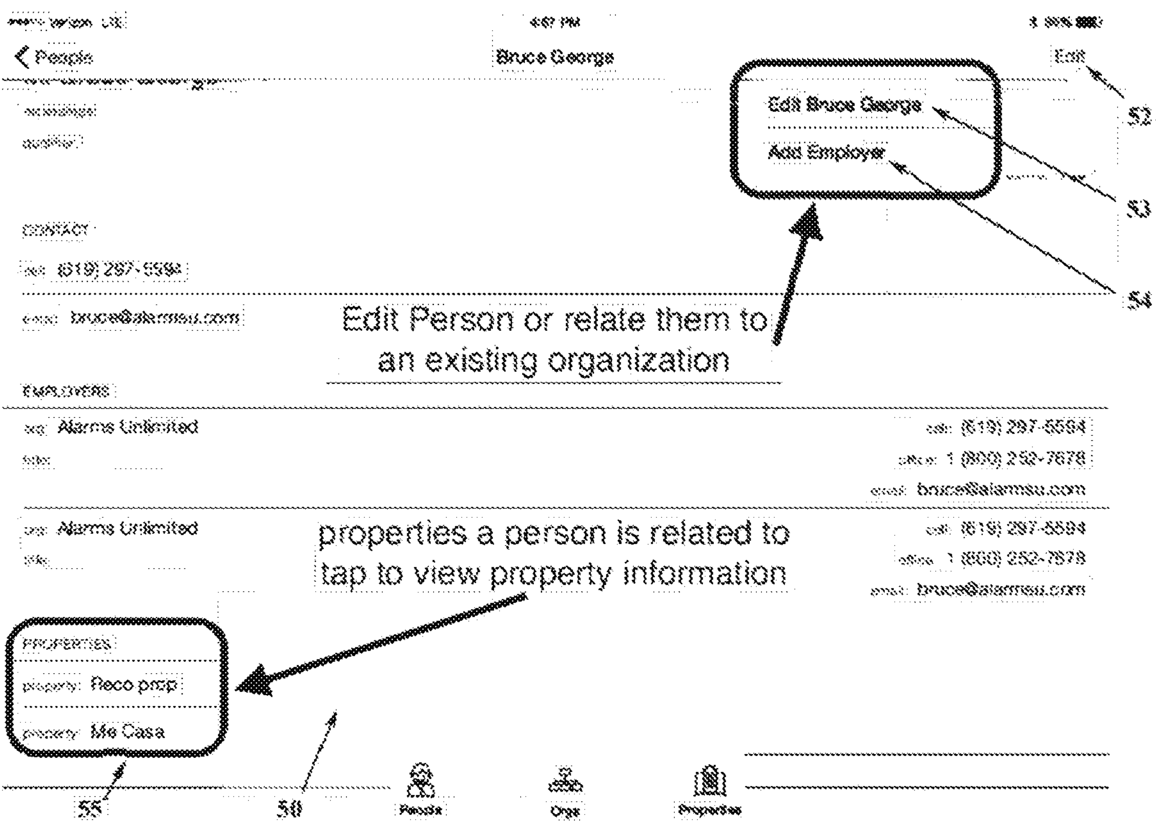
Figure 6:
Figure 7:
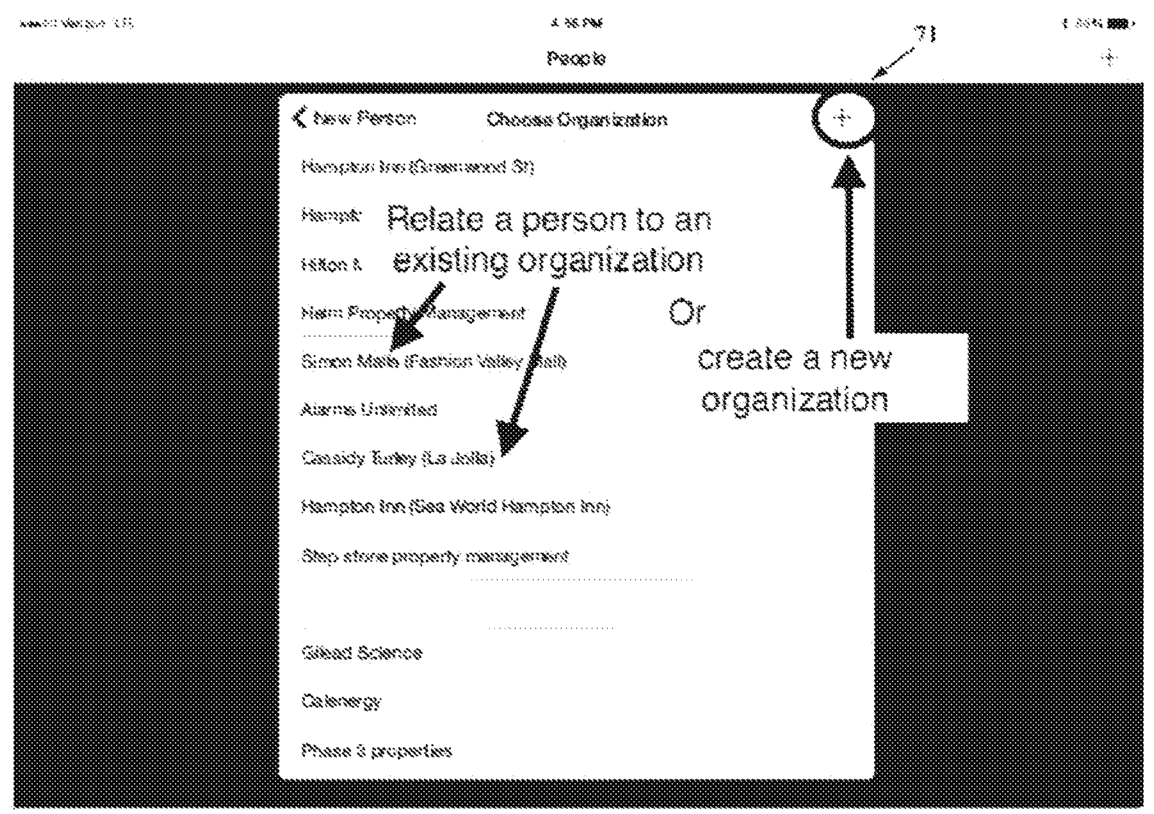

In FIG. 5, the user has clicked on button 54 to add an employer. Screen 60 (FIG. 6) is then displayed. The user then clicks on section 61 to add an organization as an employer. This brings up screen 70 shown in FIG. 7. The user can add one of the organizations shown to person "Bruce George". Or the user can add a new organization to the list by clicking on button 71.

Organizations: Organizations are also related to properties tracked in the database. For example, a property will often have associated organizations, such as: alarm companies, property managers, owners, fire departments, and on-site contacts, as well as others.

People associated with an organization, in this embodiment, are automatically listed under the organization's information and can be referenced in the organization windows. Properties associated with an organization, in this embodiment, are also listed under organizations.

Figure 8:
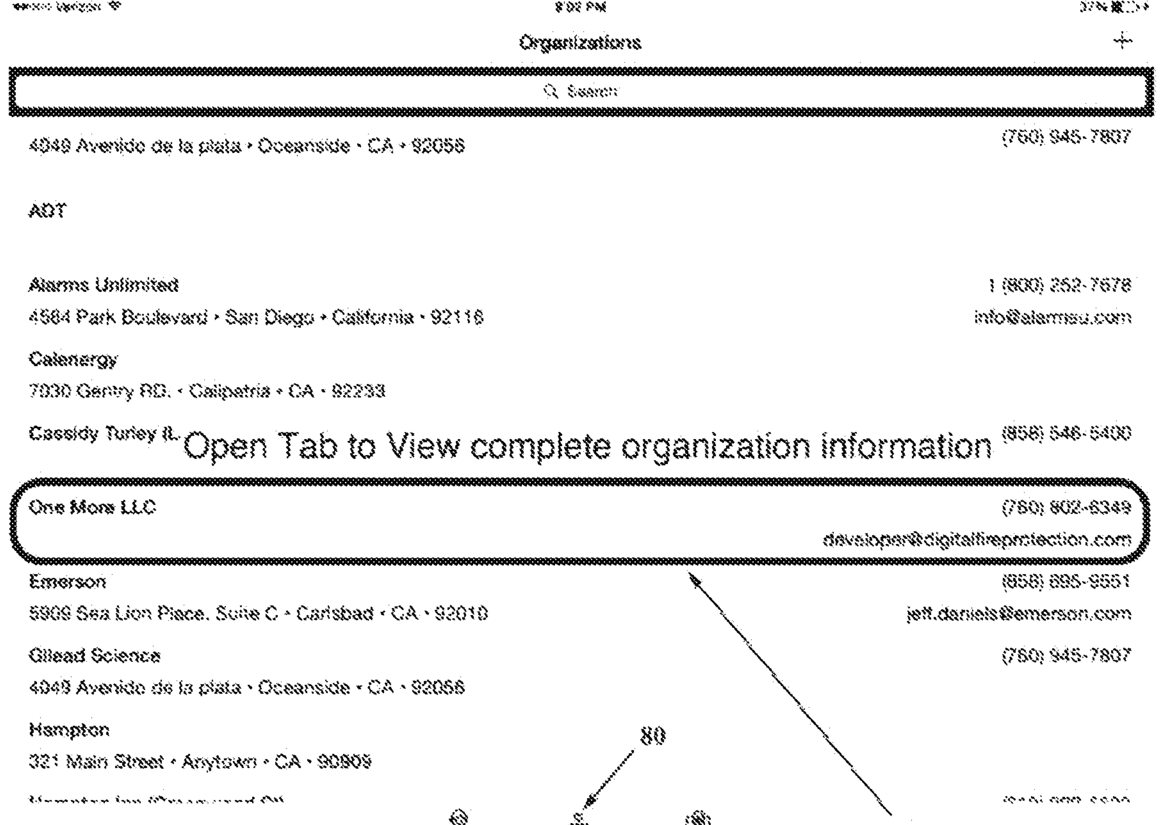
FIGS. 8-11 illustrate representative screens for viewing and editing organizations.
Figure 9:
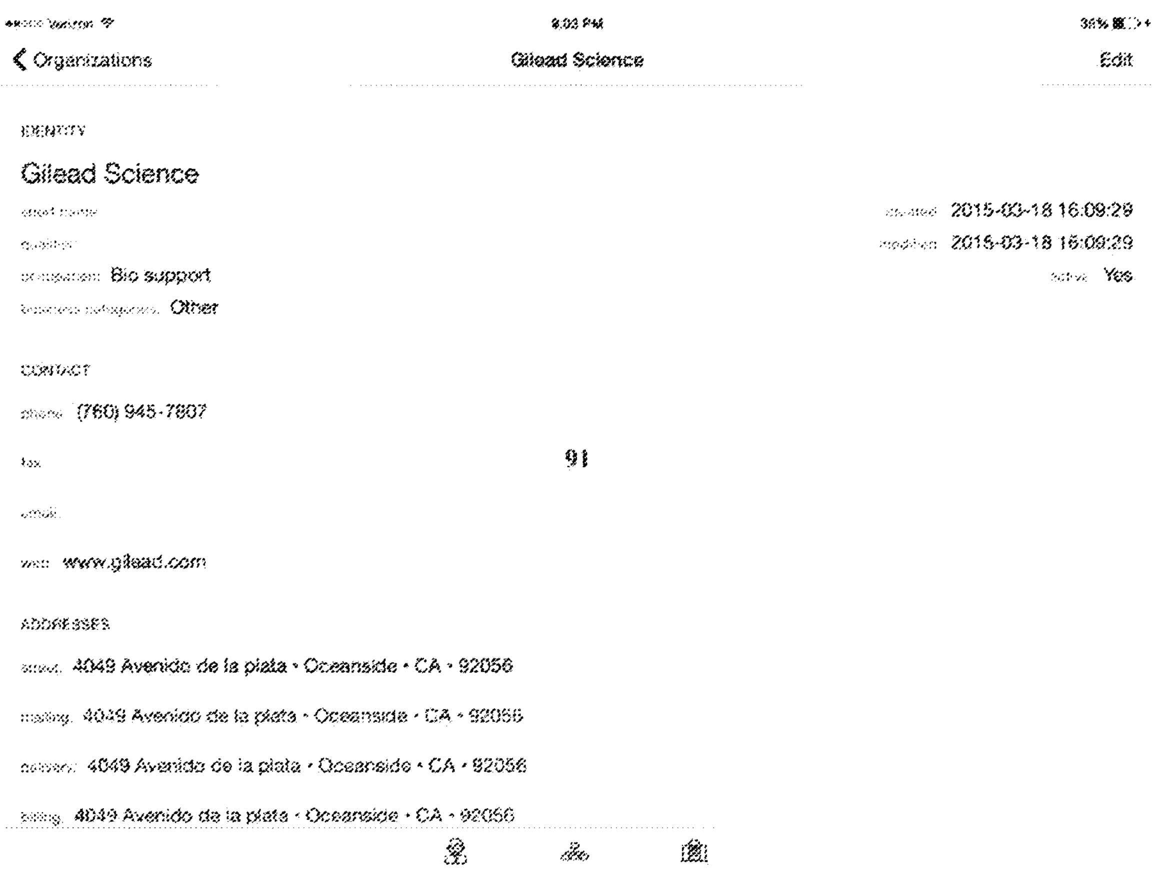

In FIG. 1, the user has clicked on button 13, causing screen 80 (FIG. 8) to be displayed. Screen 80 displays a list of organizations compiled within the database listed alphabetically. In FIG. 8, the user has clicked on section 81 for the organization "One More LLC" to access more detailed information regarding One More LLC.

Screen 91 (FIG. 9) is then displayed. Here the user can view pertinent information regarding this organization. (i.e., contact information, employee lists, management, property listing, fire department, other).

Figure 10:
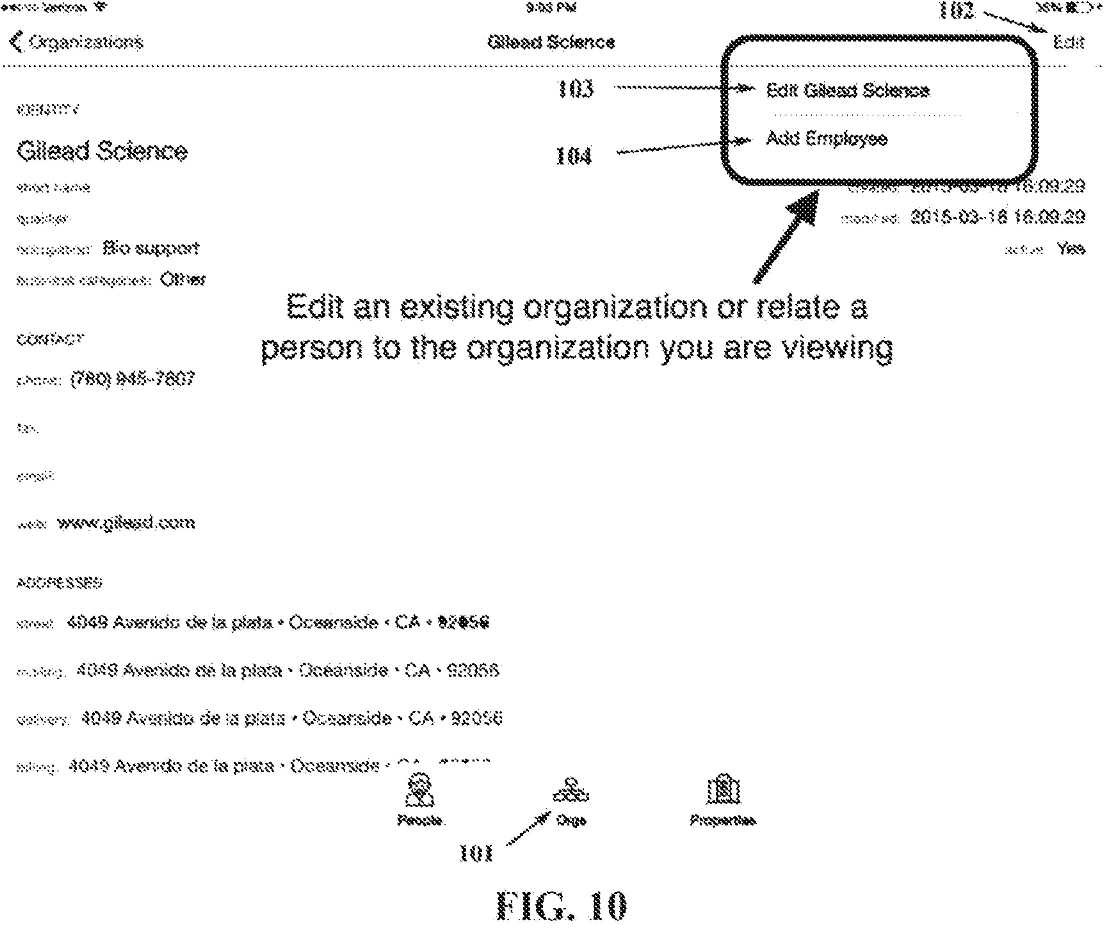

In FIG. 8, the user has clicked on section 82 for Gilead Science. This brings up the screen 101 (FIG. 10). Here the user may click on button 102 to either further edit the information for Gilead Science by clicking on button 103 or he may click on button 104 to add another employee for Gilead Science.

Figure 11:
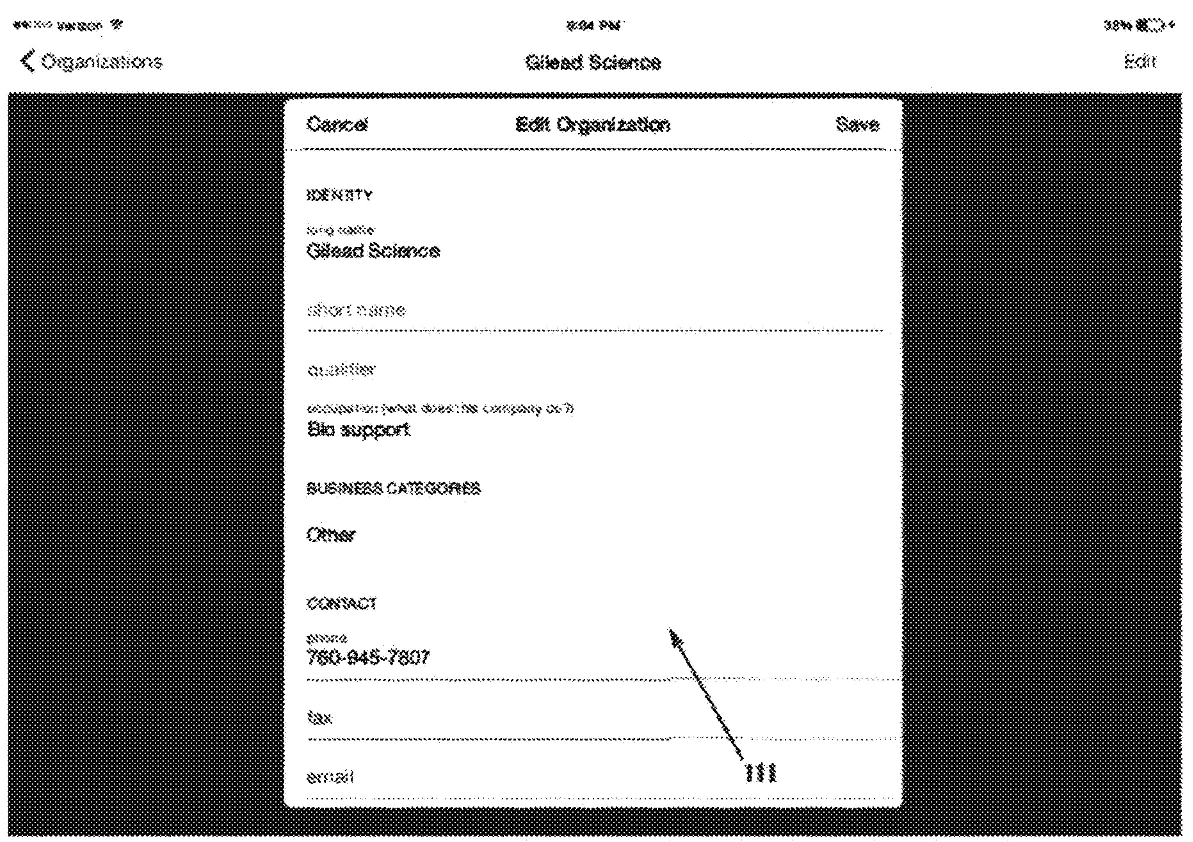

In FIG. 11, the user has clicked on button 102 (FIG. 10) to display pop-up section 111. Here the user can enter additional details regarding Gilead Science.

Properties: Properties, in this representative embodiment, are searchable by address, name, job number, building number, and through associations with people or organizations. Properties show lists of associated people and organizations involved with the properties. The lists identify the associations with the properties.

Property levels are mapped via GPS and satellite images, represented by an icon, showing exact locations of fire safety equipment both on the property level and floor levels.

Larger properties with multiple buildings sharing one individual address (such as hotels, college campuses, etc.) have extra identifiers (pins) that can be labeled accordingly and set at specific GPS locations. The building list shows at the property level, allowing the user to quickly find buildings and fire safety equipment for that building.

Figure 12:
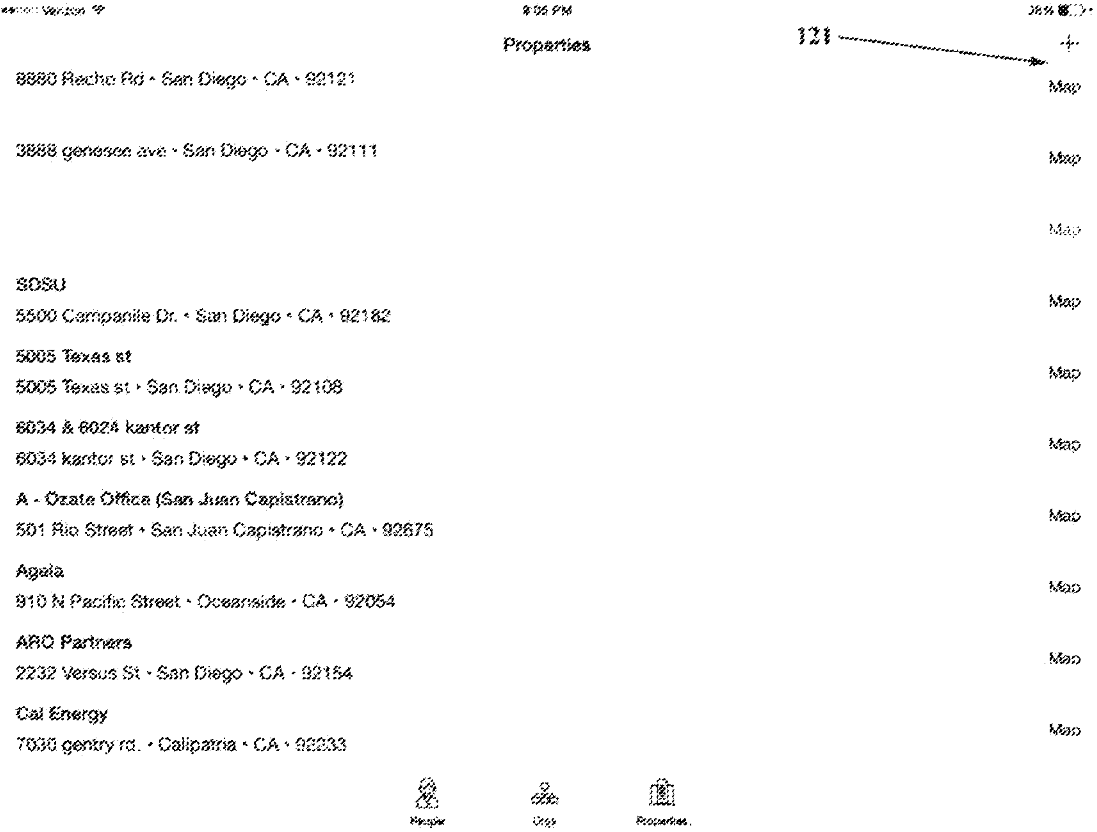
FIGS. 12-14 illustrate representative screens for viewing and editing properties.
Figure 13:
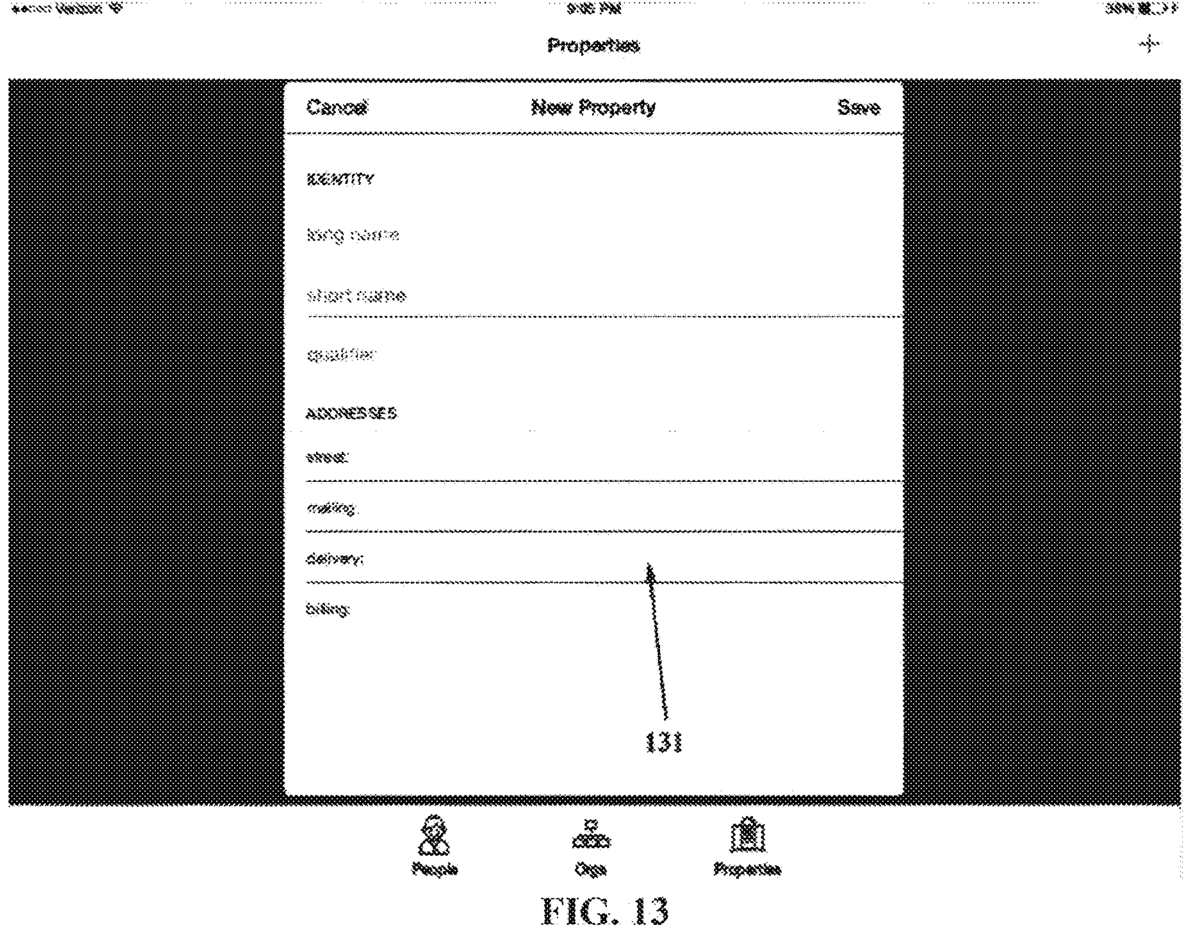

In FIG. 1, the user has clicked on button 14, causing screen 120 (FIG. 12) to be displayed. Screen 120 displays a list of properties compiled within the database listed alphabetically. In FIG. 12, the user has clicked on section 121 to add a new property, causing pop-up screen 131 (FIG. 13) to be displayed. Here the user may enter detailed information regarding the new property.

Figure 14:
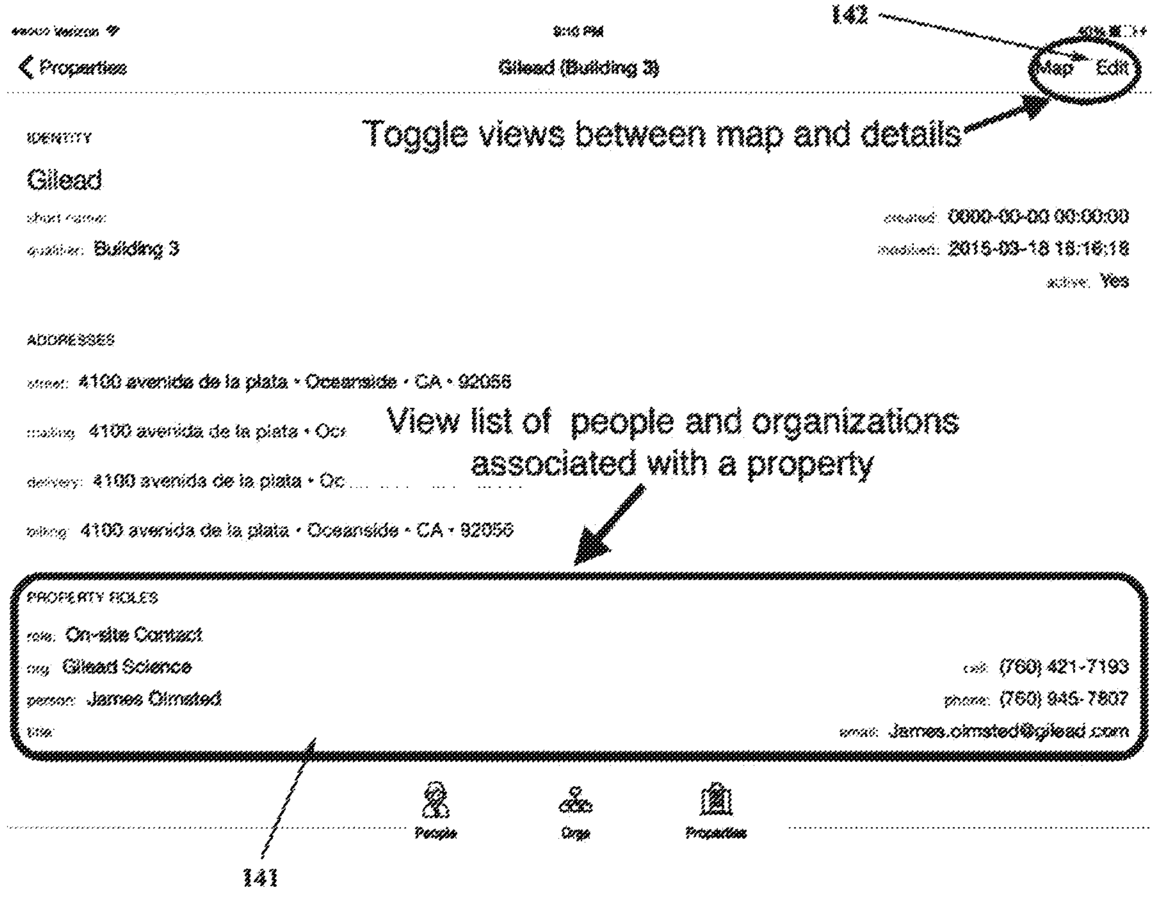

In FIG. 14 the user has selected the property Gilead from the list of properties shown in FIG. 12. More detailed information can be viewed in section 141 and edited by clicking on button 142.

Figure 15:
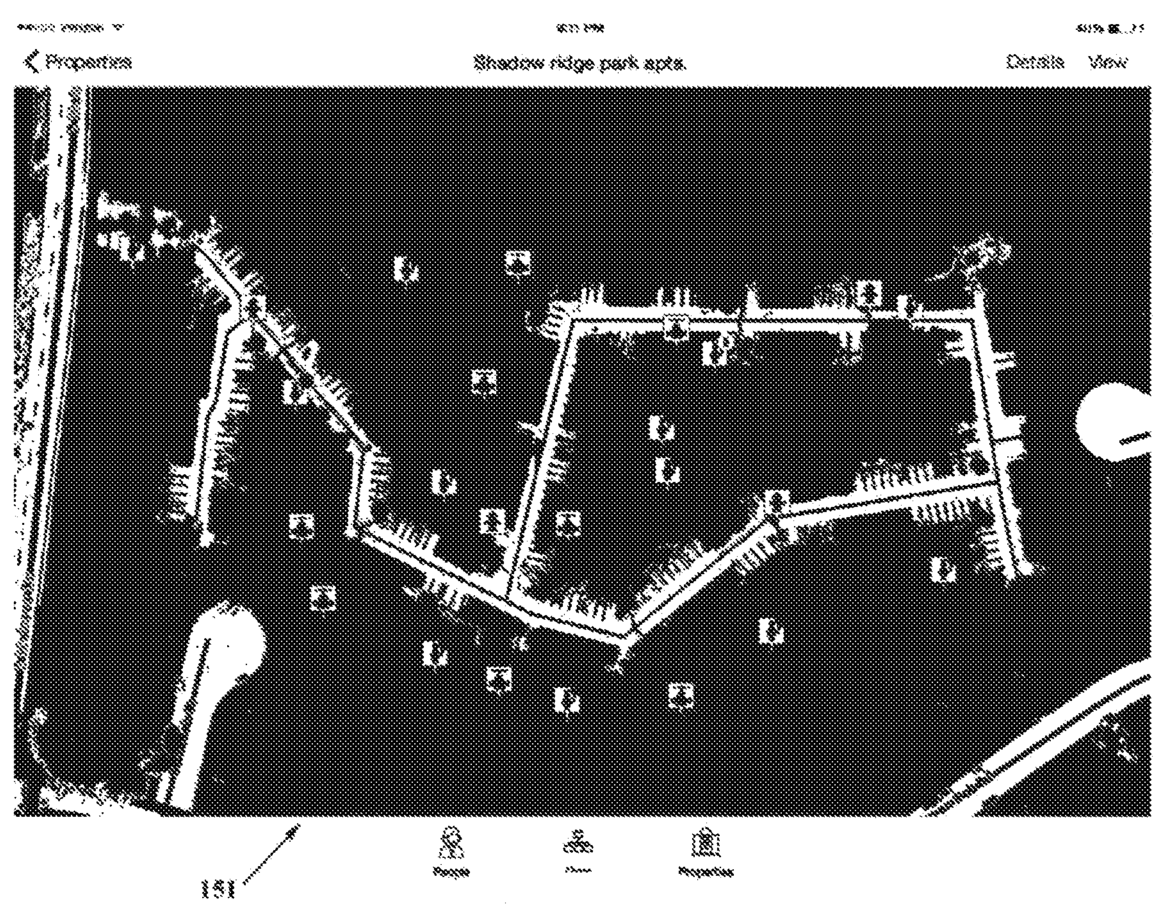
FIGS. 15-24 illustrate representative screens for mapping.

Mapping: In FIG. 15, the user has clicked on the Shadow Ridge Park Apartments icon after scrolling down the property list shown in FIG. 12. FIG. 15 depicts aerial photographic image 151 of Shadow Ridge Park Apartments. Icons representing fire safety equipment are superimposed on top of image 151. The user can click on any icon to learn more about the safety equipment represented.

Figure 16:
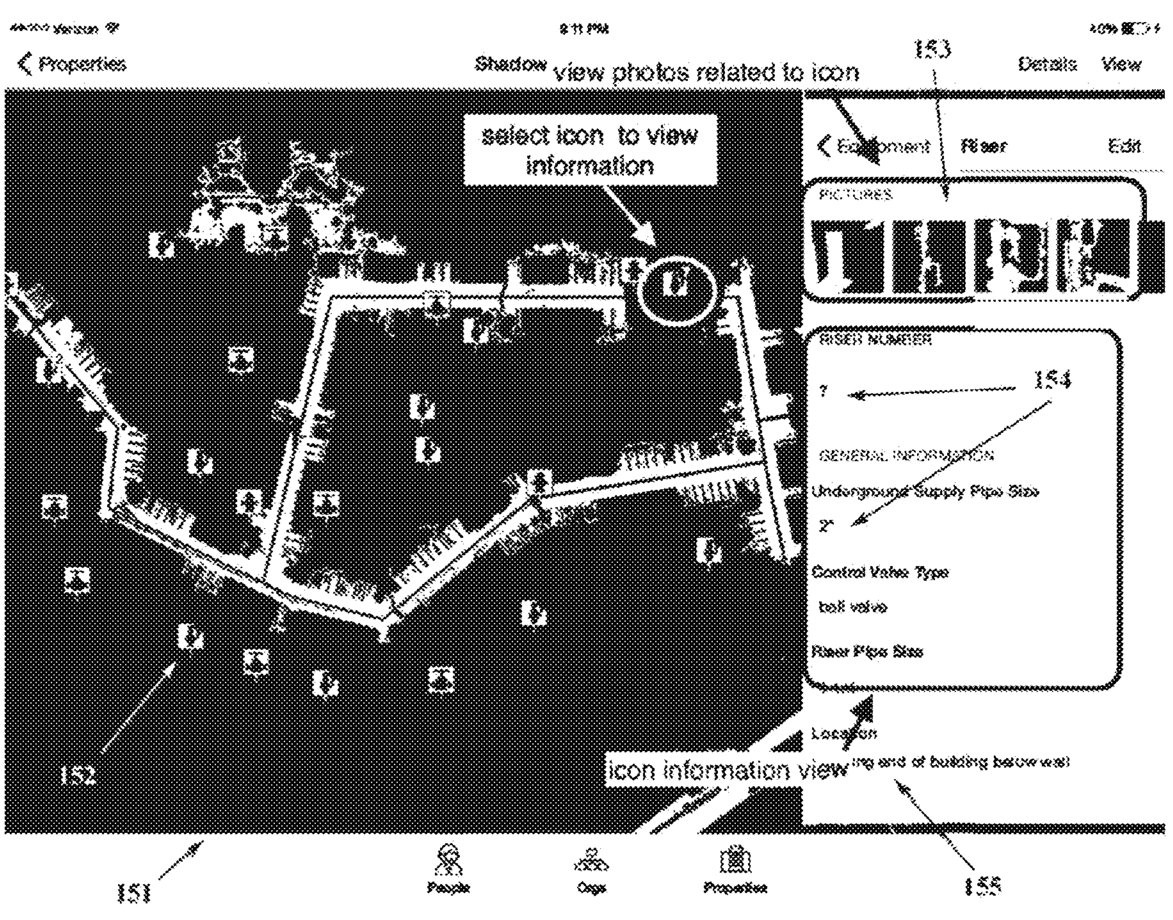

For example, in FIG. 16, the user has clicked on icon 152 depicting a riser located at the position shown on image 151. Photographs showing the riser are then depicted at pop-up screen 153, descriptive information regarding the riser/equipment is shown at pop-up screen 154, and location information regarding the riser is given at pop-up screen 155. In one representative embodiment, pop-up screens 154 and 155 can be consolidated to show all information regarding the risers.

Figure 17:
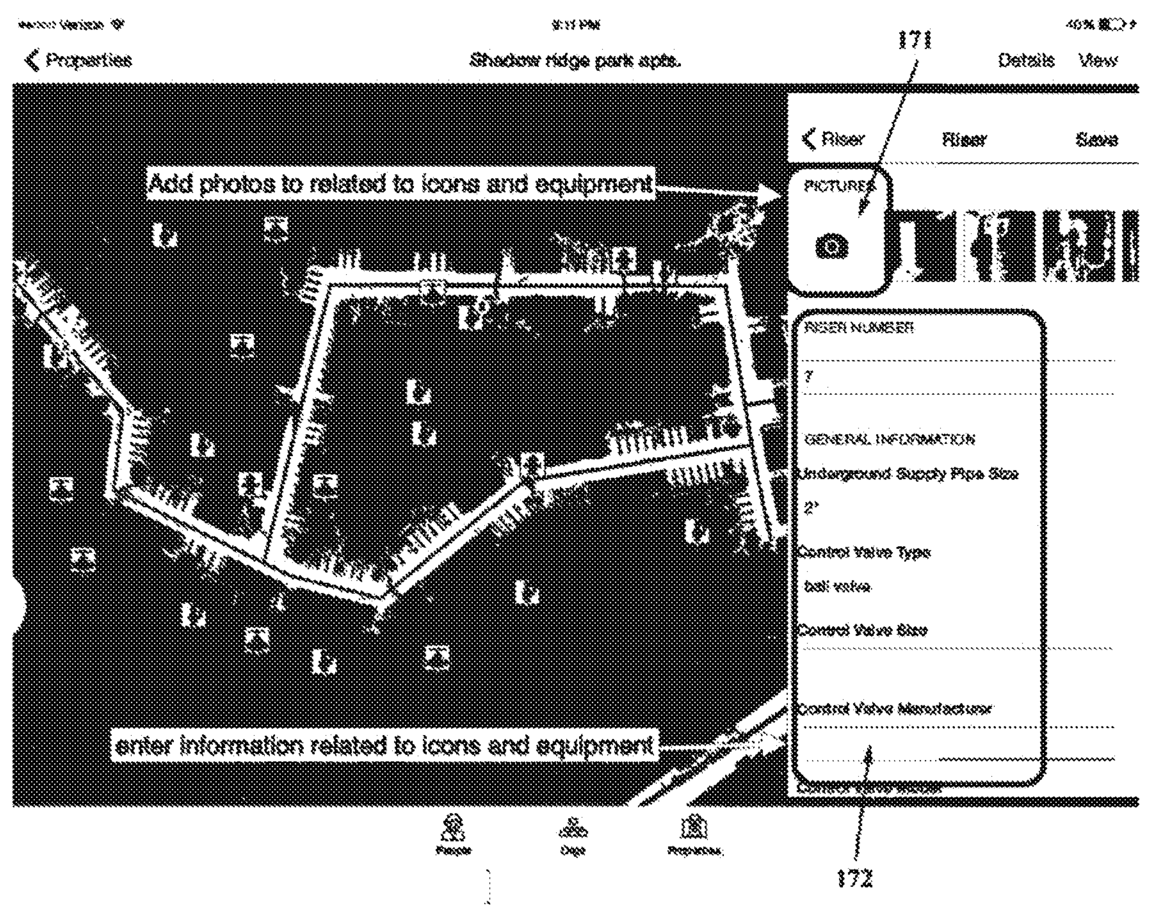
Figure 18:
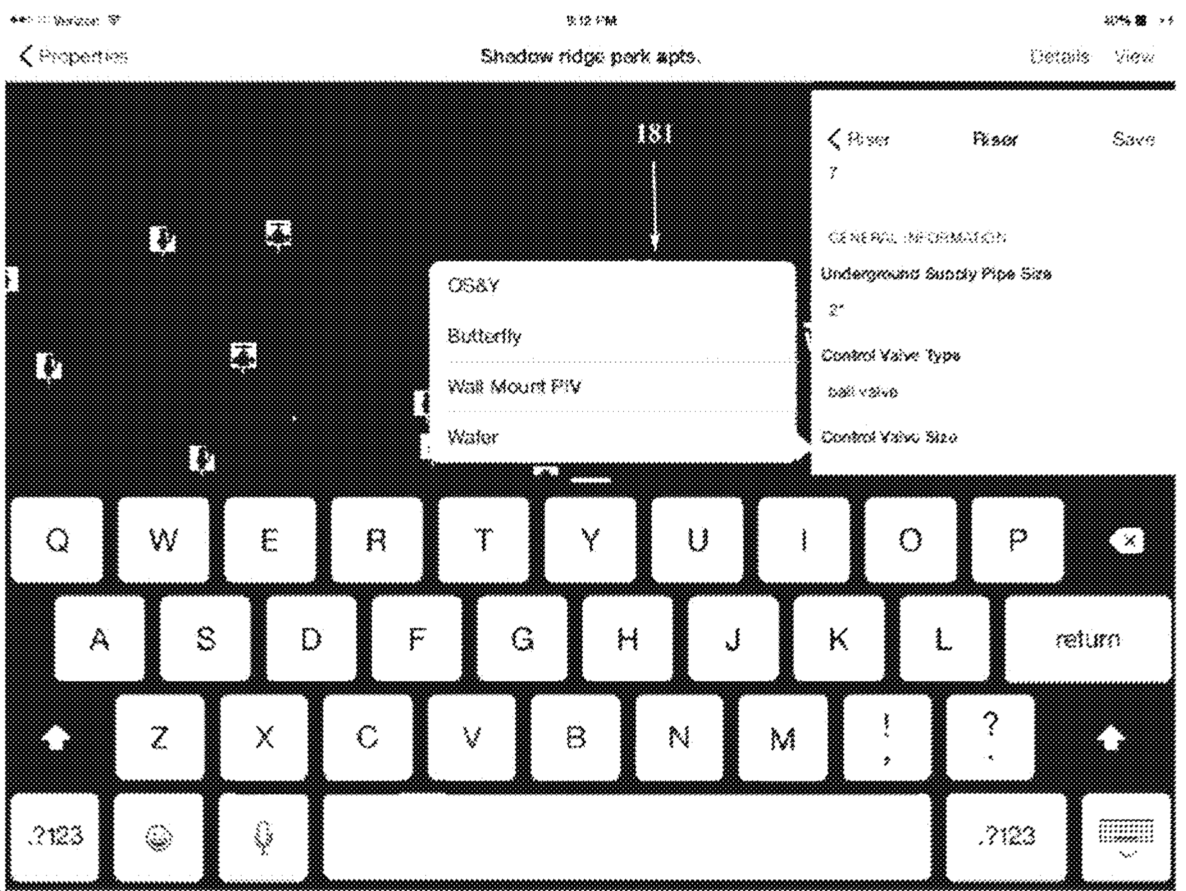
Figure 19:
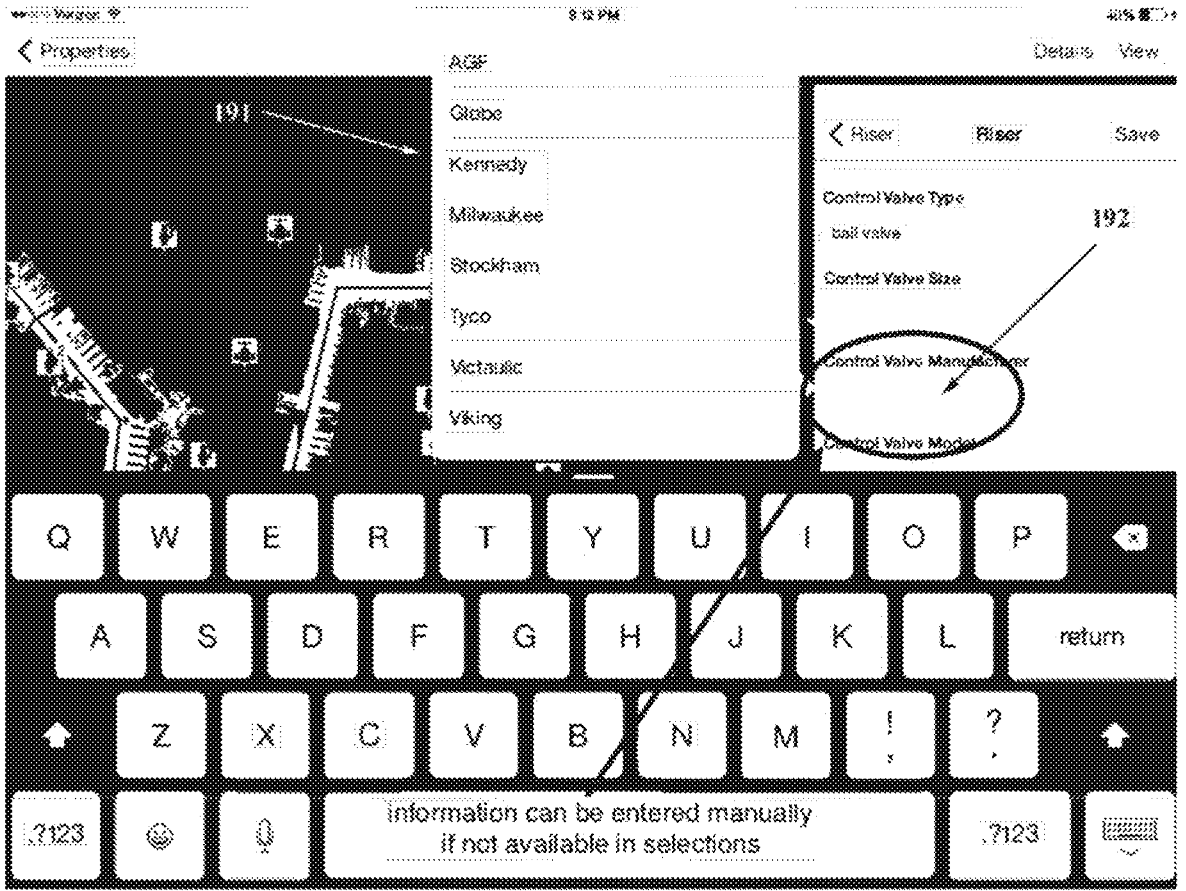

In FIG. 17, the user can click on section 171 to add additional photographs regarding the riser/equipment or he can click on section 172 to add additional information regarding the riser/equipment. For example, after clicking on section 172, pop-up selections 181 for the control valve appear as shown in FIG. 18. In FIG. 19, the additional information may be typed in manually in section 192 if selection list 191 does not include the desired information.

Figure 20:
Figure 21:

FIGS. 20 and 21 depict detailed photographic images of the riser. The user may view these pictures by clicking on the desired image shown in pop-up screen 153 (FIG. 16).

Figure 22:
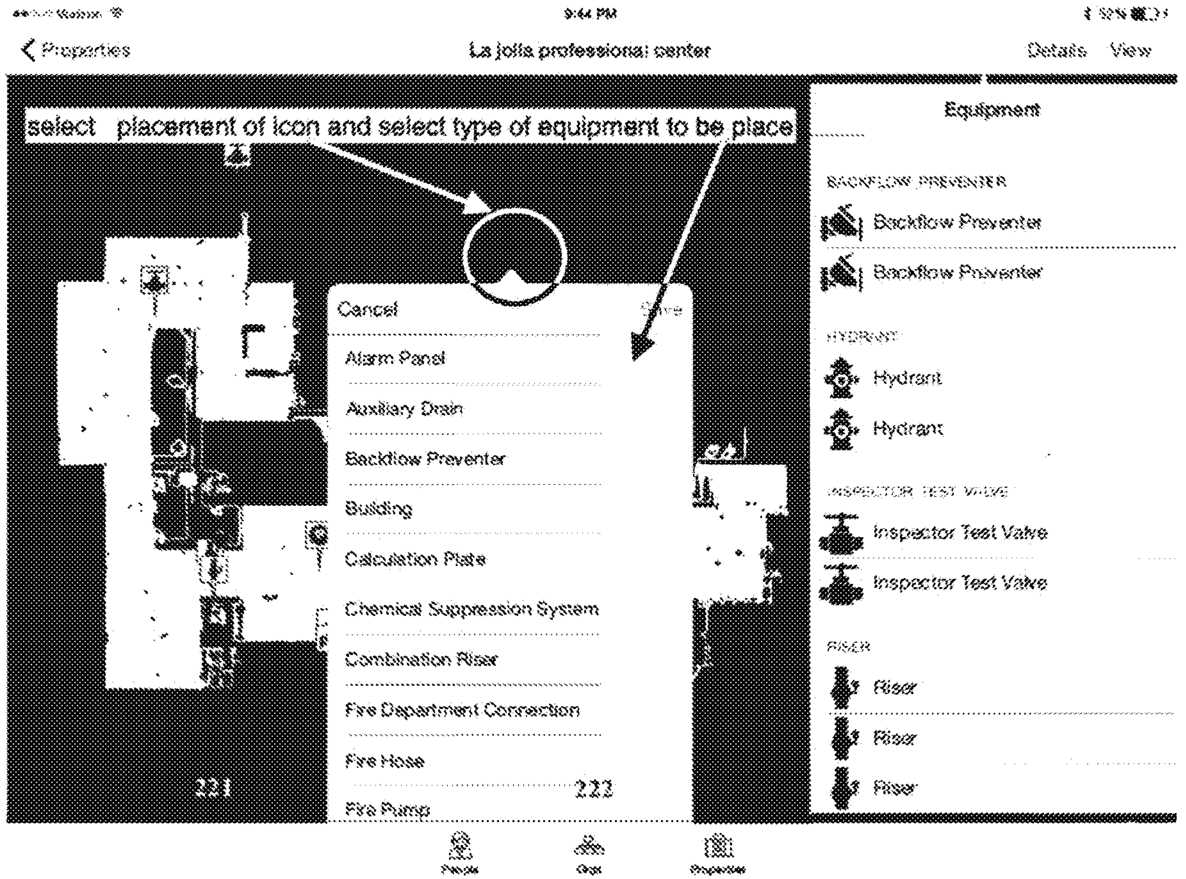
Figure 23:
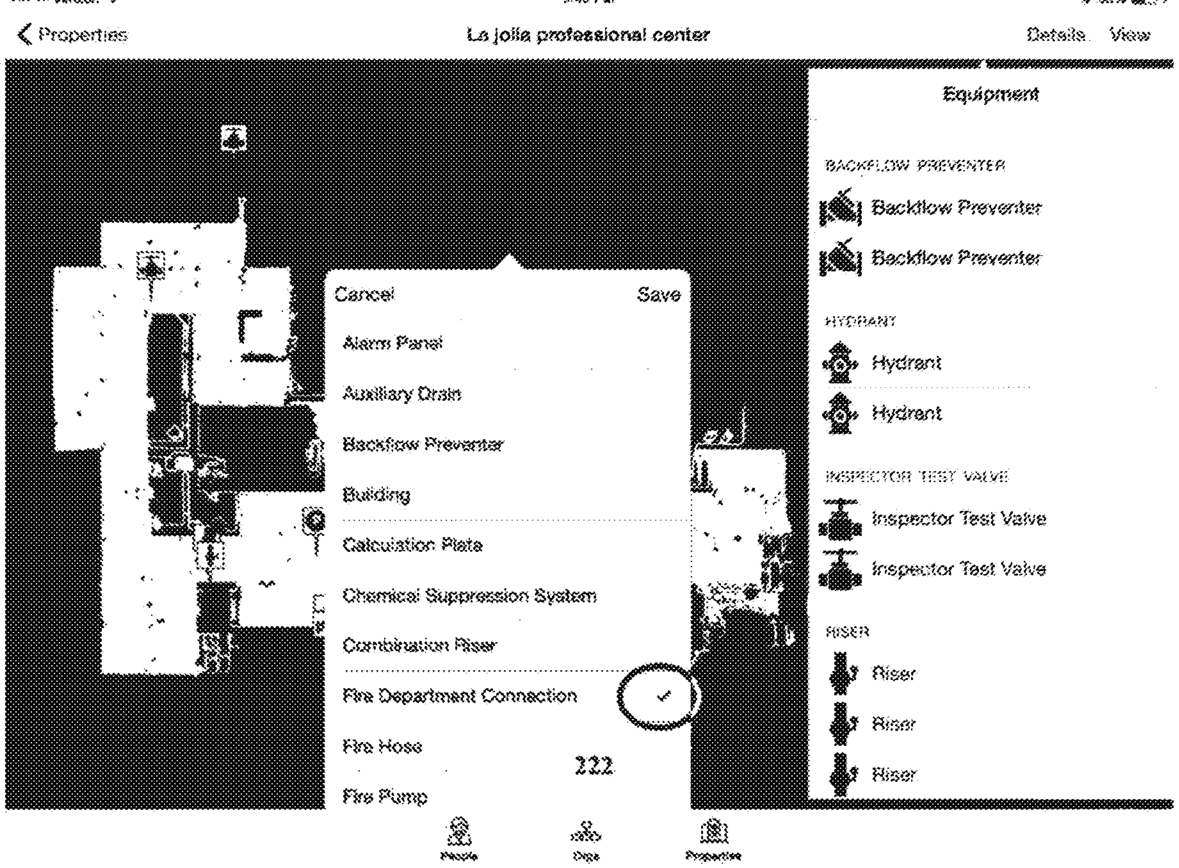
Figure 24:
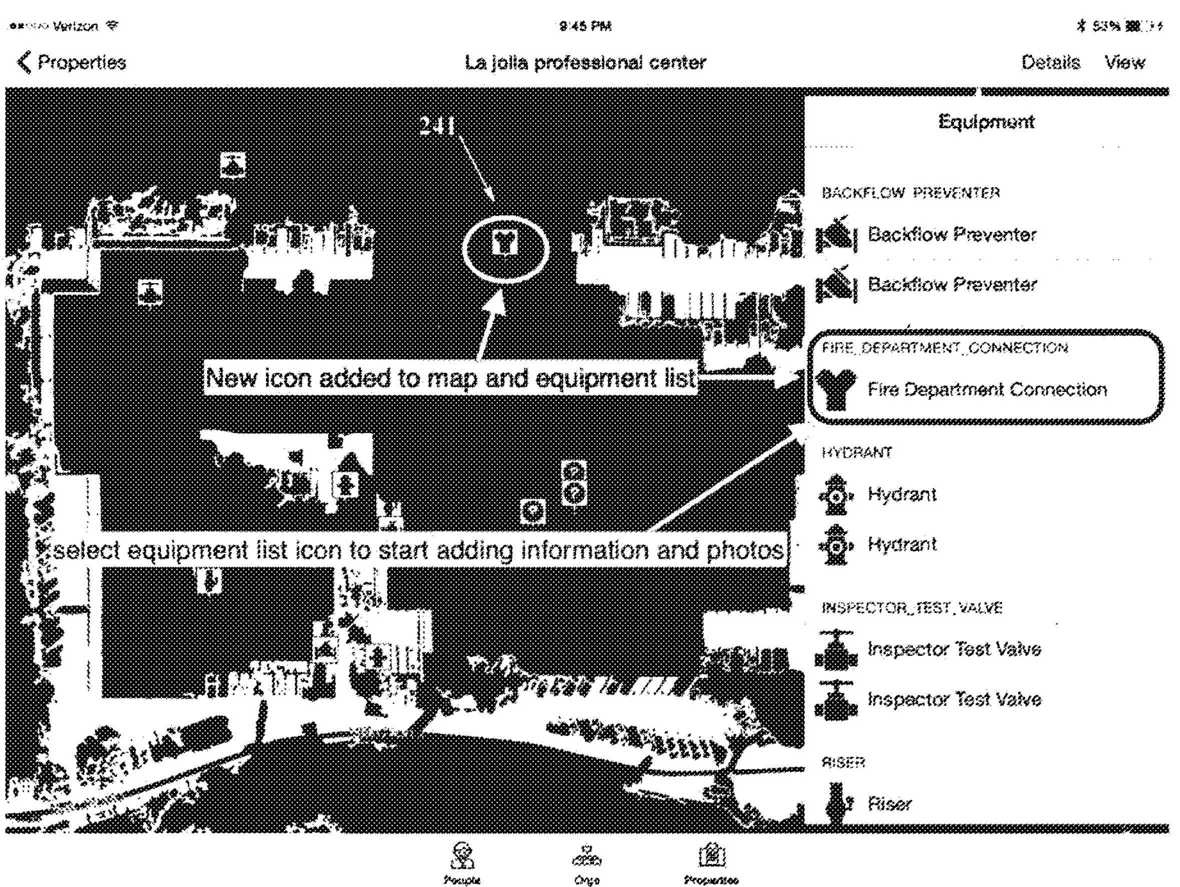
Figure 25:
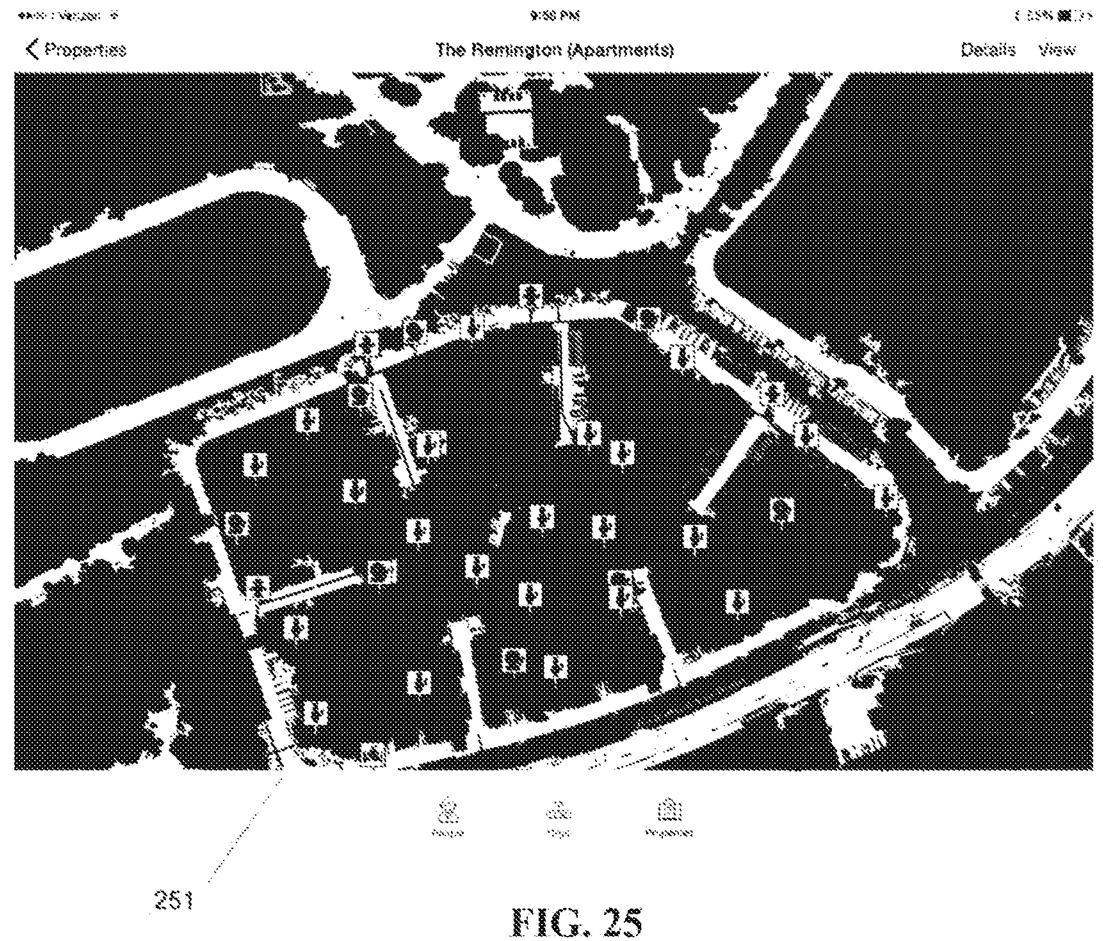
FIGS. 25-26 illustrate representative screens for fire safety inspection.
Figure 26:
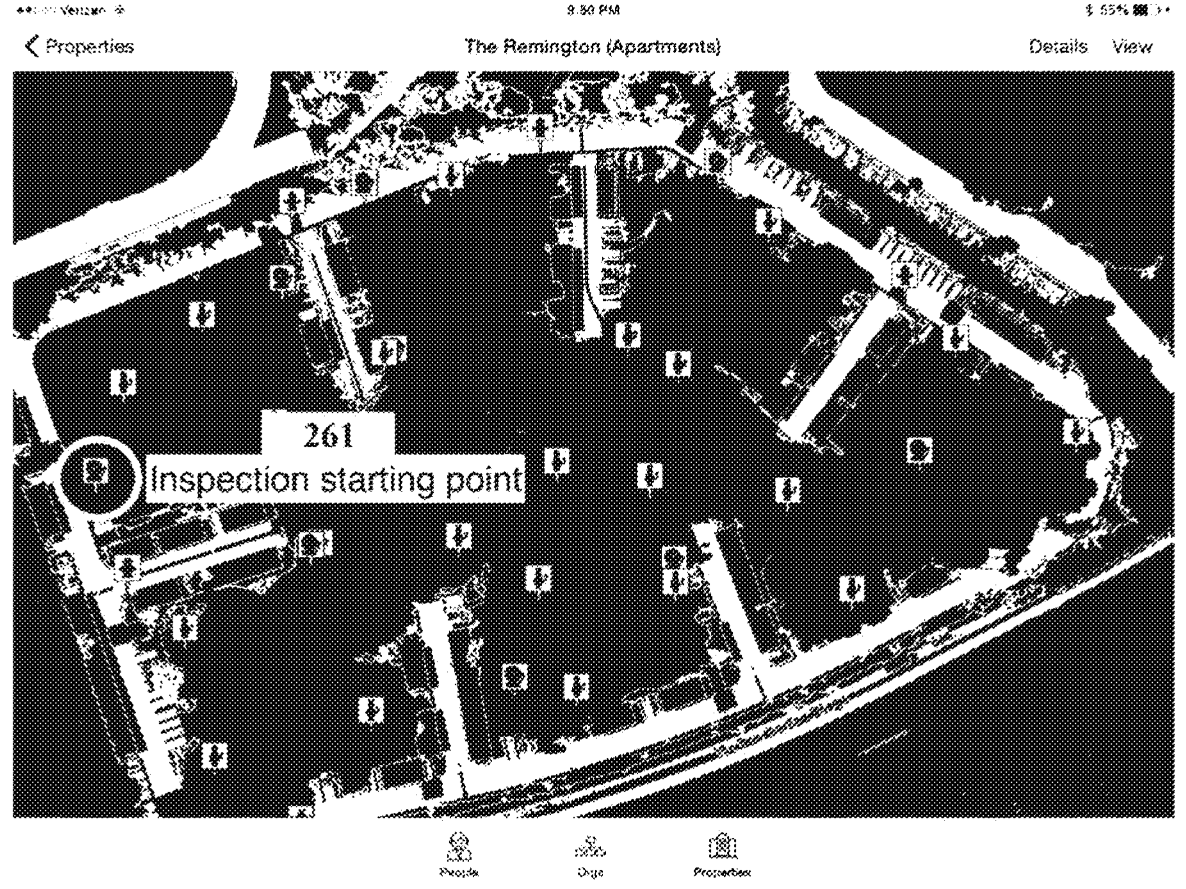
Figure 27:
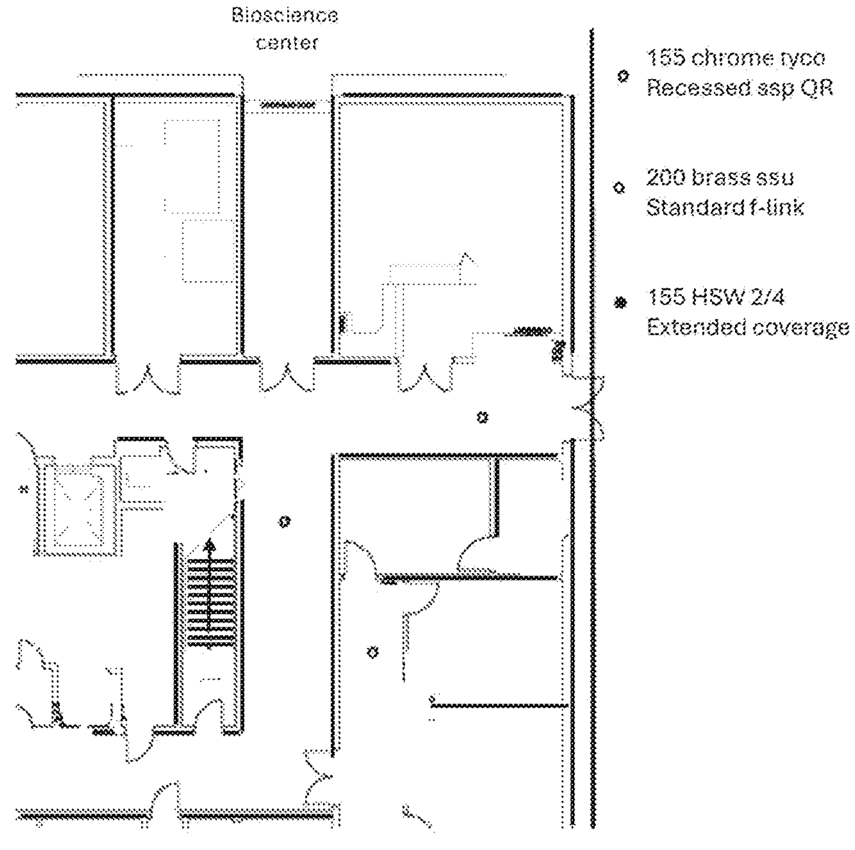
FIGS. 27-28 illustrate floor maps showing inspection discrepancies.
Figure 28:
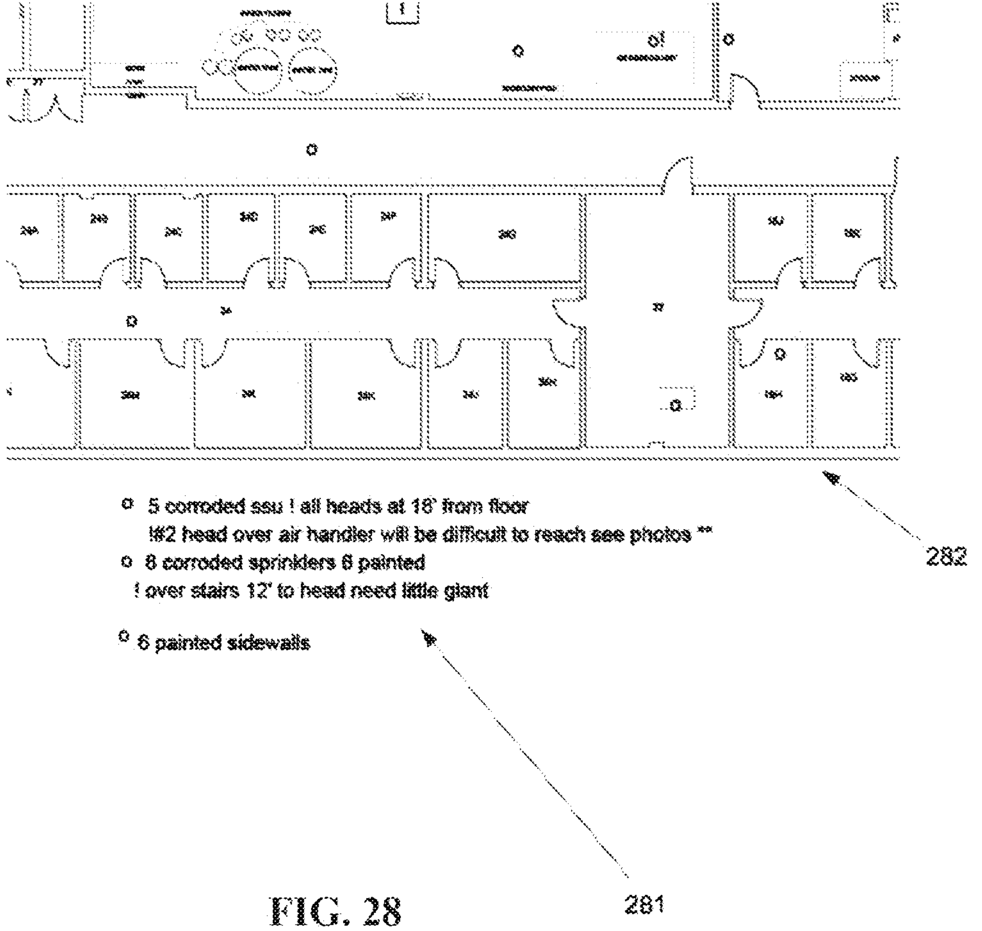
Figure 31:
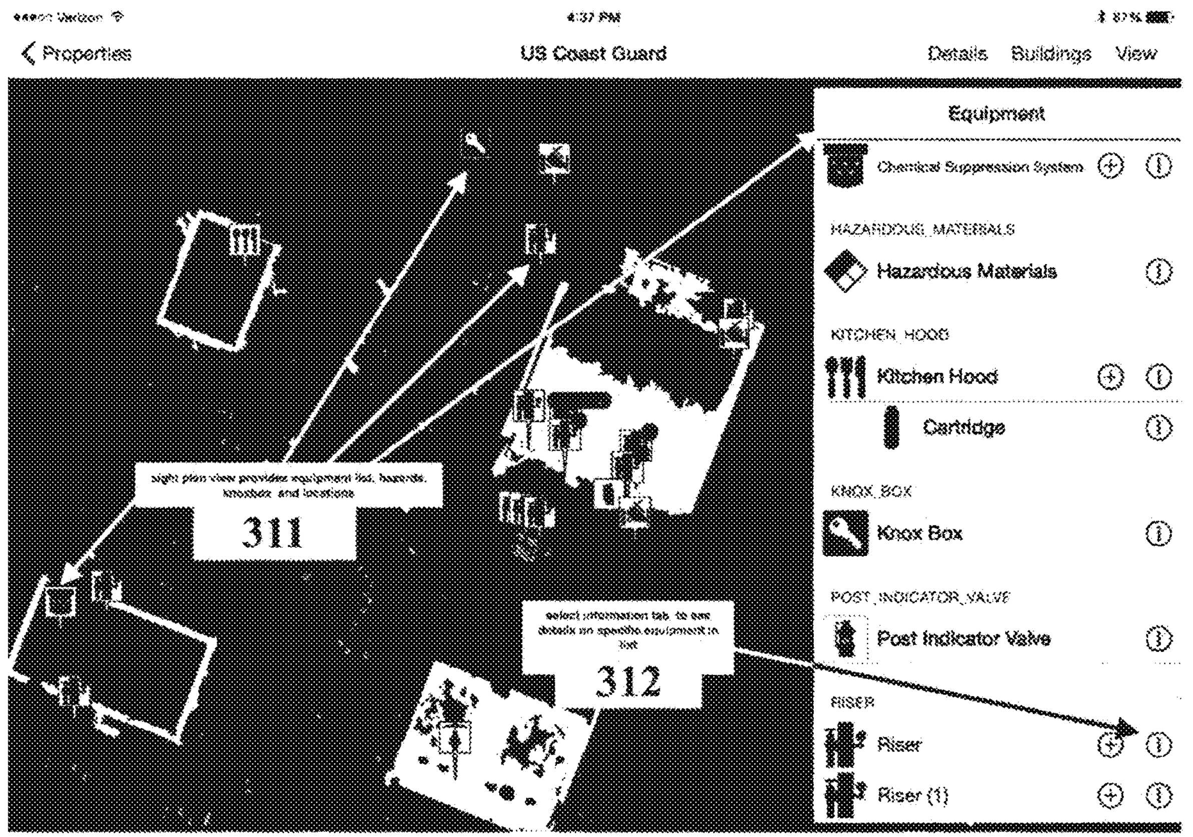
FIGS. 31-32 illustrate a representative fire department view.
Figure 32:
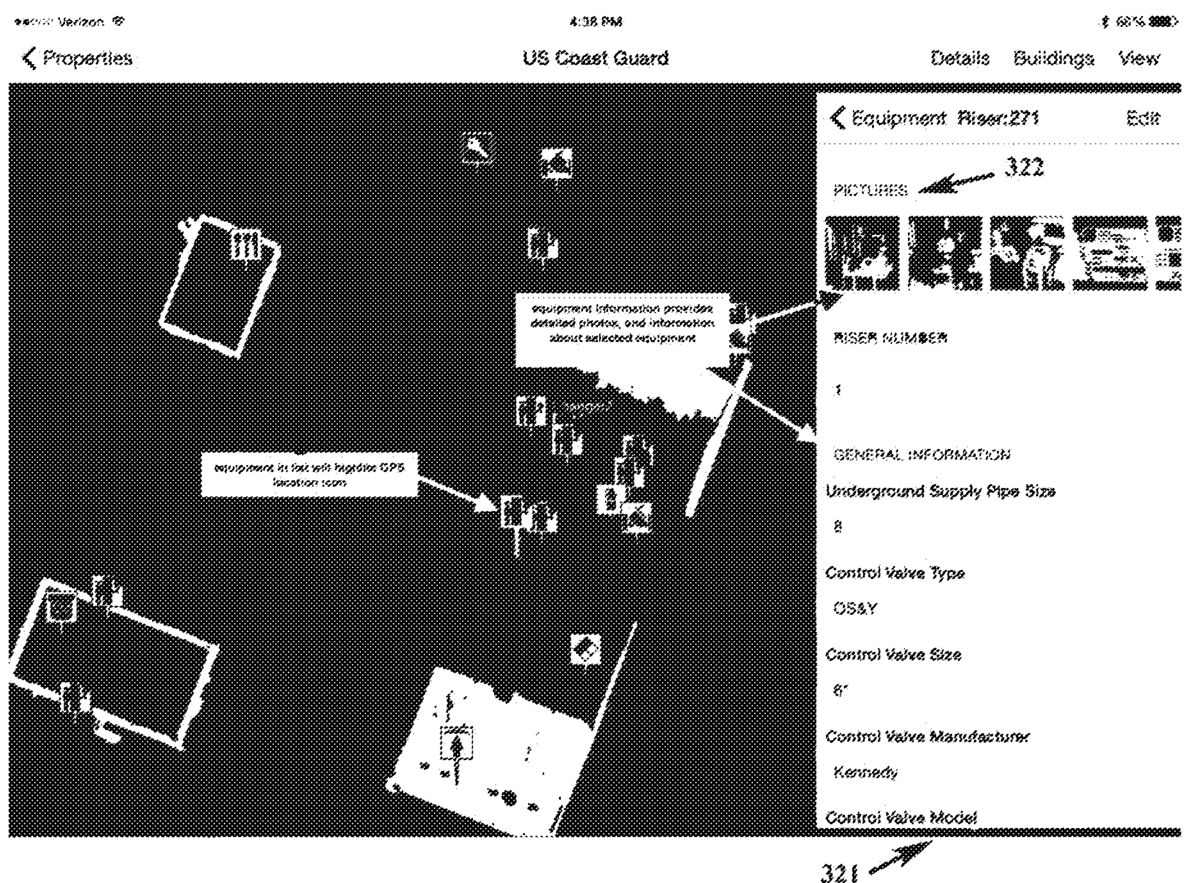

In FIG. 22, the user wants to add another icon to image 151. He first selects the location by clicking on the appropriate spot-on image 151 (FIG. 16) and selects the type of equipment represented by the icon by clicking on selection list 222. For example, in FIG. 23, the user has selected Fire Department Connection from list 222. The icon is then presented as icon 241 (FIG. 24). The user can then click on the icon to add information and photos in a fashion similar to that described above.

Figure 38:
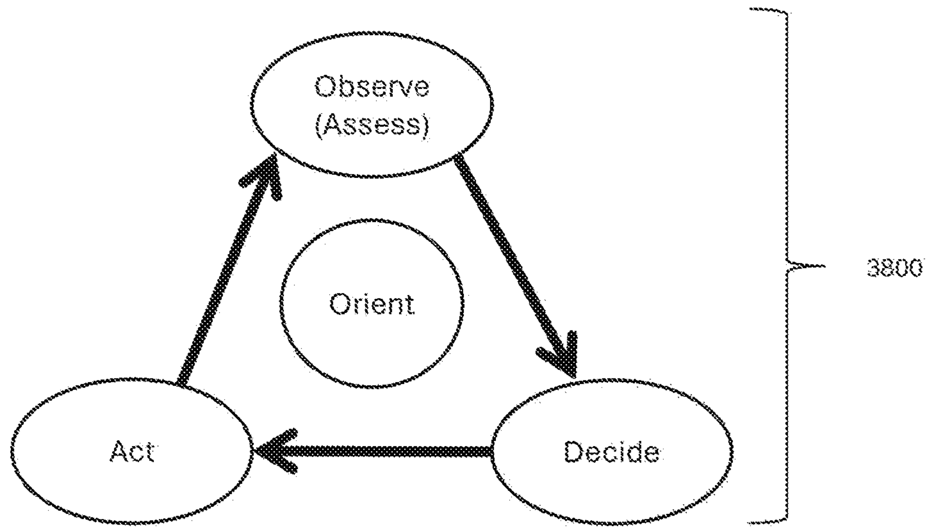
FIG. 38 illustrates a representative decision cycle for the use and maintenance of firefighting equipment.
Figure 39:
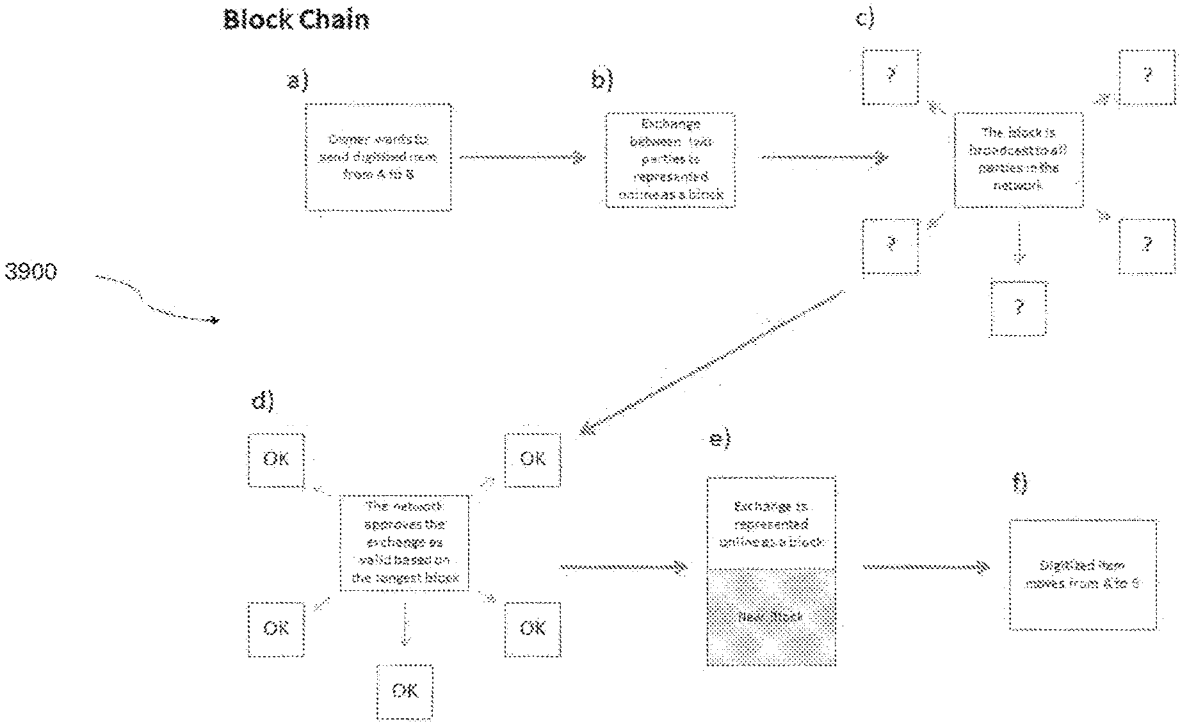
FIG. 39 illustrates blockchain used as an encryption option.
Figure 40A:
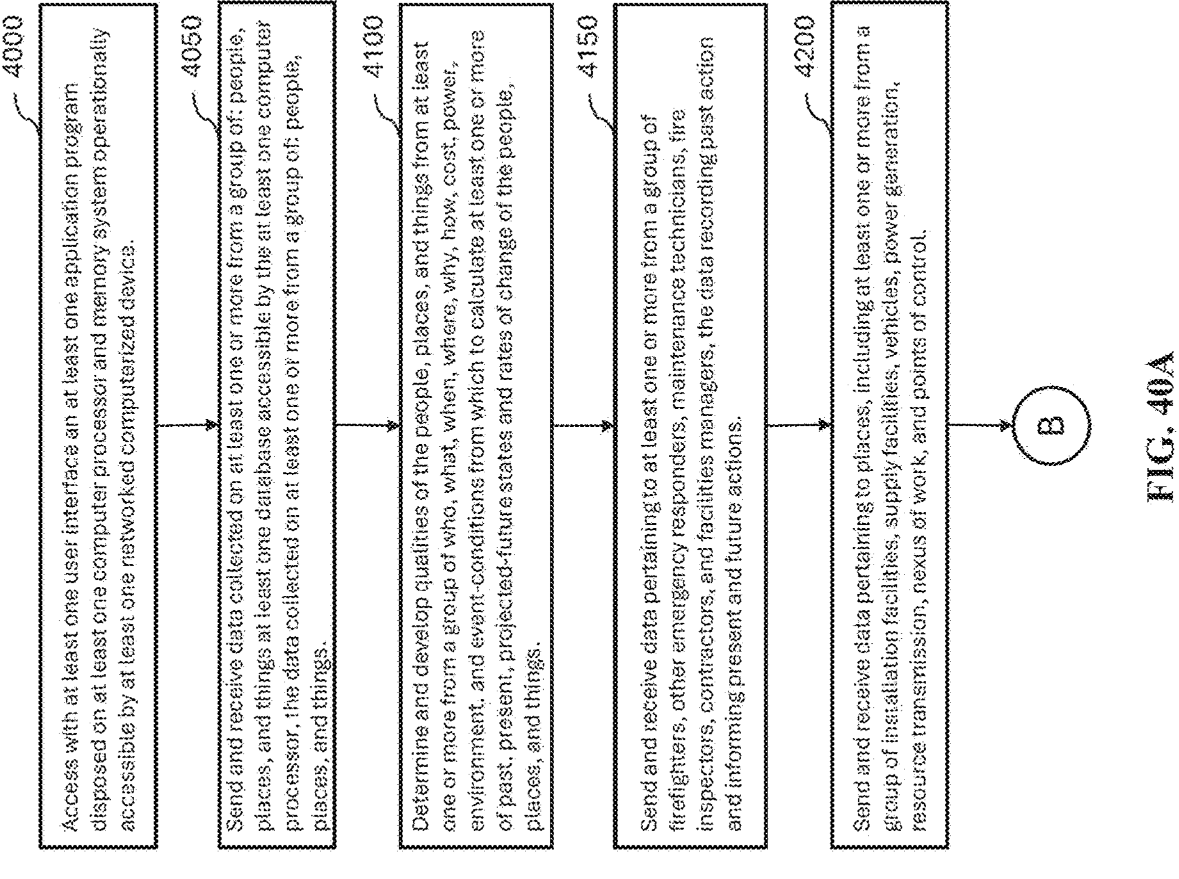
Figure 40B:
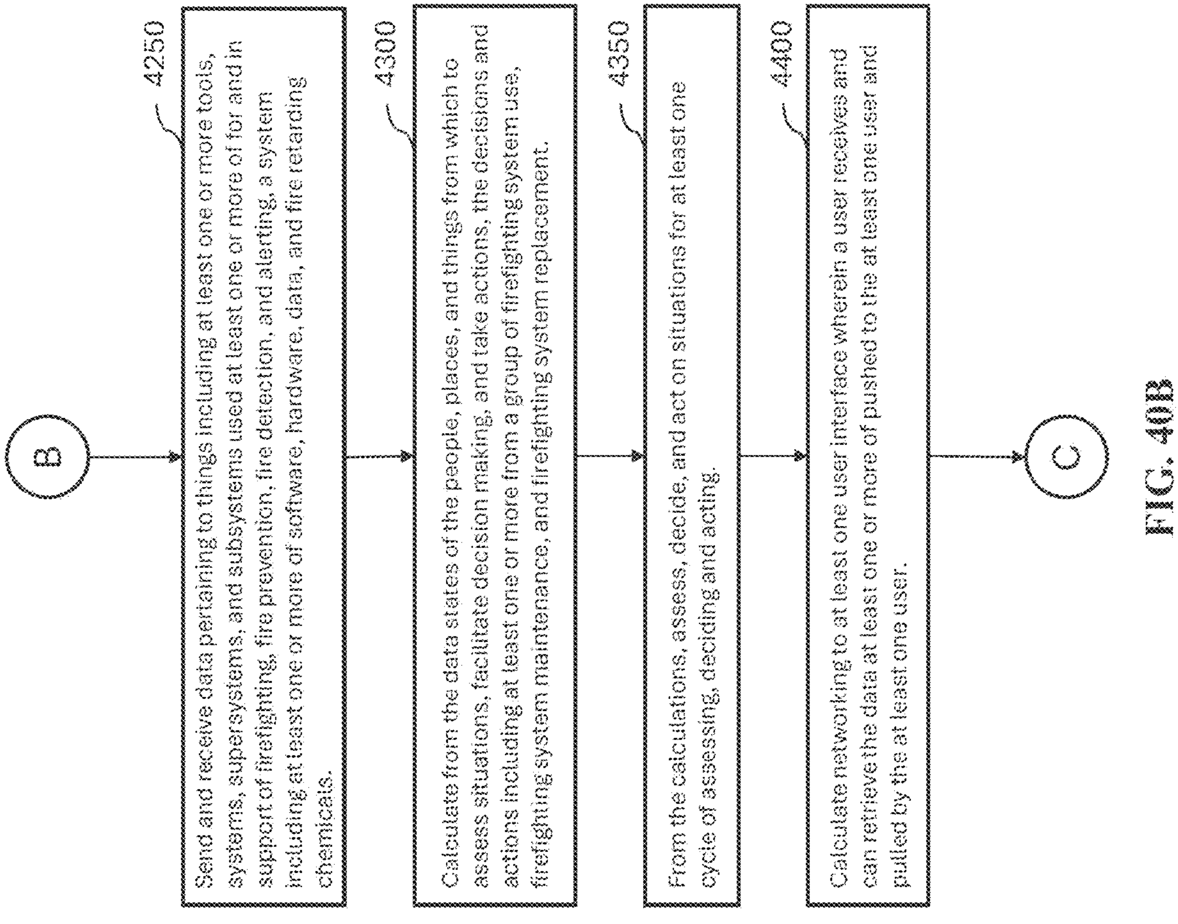
Figure 40C:
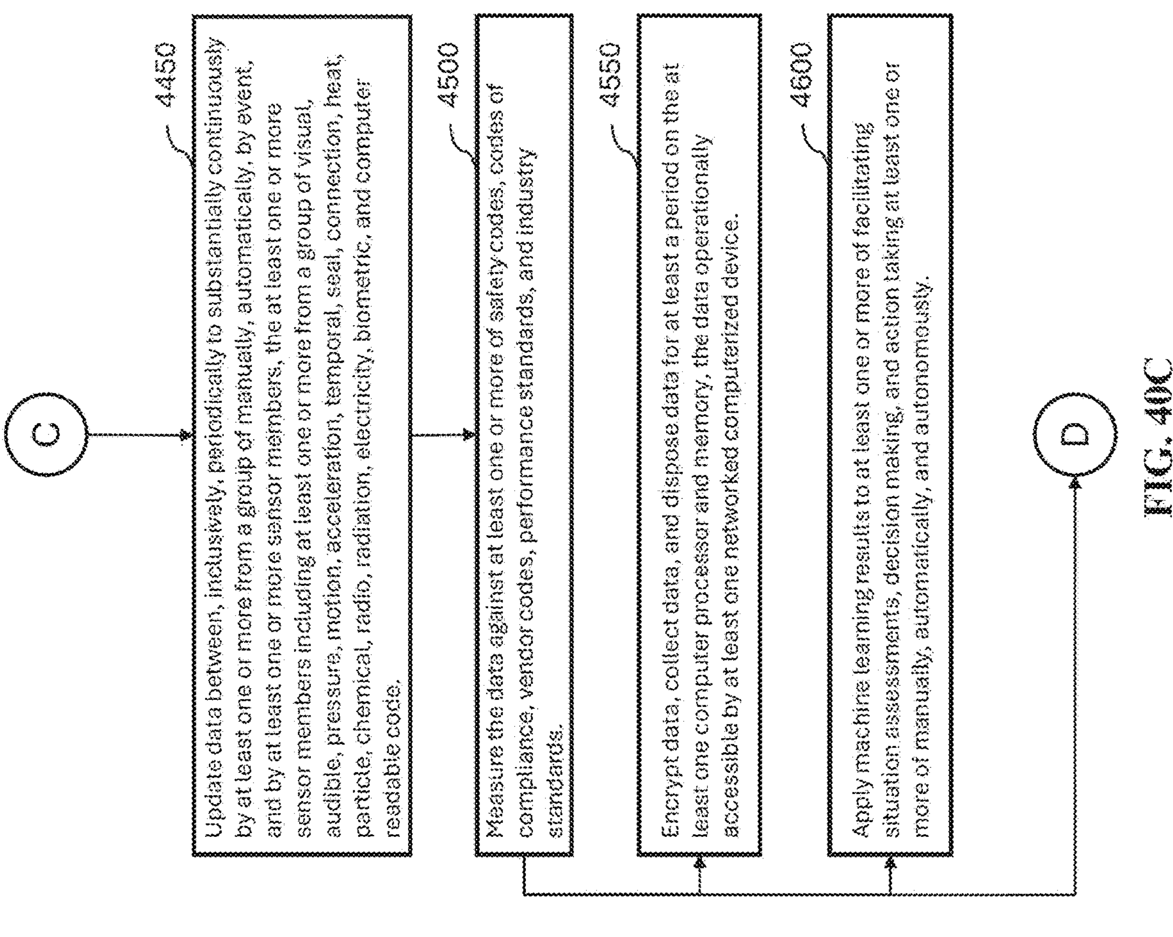
Figure 40D:
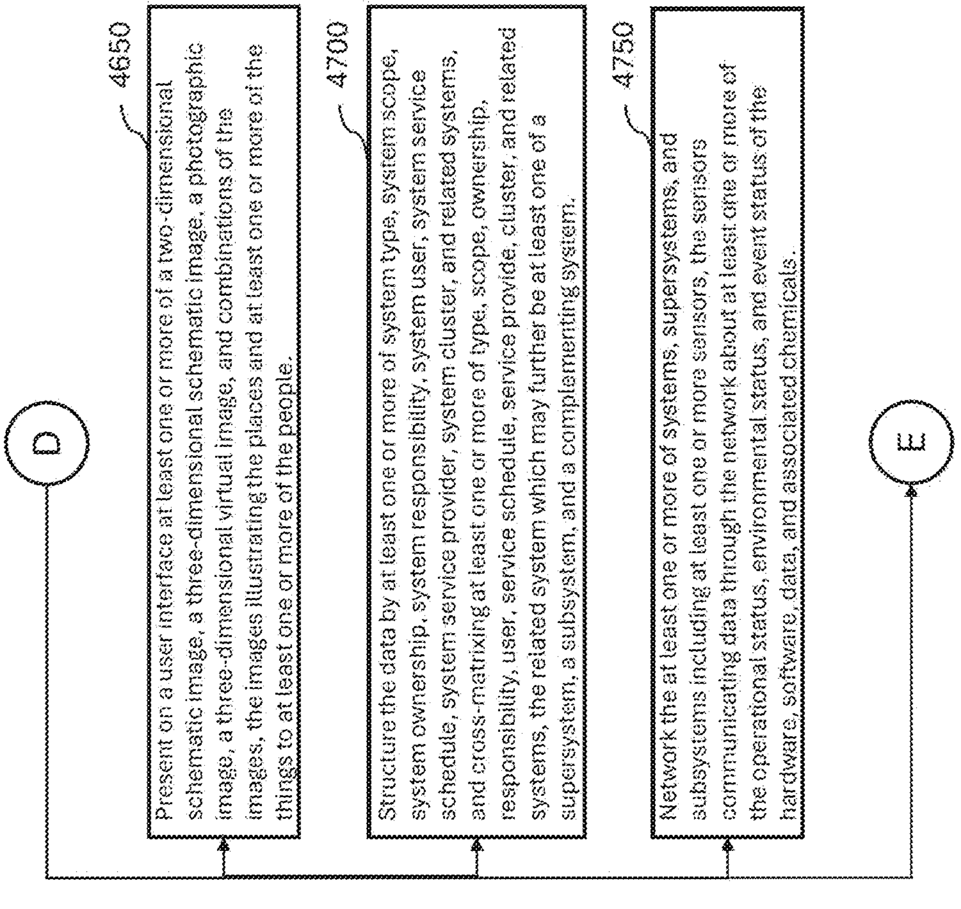
Figure 40E:
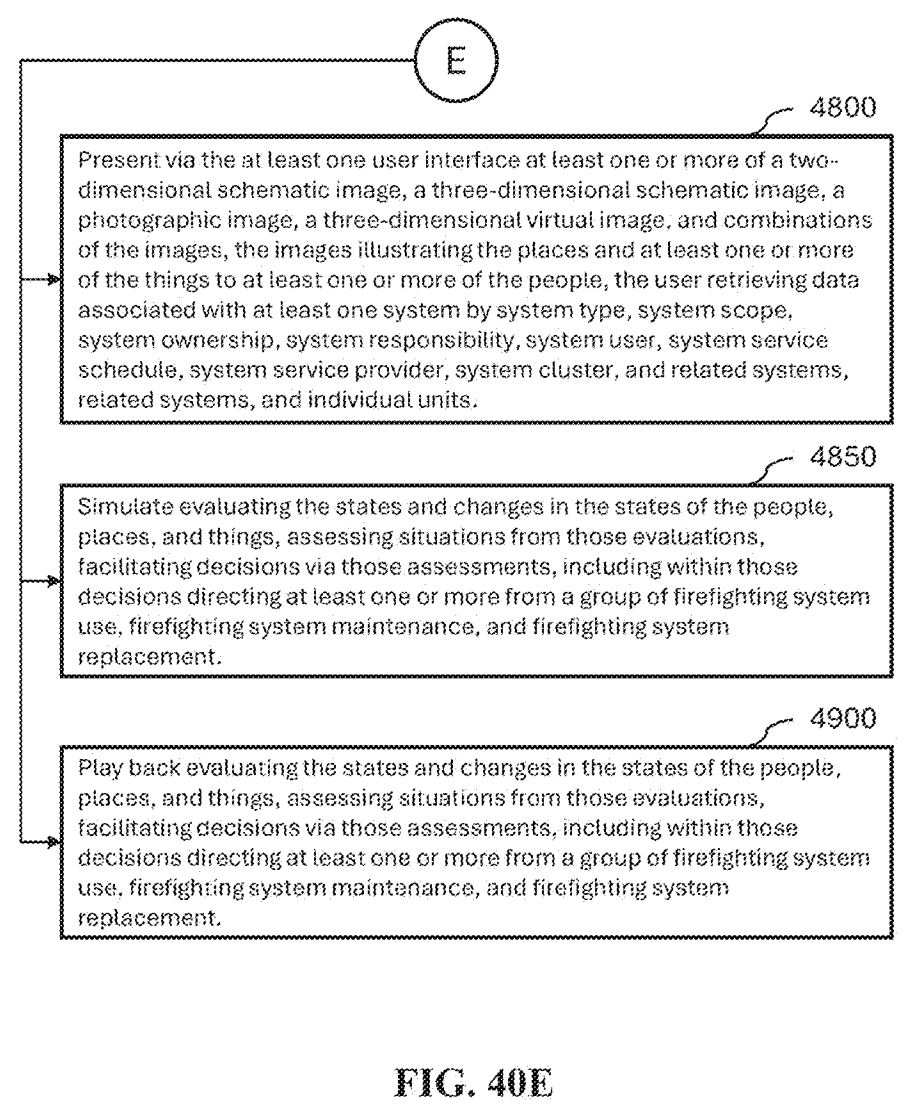

Important for the disclosed invention, as illustrated in FIGS. 37-40A-E is support of, as illustrated in FIG. 38, iterative decision cycles 3800 of assessment, decision, and action from a useful framework where, particularly in matters of firefighting and emergency response, the direction of users, and more specifically, users of the inventive concept, is to be able to proficiently make better decisions faster. A decision cycle 3800 may occur over several days or even years representing the cycle of installation, monitoring, and replacing a given tool or piece of firefighting equipment and may, at other times, occur in the split-second decisions made when fighting a fire, for example, finding the location of a working fire hydrant seconds faster than might otherwise have been possible without the inventive concept, allowing, therefore, water from that fire hydrant to be applied to a fire seconds to minutes earlier than otherwise. The inventive concept further allows decisions to be made earlier than otherwise by both raising the visibility to users of an area of operation, such as a building, and allowing users to make assessments and decisions while still enroute to that representative building. Better decisions made sooner and faster allow the sources of problems, such as fires, to be handled sooner than otherwise possible and, in some cases, prevented altogether.

In Internet of Things 3770 and machine learning 3760 embodiments of the inventive concept, users may further receive decision-support information where, rather than requiring users to conceive decisions from scratch, machine learning 3760 may present one or more options for the user to select or may remove the need for the user to make certain decisions so users can focus decision-making on those areas best suited for human judgements. Another structure for the decision cycle 3800 is observe, orient, decide, and act where the term observe is substantially synonymous with the term assess and where orient may also be termed as a framework, both orient and framework being at least one or more of structures, checklist, documents, and models to aid thinking that allow users to understand data they receive as needed to achieve an objective.

Further referring to the figures, FIG. 37 illustrates a representative embodiment of a system for firefighting and fire prevention of structures that includes at least one computer processor and memory system 3700 operationally accessible by at least one networked computerized device 3720, the at least one computer processor 3700 and at least one network computerized device 3720 which may involve downloading application programming 341 and may involve downloading other app programming. Networking may be enabled via wireless communication 3725, including, but not limited to, wi-fi, Bluetooth, and cellular service such as 5G. At least one database 3799 is accessible by the at least one computer processor 3700 designed to send and receive data collected on at least one or more from a group of: the users 3731, and places 3733, and tools 3735, the data further including datapoints from which to calculate qualities of the users 3731, places 3733, and tools 3735 from at least one or more from a group of: who, what, when, where, why, how, cost, power, environment, and event-conditions from which to calculate at least one or more of past, present, and projected-future states and rates of change of the users 3731, places 3733, and tools 3735. The illustrated at least one computer processer 3700 may include, but is not limited to, server computers 334. The illustrated places 3733, and tools 3735, may include, but are not limited to, organizations 332 and properties 333. Users 3731 in embodiments may include, but are not limited to, primary customers 500 and secondary customers 501, and substantially correspond with people 331 in the original disclosure. Places 3733 and tools 3735 in embodiments may include, but are not limited to, fire inspection/repair/service companies 335 and fire departments 336. The at least one database 3799, in this representative embodiment, is at least one or more of entirely or partly in the cloud 800. Some embodiments may store data on local servers.

The data concerning states is at least one or more of text-base, image based, numbers based, and graphically based and may also be presented audibly. Data generally refers to information, such as measurements and statistics, used for reasoning, discussion, and calculations, and applications 341, in representative embodiments, allow primary customers 500 and other users 3731 to collect, store, view, and access information from the central cloud database 800 and data which may, at least for a time, be stored locally.

The term user 3731 generally refers to human beings in general or considered collectively, and may, for the purpose of this disclosure, include a living asset working with users such as a dog, the dog extending the capabilities of the associated human beings. Users 3731, as will be discussed in added embodiments may include robotic systems that may be partly or completely autonomous, Users 3731 include at least one or more from a group of: firefighters, other emergency responders, maintenance technicians, fire inspectors, contractors, and facilities managers, including those aforementioned fire inspection/repair/service companies 335 and fire departments 336. Users 3731 may, in some embodiments, further include members of a business entity such as a corporation having facilities in which the inventive concept operates or a corporation that produces given tools 3735. Data about users 3731 may include, but is not limited to, customer resource management information such as name, address, organization, and district.

The term place 3733 generally refers to a particular position or point in space and may further be a location on or within a tool 3735. Places 3733 include at least one or more from a group of: installation facilities, supply facilities, vehicles, power generation, resource transmission, nexus of work, and points of control. Place 3733 may include city, property, building, floor, units, suites, and tenants.

Regarding qualities 3738, the term who generally refers to a person, people 331, and users 3731, though added is the possibility that a user 3731 could be a robot or robot-like system. The term what generally refers to an object or objects where an object may further be at least one or more of physical, virtual, and a concept. The term when generally refers to time. The term where generally refers to place where place may further be at least one or more of physical, virtual, and a concept. The term why generally refers to a reason. The term how generally refers to a condition. The term cost generally refers to an amount that would be paid. The term environment generally refers to surroundings or conditions. The term event-condition generally refers to an event part that specifies a signal that triggers an invocation of at least one rule, a condition part of that at least one rule that is a logical test that, if satisfied or evaluates to true, causes an action to be carried out, an action part that includes updates or invocations of data.

The term tool 3735 generally refers to an inanimate material object as distinct from a living sentient being. Tools 3735 in this disclosure include at least one or more systems, supersystems, and subsystems used at least one or more of for and in support of firefighting, fire prevention, fire detection, and alerting, a system including at least one or more of software, hardware, vehicles, data, and fire retarding chemicals. Tools 3735 may further include, but are not limited to, for tracking and identifying, equipment requiring compliance inspections such as fire sprinklers, standpipes, fire pumps, chemical suppression, extinguishers, trash chutes, fire doors, emergency lights, alarm systems, duct detectors, CO detectors, for auto notifications for non-compliant, past due, deficient, and out of service equipment. Tracking and notification process for compliance repairs incorporate fine procedures and progress tracking involving building representatives and maintenance contractors to populist progress reports and updated inspection documents and service company submission processes with standard-of-use documents for submissions. Such documents may be accessed by at least one or more users and may, for example, support inspections with multiple inspectors in different locations populating the same document and producing a report from the document. Supervisors, for example, may assign work areas and equipment for inspectors that include shared tools 3735 between different disciplines such as alarms and sprinklers, and users, 3731 will, therefore, see and share test results to avoid duplicate testing. Such adds efficiencies to compliance tracking, fund raising through fines, and can create backlogs for workloads justifying budgets and fire prevention man loading and are illustrated as frameworks and documents 3736.

The at least one computer processor and memory system 3700 is further networked to the at least one user interface 3710 wherein a user, inclusive of the aforementioned defined screens 10, 50, 60, 70, 80, 90, 91, 101, 120, 153, 154, and 155 and inclusive of the aforementioned defined customer 500, receives and can retrieve calculations of states of the users 3731, places 3733, and tools 3735 from which to assess situations, facilitate decision making, and take actions, the decisions and actions including at least one or more from a group of: firefighting system use, firefighting system maintenance, and firefighting system replacement, where at least one tool may be a system or part of a system, where action may be oriented toward achieving at least one objective, further supported by the associated frameworks and documents 3736.

FIG. 38 illustrates that assessment, decision, and action and how assessment, decision, and action are oriented may, as previously introduced, be termed the decision cycle 3800 where assessment is synonymous with observation. The term state generally refers to a particular condition that the given user 3731, place 3733, or tool 3735 is at a specific time and may include change, rates of change, and associated constants, such as the degradation of a given chemical over time, from which to make calculations.

One exemplary objective includes the dispatch of emergency vehicles to a fire where the computer 3700 processes situational data associated with the users 3731, places 3733, and tools 3735 to determine hazard response such as dispatching EMT vehicles, regular trucks, and specialty trucks—trucks with associated crews—at least one of the dispatched users 3731 receiving on the at least one user interface 3710 plans and situation information from which to assign crews and equipment and execute the plans. Vehicle members may have mobile fleet components 3736 that may be incorporated in analysis by the at least one computer processor and memory system 3700 so mobile fleet components may be further considered during a given decision cycle 3800. For an example of a mobile fleet component assessment, a given tool 3735, such as a fire hose, which may be available in a facility, may also be available on a truck where the tool 3735 disposed on the truck may be the most expedient to access in a given situation.

FIG. 37 further illustrates that in the at least one user interface 3710, in one embodiment, access portals 3740 are included, and further include, but are not limited to, a property management Web portal 3742, a fire prevention Web portal 3744, and a fire service Web portal 3746. In this representative embodiment, via an administrative tool, a service manager app 3745 with varied permissions is directed toward users 3731 such as service managers responsible for maintaining systems and another fire department site plan app 3743 is directed toward users 3731 such as firefighters who would employ the system. In this representative embodiment, further, a property management app 3741 is further directed toward users 3731 handling assessments, decisions, and actions involving properties.

The data is at least one or more of pushed to the at least one user 3731 and pulled by the at least one user 3731, pull meaning the user 3731 takes at least one action to receive data and push meaning the user 3731 receives data without having to have requested that data. The data is updated between, inclusively, periodically to substantially continuously by at least one or more from a group of: manually, automatically, by event, and by at least one or more sensor members 3750, the at least one or more sensor members 3750 including at least one or more from a group of: visual, audible, pressure, motion, acceleration, temporal, seal, connection, particle, chemical, radio, radiation, electricity, position, temperature, force, vibration, piezo, fluid property, humidity, biometric, global positioning, and computer readable code. The data is measured against assemblies of codes and standards 3737, including at least one or more of safety codes, codes of compliance, vendor codes, performance standards, and industry standards. Measuring data may occur during at least one or more of inspections and operations.

In one embodiment of the system for firefighting and fire prevention of structures, the collected data is recorded at least one or more of unencrypted, encrypted, encrypted with blockchain 3900, and encrypted with biometrics, the recorded data stored for at least a pre-defined period on the at least one computer processor and memory 3700, the data operationally accessible by at least one networked computerized device 3720.

Blockchain 3900 is a digital database containing information that can be simultaneously used and shared within a large, decentralized, publicly accessible network. As used herein, in some embodiments, the term blockchain may refer to one or more of a hash chain, a hash tree, a distributed database, and a distributed ledger that could present a cryptographically verifiable ledger. In some embodiments, blockchain may further refer to systems that use one or more of cryptography, private/public key encryption, proof standard, distributed timestamp server, and inventive schemes to regulate how new blocks may be added to the chain to use and maintain at least one or more systems, subsystems, and supersystems. For example, blockchain 3900 in some embodiments, when used operationally, may add new code to a hash chain whenever data indicates an event-condition. Any change received or recorded involving data may trigger adding code to a hash chain, creating a new branch on a hash tree, and other blockchain 3900 actions.

In one embodiment of the system for firefighting and fire prevention of structures, the data is processed by, as previously noted, machine learning 3760 to facilitate situation assessment, decision making, and action taking of at least one or more of manual, automatic, and autonomous operations. Machine learning 3760 involves the use and development of computer systems that can learn and adapt without following explicit instructions by using algorithms and statistical models to analyze and draw inferences from patterns in data. Machine learning algorithms may include, but are not limited to, decision trees, neural networks, Bayesian models, and genetic algorithms, and in some embodiments, may be derived from preset or partially preset libraries. Added are further applications of machine learning as will be discussed.

In one embodiment of the system for firefighting and fire prevention of structures, the at least one user interface 3710 presents at least one or more of a two-dimensional schematic image, a three-dimensional schematic image, a photographic image, a three-dimensional virtual image, a holographic image, a projected image, and combinations of the images, images that may include GPS and satellite images, the images designed to illustrate the places 3733 involved in a given operation and at least one or more of the tools 3735 to at least one or more of the users 3731. Images include both static images and representative motion created by sequences of at least two images.

A system generally refers to a set of tools 3735 working together as parts of a mechanism or an interconnecting network where the system may include users 3731 of the tools 3735 and may include the places 3733, and where operation of the system may further require data as disclosed herein. In one representative embodiment of the system for firefighting and fire prevention of structures, the data is structured by at least one or more of system type, system scope, system ownership, system responsibility, system user, system service schedule, system service provider, system cluster, and related systems, the related systems which may further be cross matrixed by at least one or more of type, scope, ownership, responsibility, user, service schedule, service provider, cluster, and related systems, the related systems which may further be at least one of a supersystem, a subsystem, and a complementing system. Machine learning 3760, in addition to assessing data, may assess organization of data and how data is categorized.

In one embodiment of the system for firefighting and fire prevention of structures, at least one or more of systems, supersystems, and subsystems are networked, and hardware includes the at least one or more sensor members 3750 designed to communicate data through the network about at least one or more of the operational status, environmental status, and event status of the hardware, software, vehicles, data, and associated chemicals. This embodiment may be or include elements of, as previously noted, the Internet of Things (IoT) 3770. IoT 3770 generally refers to the interconnection via the internet of computing devices embedded in tools 3735, enabling those tools to send and receive data.

In one embodiment of the system for firefighting and fire prevention of structures, the at least one user interface 3710 presents at least one or more of a two-dimensional schematic image, a three-dimensional schematic image, a photographic image, a three-dimensional virtual image, a holographic image, a projected image, and combinations of the images, the images designed to illustrate the places 3733 and at least one or more of the tools 3735 to at least one or more of the users 3731. The users 3731 may retrieve data associated with at least one system by system type, system scope, system ownership, system responsibility, system user, system service schedule, system service provider, system cluster, related systems, and individual units.

In one embodiment of the system for firefighting and fire prevention of structures, the states and changes in the states of the users 3731, places 3733, and tools 3735 from which to assess situations, facilitate decision making, and take actions—the decisions and actions including at least one or more from the group of: firefighting system use, firefighting system maintenance, and firefighting system replacement—are simulated via at least one simulator app 3790. Simulating may be used to test configurations and deployments of users 3731, places 3733, and tools 3735 in given scenarios and may be performed as a method. Simulations may also be used to test recommendations ahead of providing recommendations in real-time situations. Simulations are run on computers and are at least one or more of manually run, for example, users 3731 making decisions and computers simulating the results, and autonomously, for example, machine learning 3760 components of artificial intelligence testing decisions, actions, and evaluating results.

In one embodiment of the system for firefighting and fire prevention of structures, the states and changes in the states of the users 3731, places 3733, and tools 3735 from which to assess situations and facilitate decisions—the decisions including at least one or more from the group of: firefighting system use, firefighting system maintenance, and firefighting system replacement—are played back using at least one playback app 3792. Playing back may be used in such situations as performing after action reviews and may also be used to train users 3731 and train machine learning 3760.

One representative embodiment of the inventive concept includes virtual private networks 3795. This representative embodiment may include, but is not limited to, servers for development, staging, and production. Servers and databases may be structured in a variety of configurations in other embodiments of the inventive concept.

The term pertaining generally means to be appropriate, related, or applicable, further meaning the data is at least one or more of used for operations and is created by states pertaining to the associated users 3731, places 3733, and tools 3735.

FIGS. 40A-E illustrate that one representative embodiment of the inventive concept is a method for firefighting and fire prevention of structures that includes the step of 4000, accessing with at least one user interface the at least one application program 341 disposed on the at least one computer processor and memory system 3700 operationally accessible by at least one networked computerized device. The method further includes the step of 4050, sending and receiving data collected on at least one or more from the group of: users 3731, places 3733, and tools 3735, the at least one database 3799 accessible by the at least one computer processor 3700, the data collected on at least one or more from the group of: users 3731, places 3733, and tools 3735. The method further includes the step of 4100, at least one or more of determining and developing qualities 3738 of the users 3731, places 3733, and tools 3735 from at least one or more from the group of: who, what, when, where, why, how, cost, power, environment, and event-conditions from which to calculate at least one or more of the past, present, and projected-future states and rates of change of the users 3731, places 3733, and tools 3735.

FIGS. 40A-40E illustrate that the method further includes the step of 4150, sending and receiving data pertaining to at least one or more from the group of: firefighters, other emergency responders, maintenance technicians, fire inspectors, contractors, and facilities managers, the data recording past action and informing present and future actions. The method further includes the step of 4200, sending and receiving data pertaining to places 3733 including at least one or more from the group of: installation facilities, supply facilities, vehicles, power generation, resource transmission, nexus of work, and points of control. The method further includes the step of 4250, sending and receiving data pertaining to tools 3735 including at least one or more systems, supersystems, and subsystems used at least one or more of for and in support of firefighting, fire prevention, fire detection, and alerting, the system including at least one or more of software, hardware, vehicles, data, and fire retarding chemicals.

The method further includes the step of 4300, calculating from the data states of the users 3731, places 3733, and tools 3735 from which to assess situations, facilitate decision making, and take actions, the decisions and actions including at least one or more from the group of: firefighting system use, firefighting system maintenance, and firefighting system replacement. The method further includes the step of 4350, from the calculations of states, assessing, deciding, and acting on situations for at least one cycle of assessing, deciding and acting.

The method further includes the step of 4400, the at least one computer processor and memory system 3700 further networking to the at least one user interface 3710 wherein the user 3731 receives and can retrieve the data at least one or more of pushed to the at least one user 3731 and pulled by the at least one user 3731. The method further includes the step of 4450, the data updating between, inclusively, periodically to substantially continuously by at least one or more from the group of: manually, automatically, by event, and by at least one or more of the sensor members 3750, the at least one or more sensor members 3750 including at least one or more from the group of: visual, audible, pressure, motion, acceleration, temporal, seal, connection, heat, particle, chemical, radio, radiation, electricity, biometric, global positioning, and computer readable code. The method further includes the step of 4500, measuring the data against at least one or more of the safety codes, codes of compliance, vendor codes, performance standards, and industry standards.

The method may further include the step of 4550, encrypting data, collecting data, and disposing data for at least a pre-defined period on the at least one computer processor and memory 3700, the data operationally accessible by the at least one networked computerized device.

The method may further include the step of 4600, applying the machine learning 3760 results to at least one or more of facilitating situation assessments, decision making, and action taking at least one or more of manually, automatically, and autonomously.

The method may further include the step of 4650, presenting on the user interface 3710 at least one or more of a two-dimensional schematic image, a three-dimensional schematic image, a photographic image, a three-dimensional virtual image, a holographic image, a projected image, and combinations of the images, the images illustrating the places 3733 and at least one or more of the tools 3735 to at least one or more of the users 3731.

The method may further include the step of 4700, structuring the data by at least one or more of the system type, system scope, system ownership, system responsibility, system user, system service schedule, system service provider, system cluster, and related systems, and cross-matrixing at least one or more of type, scope, ownership, responsibility, user, service schedule, service provider, cluster, and related systems, the related systems which may further be at least one or more of a supersystem, a subsystem, and a complementing system.

The method may further include the step of 4750, networking the at least one or more of systems, supersystems, and subsystems including at least one or more of the operational sensors, the operational sensors communicating data through the network about at least one or more of the operational status, environmental status, and event status of the hardware, software, data, and associated chemicals.

The method may further include the step of 4800, the at least one user interface presenting at least one or more of a two-dimensional schematic image, a three-dimensional schematic image, a photographic image, a three-dimensional virtual image, a holographic image, a projected image, and combinations of the images, the images illustrating the places 3733 and at least one or more of the tools 3735 to at least one or more of the users 3731, the user retrieving data associated with the at least one system by system type, system scope, system ownership, system responsibility, system user, system service schedule, system service provider, system cluster, related systems, and individual units.

The method may further include the step of 4850, simulating evaluating the states and changes in the states of the users 3731, places 3733, and tools 3735, assessing situations from those evaluations, facilitating decisions via those assessments, including within those decisions directing at least one or more from the group of: firefighting system use, firefighting system maintenance, and firefighting system replacement. Simulations may be used both to test assessments, decisions, and actions on fictional operations and to improve actual operations by simulating how decisions will turn out before enacting those decisions.

The method may further include the step of 4900, playing back evaluating the states and changes in the states of the users 3731, places 3733, and tools 3735, assessing situations from those evaluations, facilitating decisions via those assessments, including within those decisions directing at least one or more from the group of: firefighting system use, firefighting system maintenance, and firefighting system replacement.

Figure 43:
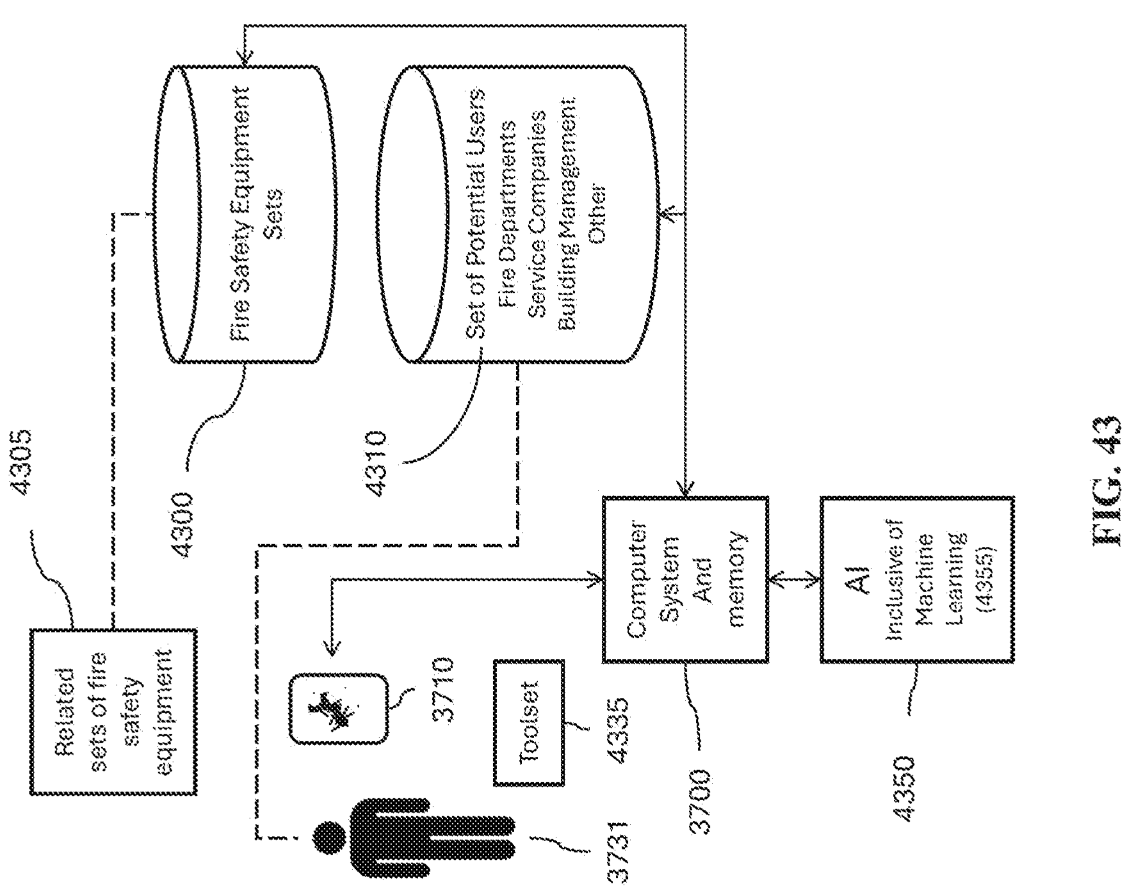
FIG. 43 illustrates components of the decision support system of FIG. 41.

Added is a decision-support system for documenting, monitoring, testing, inspecting, and maintaining fire safety equipment that has the at least one computer processor and memory system 3700 accessible by way of a computer network, where the term maintaining can broadly be assumed to include documenting, monitoring testing, inspecting, replacing, installing, and other such actions that ensure equipment is present and ready to perform its intended function, the at least one computer processor and memory system 3700 programmed to receive data, information, and analysis about the status of at least one set of fire safety equipment 4300, as illustrated in FIG. 43.

Fire safety equipment can include, but is not limited to:

1. Smoke Detectors:
    1. Ionization smoke detectors
    2. Photoelectric smoke detectors
    3. Combination smoke and carbon monoxide detectors
    4. Heat detectors
2. Fire Extinguishers:
    1. ABC dry chemical fire extinguishers
    2. CO2 (carbon dioxide) fire extinguishers
    3. Water-based fire extinguishers
    4. Foam fire extinguishers
    5. Clean agent fire extinguishers (e.g., Halon, Halotron)
3. Fire Alarm System:
    1. Control panel
    2. Manual pull stations
    3. Notification devices (horns, strobes)
    4. Sprinkler system
    5. Water flow alarms
    6. Monitoring equipment
4. Emergency Lighting:
    1. Exit signs
    2. Emergency lighting fixtures (battery-operated or generator-powered)
5. Fire Suppression Systems:
    1. Automatic sprinkler systems
    2. Clean agent suppression systems (e.g., FM-200, Novec 1230)
6. Fire Doors and Fire-Rated Materials:
    1. Fire-rated doors
    2. Fire-resistant walls, ceilings, and floors
    3. Fire dampers in HVAC systems
7. Fire Hose Reels and Cabinets:
    1. Fire hose reels
    2. Fire hose cabinets with hoses and nozzles
    3. Hose rack assemblies
8. Fire Blankets:
    1. Fire-resistant blankets for smothering small fires or wrapping around individuals during evacuation
9. Fire Escape Ladders:
    1. Portable or permanent fire escape ladders for use in multi-story buildings
10. Fireproof Storage Containers:
    1. Fireproof safes or cabinets for storing important documents, records, or valuables 11. Fire Safety Signage:
    1. Fire safety instructions
    2. Evacuation route maps
    3. Hazard warnings
12. Firefighter Gear and Personal Protective Equipment (PPE):
    1. Firefighter turnout gear (coats, pants, helmets, gloves)
    2. Self-contained breathing apparatus (SCBA)
    3. Fire-resistant clothing and gear for building occupants (if applicable)
13. Sprinkler systems:
    1. Control valves
    2. Drains
    3. Gauges
    4. Fire sprinkler heads
14. Chemical suppression systems:
    1. Tanks
    2. Actuators
    3. Nozzles
    4. Chemical type The added components of the disclosed invention further support the one or more decision cycles 3800 of assessment, decision, and action from a framework or viewpoint of maintaining fire safety equipment, viewpoint sometimes termed observe, orient, decide, and act. Decision cycles 3800 model how people and robotic or robotic-like systems make decisions on a continual cycle of acquiring data, deciding from data, acting on data, which creates new data and so on. Important continues to be a framework, viewpoint, or orientation for the decision cycle wherein the decision-support system can be designed to process data toward a goal such as saving money, increasing maintenance pace, providing margins of safety, and prioritizing limited resources, these through which to put data into context and set goals. For illustration, human and computer-based systems may choose as a goal to create the most cost-effective maintenance action possible within limits that ensure compliance with regulations. The spirit of the invention, therefore, is to focus more of a user's time and thought process, a user being a person, or in some instances robotics, doing the inspecting rather than performing ancillary tasks such as planning inspection routes, traveling to and from maintenance sites, traveling between serviced equipment, logging aspects of the servicing and more, given that the primary value sought by people deploying the disclosed invention is the actual fire safety equipment maintenance.

As illustrated in FIG. 38 of the representative OODA Loop 3800, the decision-support system, therefore, is designed to allow users to proficiently perform cycles of assessment, decision, and action related to fire safety equipment inspection at a superior pace by reducing the decision burden of the user and by improving the quality of decisions—often presented as observe, orient, decide, act loops or OODA Loops 3800. For illustration, rather than requiring a user to make decisions from scratch, such as selecting the best pathway for inspecting equipment, a decision likely to otherwise happen and depend on intuition, the decision support system can recommend or even dictate the best pathway as will be described where not only must a good pathway be selected, but that pathway should encompass the whole of fire safety equipment that could and should be inspected by the given user on the given maintenance action. Such can be a gradation of decision support ranging from offering recommendations up to a level where the entire decision burden is removed from users such as with automated or robotic maintenance systems. A user, for example, could be a drone that is fully autonomous or could be systems including a robot or could use fixed sensors or sensors that could be ascribed to the Internet of Things (IOT) 3770 that allows human users 3731 to engage with fire safety equipment remotely. But in its basic form, in one representative embodiment, the disclosed decision support system engages at least one human user 3731 from the at least one user interface 3710 such as a computer tablet while that human user 3731 is conducting maintenance of one or more pieces of fire safety equipment assigned to a maintenance action. Further, where robots may be involved, one person may work with many robots, meaning that while one robot is traveling or performing some other function, the person may be engaged with another robot.

OODA Loops 3800 for given cycles may be executed on time scales ranging from fractions of a second to years, and loops may be executed within other loops.

Figure 41:
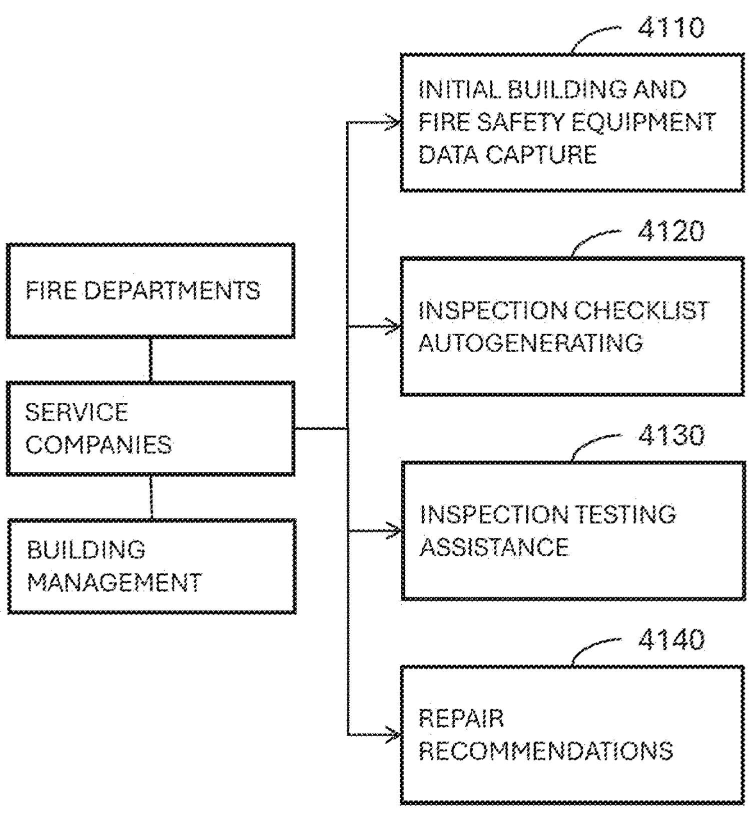
FIG. 41 illustrates categories of decision cycle loops for the maintenance of fire safety equipment.

FIG. 41 illustrates that one representative decision cycle loop includes initial building and fire safety equipment data capture 4110. This representative loop processes basic building information and prompts a series of data capture actions (including, but not limited to, photo, video, audio files, and GPS pins) by a fire service user to ensure data accuracy and depth. This representative loop also parses data to populate a building profile dashboard at a level of accuracy high enough as necessary for Fire Inspection and Fire Emergency teams to complete respective maintenance tasks, and from this representative loop can be built a three-dimensional spatial map of properties, equipment locations, and equipment statuses (including relationships with one another). Illustrations are presented in FIGS. 22 through 28. Sought benefits include 1) reducing user input error and 2) the depth and accuracy of data, which fuels other components of the whole Fire Safety Equipment Management System that can be made accessible for users.

FIG. 41 further illustrates that another representative decision cycle loop includes pre-inspection checklist auto-generating 4120. This representative loop assesses building information, fire safety equipment status, and national and local fire safety regulations to signal to an inspection provider, fire service company, and building management when an inspection is due, which equipment needs to be tested or replaced, and estimated costs associated with known replacements and likely repairs or replacements (based on national and regional equipment, building, and usage data). Important sought benefits include 1) increased accuracy and predictability of fire safety budgets for building management; 2) increased inspection efficiencies for inspection providers; and 3) improved preparations and service by fire service companies (now capable of having all required and likely equipment on hand before arriving at the building).

FIG. 41 further illustrates that another representative decision cycle loop includes inspection testing assistance 4130. This representative loop prompts user testing actions, to conduct tests (inclusive of using visual or audio data, depending on the equipment being tested), to assess equipment performance, to prompt re-tests or additional data capture as needed, and to assign a pass or fail grade to each piece of equipment based on the performance and appearance of the equipment. Important sought benefits include consistency and accuracy of fire safety equipment and systems testing, as well as how the data collected prompts a Repair Recommendation loop 4140 and adds to the data set helping determine the likelihood of equipment failures. Further, the majority of the repairs recommended may be required by code and must be completed to receive certifications from service companies.

FIG. 41 further illustrates that another representative decision cycle loop includes the repair recommendations 4140. This representative loop diagnoses and repairs fire safety equipment that has failed testing or inspections. Using visual or performance data, this loop prompts 1) a path of repairs; 2) additional user testing actions such as needed to pinpoint failures, and 3) a course of repair or replacement, including potential replacement equipment on hand that meets or exceeds regulations. Finally, this loop generates a detailed report of failures, repairs, and replacements, as well as future actions (follow-ups, maintenance, testing)—all of which update the main Fire safety equipment Management System database and feed back into future inspection and maintenance prompts. Important sought benefits are the ability to conduct inspections and repairs in the minimum number of visits, thereby strengthening the continuity of regulation-compliant fire safety systems. Recommended repairs are usually items that service companies cannot enforce. Therefore, this information will notify fire departments for follow up and enforcement. Certifications may be added in some embodiments, to include digital verification such as blockchain to digitally validate results, observations, and maintenance work performed.

The disclosed invention discusses users 3731, and users 3731 are entities, typically people but possibly also robots such as an autonomous ground vehicle autonomously inspecting fire safety equipment or being at least partly remotely operated by a person. Users 3731 most likely would be among building managers, fire departments, and maintenance companies.

The at least one computer processor and memory system 3700—which may be central server based or a distributed architecture—is designed to create from the at least one set of fire safety equipment 4300, as illustrated in FIG. 43, at least one related set of fire safety equipment 4305 on which will be conducted at least one maintenance action wherein there is at least one or more of a material, temporal, spatial, risk, skillset, and responsibility elements for maintaining the fire safety equipment in the at least one related set of fire safety equipment 4305. A set is a collection or grouping of distinct objects, such as fire safety equipment, which are called elements or members of the set. These objects can be anything—numbers, letters, symbols, or even other sets—and include in this disclosure fire safety equipment from at least one set of fire safety equipment 4300 that may be related somehow as units, elements, or members into a related set of fire safety equipment 4305. A related set of fire safety equipment 4305 that is associated with at least one set of fire safety equipment 4300 has at least one member from that set of fire safety equipment 4300, but all members of the related set of fire safety equipment 4305 are not necessarily from that set of fire safety equipment 4300 as a related set of fire safety equipment 4305 may be derived from more than one set of fire safety equipment 4300.

As will be further detailed, units, elements, members of a set are assembled into that set for a maintenance action. For illustration, the disclosed system might from a set of fire safety equipment 4300, create a related set of fire safety equipment 4305 wherein the members are all fire extinguishers, and the maintenance action is to inspect all the fire extinguishers that are members of that related set of fire safety equipment 4305. Alternatively, the disclosed system might create from a set of fire safety equipment 4300, a related set of fire safety equipment 4305 wherein the members are all the fire safety equipment contained within one building where the maintenance action is to inspect all the fire safety equipment of that building. Alternatively, the disclosed system might create, from a set of fire safety equipment 4300, a related set of fire safety equipment 4305 wherein the members are all the fire safety equipment produced by one manufacturer within a building complex where the maintenance action is to inspect all the fire safety equipment produced by that manufacturer. Alternatively, the disclosed system might from a set of fire safety equipment 4300, create a related set of fire safety equipment 4305 wherein the members are all the fire safety equipment due for inspection or replacement during a given inspection cycle where the maintenance action is to inspect all the fire safety equipment due on that timeline. The disclosed system is designed to allow the assembly of sets of fire safety equipment 4300 and related sets of fire safety equipment 4305 on demand and in accord with given maintenance routines.

The defining characteristic of a set is that it consists of well-defined, distinguishable members. Further, a set member may be an individual element such as a fire extinguisher, or a set member may be a category of elements such as all the fire extinguishers in a related set that includes, for illustration, equipment designed to suppress fire. As such, sets of fire safety equipment may be defined by other common terms such as sets, subsets, supersets, set unions, set intersections, set compliments, families of sets, disjointed sets, and by which other terms may be used to express members and elements of a set. Such sets may be denoted, to continue with the fire extinguisher example, by such notation as F={F1, F2, F3, F4, . . . Fn}. Sets, therefore, are groupings of fire safety equipment that make sense for the maintenance actions that will take place or, conversely, that will define the maintenance actions that should take place.

Each of the at least one related set of fire safety equipment 4305 includes the fire safety equipment that at least one user 3731 from a set of at least one user 4310 will—or is intended to—service on one maintenance action as would be assigned or compiled by that at least one user 3731. For illustration, a maintenance organization may have one, two, or more people assigned to a maintenance task termed here as a user though the maintenance action is being carried out by more than one individual. A set may have only one member and may have many members, or even no members—for instance, a building that has no fire extinguishers but will, after the maintenance action, have fire extinguishers installed—and the disclosed system looks at a maintenance action to include members of a related set of fire safety equipment 4305 where the goal is for at least one user 3731 to perform required maintenance actions on all the members assigned to that related set of fire safety equipment 4305. Where such is impossible or practical, therefore, then more than one related set of fire safety equipment 4305 may be constructed and, therefore, more than one maintenance action may be undertaken each by at least one user 3731 from the set of at least one user 4310. In this way, all fire safety equipment in a set of fire safety equipment 4300 may be inspected but as one or more members of related sets of fire safety equipment 4305.

The location of each equipment element of the at least one set of fire safety equipment 4300 and the at least one related set of fire safety equipment 4305 is determined by at least one or more of Global Positioning Data, a sensor, a coordinate, and a map. The at least one computer processor and memory system 3700 is further designed to create from each related set of fire safety equipment 4305, as illustrated in FIGS. 42A and 42B, at least one substantially Hamiltonian path 4200 to each equipment element of the at least one related set of fire safety equipment 4305 wherein the at least one substantially Hamiltonian path 4200 is recommended to the at least one user 3731 from the set of at least one user 4310.

Figure 42A:
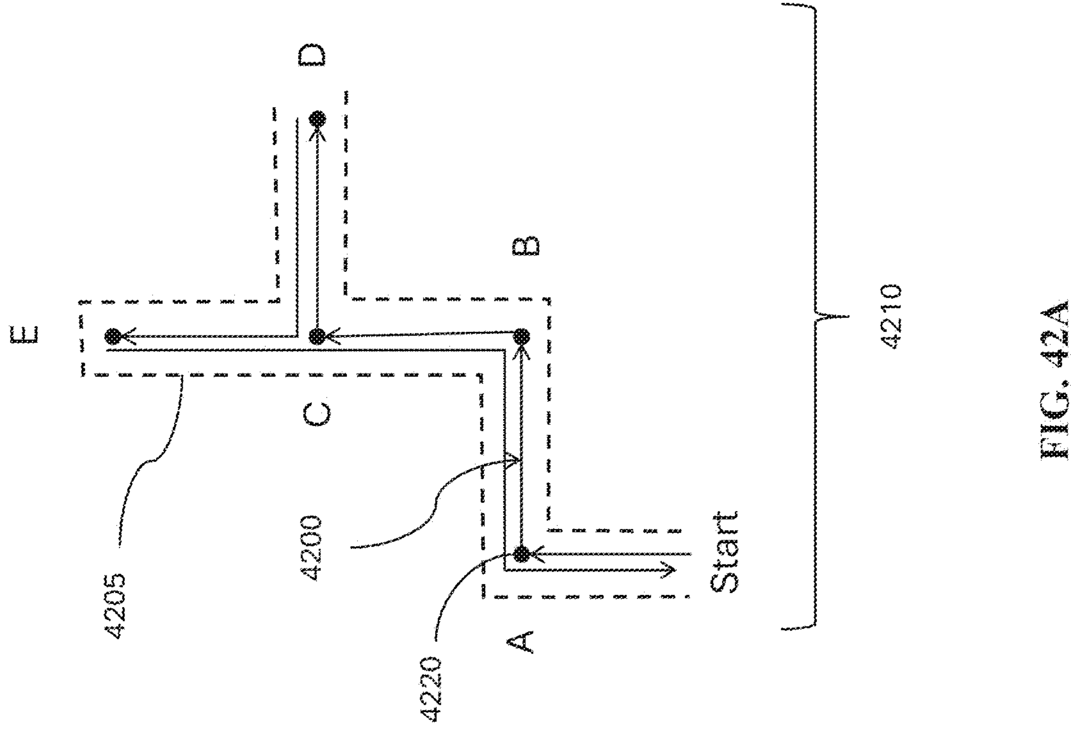
FIGS. 42A-42B illustrate a representative Hamiltonian path between elements fire safety equipment.
Figure 42B:
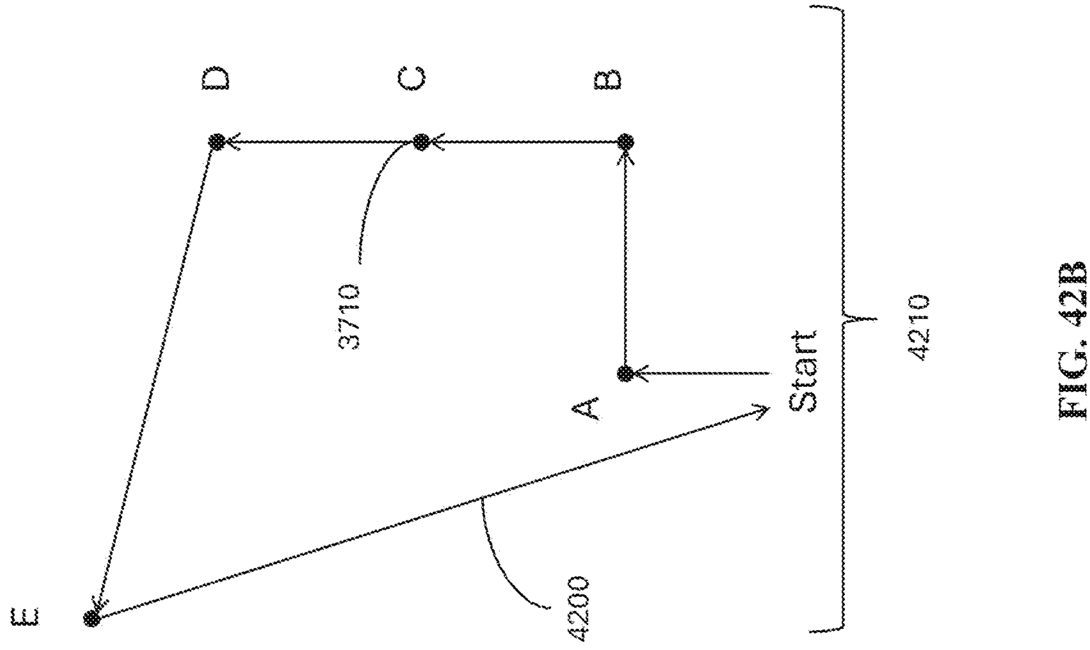

As further illustrated in FIGS. 42A-42B, the Hamiltonian path 4200 is a traversal of a graphable zone 4210 wherein each member of a related set of fire safety equipment 4305 may be considered a vertex 4220, represented in FIGS. 42-42B, as a representative illustration of a Hamiltonian path, by the letters A, B, C, D, and E, and that the path leads the at least one user 3731 on visits to each vertex 4220 for a given maintenance action once, with no repeated vertices, and covers all vertices of the graph. In other words, it is a path in a graph that passes through every vertex 4220 exactly once. It is from the Hamiltonian path 4200 that a best path can be calculated oriented on some goal by the disclosed invention such as fastest, safest, easiest, or by what other measures may be defined and which the inventive concept is permitted to take selected exceptions to a pure Hamiltonian path 4200 where a set member may be visited more than once if a maintenance action calls for a repeat visit. In such instances, the set member might be represented as more than one vertex, and so, stays true to the Hamiltonian path 4200 definition. Further, the Hamiltonian path 4200 as used in claims could be partial in the sense that it need not necessarily be a closed loop within the map or area displaying the fire safety equipment, or that loop may be said not to close until a user returns all the way to a vehicle, desk, or even a home base from where that user departed to conduct the maintenance action, even where the best path may be calculated or have calculations applied incorporating only the vertexes representing the actual fire safety equipment of the related set of fire safety equipment 4305.

FIGS. 42A and 42B further illustrate the representative Hamiltonian path 4200 for inspecting fire safety equipment in a building with branched hallways 4205. Although FIG. 42A may appear to the eye as a tree structure, it is important to understand that from the perspective of the computer system and memory 3700, the paths down and back from hallways 4205 can be as if the hallways 4205 were a direct path as in FIG. 42B. The computer system and memory 3700 is designed to also linearize three-dimensional pathways as might be present in a building having multiple floors and is designed to weigh heavier those pathways that involve changing floors to favor maintenance actions that go floor to floor in most, but not all, instances.

A problem with calculating the best Hamiltonian path 4200 is that as the number of members in a related set increase, there may be an exponential number of possible Hamiltonian paths 4200 connecting the vertices denoted by the related set members, and exhaustive search algorithms may become impractical. There is no known polynomial-time algorithm that can solve all instances of the problem. This complexity arises from the need to consider all possible permutations of vertices to find the optimal solution.

As such, the goal when calculating the best Hamiltonian path 4200 in the disclosed system including when calculated by artificial intelligence 4350, is the best path calculated within constraints given to the analysis program where the path is good enough if not the absolute best possible. Such are the limitations on which embodiments of the disclosed invention operate. For illustration, the likely best path to fire safety equipment is a straight-forward loop from one side of a building to its far end and back by way of the other side of the building, and so, calculations of Hamiltonian paths 4200 can be limited to only those paths starting and ending with the fire safety equipment closest to the user's start point and with vertexes midway on the loop being at the far length of the building. Such would be a version of imposing an order on at least some initial and end-point fire safety equipment safety stops to reduce or eliminate unnecessary or redundant calculations and time exploring what by simple observation could never be the best path. Programming techniques such as dynamic programming, branch and bound, and heuristic methods such as genetic algorithms and simulated annealing are used in some embodiments to reduce the best path search space. Some properties, such as those illustrated by creating representative straight paths in FIG. 42B, may be reconfigured to improve the efficiency of algorithms for finding Hamiltonian paths 4200. Calculations in some embodiments further combine local optima rather than global optima for the given related set, meaning, for illustration, more than one Hamiltonian path 4200 may be calculated, one for several subsets of a related set of fire safety equipment 4305, and then another Hamiltonian path 4200 may be calculated between the subsets of the related set of fire safety equipment 4305 where the subset as a whole represents a vertex or where a non-Hamiltonian best path is calculated through the subset, such as a best linear path.

In some embodiments, other limitations may be included on calculations, none of which are exclusive from calculation methods discussed, such as allowing calculations to be time-constrained, meaning, for illustration, the disclosed invention providing the best Hamiltonian path 4200 it is able to derive after calculating for an allowed period of calculation time or from an allowed engagement of computer processing power. Machine learning may further derive approaches and may aid in accepting nuances of calculations, such as, for the purposes of inspection quality, deciding that the best start point may be the maintenance action that is hardest to perform or that may have the greatest level of uncertainties about success where it may be beneficial to get the hardest task done first rather than focus on the shortest physical traveling path. In any case, certain conditions imposed and impossible allow calculation quantity and time for Hamiltonian paths 4200 to be rendered, in all embodiments, as good enough approximations of the best possible path if not the best possible path.

Embodiments may include other algorithms designed to find near-best-path solutions rather than an exact one due to the computational complexity of the problem. Some of these algorithms include, but are not limited to:

Nearest Neighbor Algorithm: This algorithm starts at an arbitrary vertex and repeatedly selects the nearest unvisited vertex until all vertices have been visited, forming a Hamiltonian cycle.

Christofides Algorithm: Originally designed for the Traveling Salesman Problem (TSP), this algorithm can also be adapted for Hamiltonian pathways. It first constructs a minimum spanning tree (MST) of the graph and then finds a minimum-weight perfect matching of the odd-degree vertices. The Hamiltonian cycle approximation is then formed by traversing the MST and the matching.

Genetic Algorithms (GAs): GAs are optimization algorithms inspired by the process of natural selection, maintaining a population of candidate solutions, and iteratively applying genetic operators such as crossover and mutation to generate new solutions. Fitness functions are used to evaluate the quality of solutions, guiding the search towards better solutions over time, and results from one maintenance action may be used to train future maintenance actions.

Ant Colony Optimization (ACO): ACO is inspired by the foraging behavior of ants. In the context of Hamiltonian pathways, ants construct solutions by iteratively selecting edges based on pheromone trails and heuristic information. Pheromone levels are updated based on the quality of solutions, allowing the algorithm to converge towards promising paths.

Simulated Annealing: Simulated Annealing is a probabilistic optimization technique inspired by the annealing process in metallurgy. It starts with an initial solution and iteratively explores neighboring solutions, accepting worse solutions with a certain probability that decreases over time. This allows the algorithm to escape local optima and explore a wider solution space.

Tabu Search: Tabu Search is a metaheuristic algorithm that iteratively explores the neighborhood of the current solution while avoiding revisiting previously visited solutions (tabu list). It uses a combination of aspiration criteria and diversification strategies to guide the search toward better solutions.

These algorithms may be explored with artificial intelligence 4350 and associated machine learning which may select the best or best combination of algorithms to achieve a substantially Hamiltonian path which, again, may be a best approximation of the best possible path and where the Hamiltonian path may be near Hamiltonian if not exactly Hamiltonian but that will include all the members of a related set of fire safety equipment. Further, prior to running an algorithm to approximate a Hamiltonian solution, other algorithms such as Dijkstra, which finds the shortest linear paths between vertexes, and which can be run to include all vertexes representing a related set of fire safety equipment may be run against maps, coordinates, or GPS indications of the location of each member of fire safety equipment of the related set of fire equipment to confirm that a Hamiltonian path or close approximation thereof exists. Dijkstra's algorithm is defined here as a graph traversal algorithm used to find the shortest path from a starting node to all other nodes in a weighted graph, weighting including distance but also, in embodiments, including other weights such as safety or weighting the priority of maintenance tasks to be performed. Dijkstra or like algorithms operate by iteratively exploring nodes in the graph, starting from an initial vertex (node) and moving outward to neighboring nodes. At each step, when deployed in the disclosed invention, a Dijkstra or comparable algorithm selects the vertex with the smallest tentative distance (physical but also other weights in other embodiments) from the initial vertex and updates the distances to its neighbors accordingly.

The at least one computer processor and memory system 3700 is designed to present to each the at least one user 3731 from the set of at least one user 4310 the at least one related set of fire safety equipment 4305, the location of each equipment element of the at least one related set of fire safety equipment 4305, the at least one Hamiltonian path 4200 to each equipment element, the required maintenance action for each equipment element of the at least one related set of fire safety equipment, and maintenance toolsets 4335 from the tools 3735 to perform the required maintenance action. For illustration, a given user tasked and equipped to inspect fire hydrant lines might receive on a tablet—user interface 3710—a map that includes as its related set of fire safety equipment 4305 all the fire hydrant inspection points for a building complex along with a Hamiltonian path 4200 that efficiently takes that user to each inspection point, the maintenance action considered complete when all members of this illustrated related set of fire safety equipment 4305 have been visited and maintenance undertaken.

For completeness, the Hamiltonian path 4200 may include or be virtual such as where a maintenance action may be conducted remotely. A given user may travel an entire pathway without physically moving. Where the pathway is virtual, other values than physical distance and location may be used to define the pathway such as the comparative importance or difficulty of the maintenance action or such measures as making the best use of a more skilled or more expensive user 3731, all such variables which may also factor into best paths when physical distance and location are a part of pathway calculations. Further, for maintenance actions that may be computer-assisted or performed without human intervention, or may involve more than one user, vertexes may, on the timeline of the maintenance action, be visited and acted upon simultaneously. The goal simply is that all members of the related set are appropriately visited by what way maintenance can be performed and according to one of more goals such as speed, cost-effectiveness, and at least one aspect of quality of work performed.

FIG. 43 illustrates components of the decision support system. In some embodiments of the decision-support system for documenting, monitoring, testing, inspecting, and maintaining fire safety equipment, the at least one user interface 3710 presents at least one or more of a two-dimensional schematic image, a three-dimensional schematic image, a photographic image, a three-dimensional virtual image, and combinations of the images, the images designed to illustrate the places and at least one or more of the maintenance toolsets 4335 to at least one or more of the at least one set of fire safety equipment 4300 and the at least one related set of fire safety equipment 4305.

In some embodiments of the decision-support system for documenting, monitoring, testing, inspecting, and maintaining fire safety equipment, the location of the at least one user 3731 from the set of at least one user 4310 is monitored as the at least one user 3731 from the set of at least one user 4310 inspects the at least one related set of fire safety equipment 4305. This embodiment includes physical visitations of fire safety equipment and can include remote visitation and is to monitor, by physical location or a computer-based tag such as a login I.D. or user I.D., that the at least one user 3731 has visited the set member and performed the required maintenance task.

In some embodiments of the decision-support system for documenting, monitoring, testing, inspecting, and maintaining fire safety equipment, the at least one set of fire safety equipment 4300 and the at least one related set of fire safety equipment 4305 is determined by at least one or more of equipment type, equipment scope, equipment ownership, equipment responsibility, equipment user, equipment service schedule, equipment service provider, equipment cluster, related equipment, and the location of each piece of equipment. These are representative illustrations of how sets of fire safety equipment and related sets of fire safety equipment 4305 may be assembled for a given maintenance action. In some embodiments of the decision-support system for documenting, monitoring, testing, inspecting, and maintaining fire safety equipment, at least one or more sensor on at least one or more element of fire safety equipment permits at least one or more of self-maintenance and at least partially remote maintenance. Herein data is constructed and analyzed wherein certain goals may be achieved such as to assemble related sets of fire safety equipment 4300 to minimize the number of visits from organizations that may charge for each the visit irrespective of the work performed. For illustration, where a related set of fire safety equipment 4305 may be constructed for fire safety equipment that requires a similar skillset to maintain, such as smoke sensors and heat sensors, a maintenance action may be coordinated so it is handled by one user on one visit instead of on multiple visits possibly by different organizations. Further to this goal, maintenance actions may be simulated wherein machine learning can experiment with the many different sets and related sets that may be formed.

In some embodiments of the decision-support system for documenting, monitoring, testing, inspecting, and maintaining fire safety equipment, data for each the at least one user 3731 from the set of at least one user 4310 is designed to be collected and recorded, the recorded data stored for at least a pre-defined period on the at least one computer processor and memory and operationally accessible by at least one networked computerized device. In some embodiments of the decision-support system for documenting, monitoring, testing, inspecting, and maintaining fire safety equipment, at least one or more of material, temporal, spatial, risk, skillset, and responsibility elements are used to create each of the at least one related set of fire safety equipment 4305. In some embodiments of the decision-support system for documenting, monitoring, testing, inspecting, data is designed to be collected as data vectors wherein the data vector components can be categorized by at least one or more of a material, temporal, spatial, risk, skillset, and responsibility quality. For illustration, a fire extinguisher might have values associated with what it materially is, model type, retardant contained, and so on. The fire extinguisher may have temporal values such as the time of last inspection. It may have spatial values such as its location coordinates. It might have risk values such as the probability it will be in working order. Such can be quantified or in any sense given a numerical designator as at least one or more of a value and an identity.

A vector variable, therefore, may have many numerical components which may also have components and so be a multidimensional matrix. A vector can be defined as an array, list, or matrix of numerical values representing features or data points. Vectors are fundamental data structures used to represent both input data and model parameters in machine learning algorithms and other artificial intelligence algorithms. More specifically, a vector in machine learning is often represented as a one-dimensional array, where each element corresponds to a specific feature or attribute of the data. For illustration, one value of a vector might be associated with maintenance cycles, and so might be related with other vectors, for further illustration, those maintenance cycles that align or could be made to align in present or future related sets. In mathematical terms, a vector in machine learning can be denoted as—to continue with the set illustration of $F=\{F1, F2, F3, F4, \ldots Fn\}$—vector F, where Fn might have a vector $Fn=[x1, x2, \ldots xn]$ where x1, x2, and so on may further be columns of values such as might pertain, for illustration, values associated with material information, spatial information, temporal information, risk information, skillset information, responsibility information, and other information, added further that risk information, but not only risk information, may include probability values.

Vectors are adapted for representing data instances, performing mathematical operations, and building models in machine learning by which the disclosed invention creates related sets of fire safety equipment 4305 from sets of fire safety equipment 4300, and assigns at least one user 3731 from a set of at least one user 4310 to maintenance actions associated with the related sets of fire safety equipment 4305. The vectors enable algorithms to process and analyze large datasets efficiently, making them a fundamental concept in the field, and create the Hamiltonian paths 4200 pertaining to the related sets of fire safety equipment 4305. Further, the disclosed invention as designed can operate with incomplete information given the adaptability of sets and vectors to null sets. For illustration, a maintenance action may be conducted where fire extinguishers of unknown origin or service dates may obtain values for a future maintenance action during a present maintenance action when the at least one user 3731, upon conducting that maintenance action, inputs their origin or service dates.

In some embodiments of the decision-support system for documenting, monitoring, testing, inspecting, and maintaining fire safety equipment, at least one or more of the at least one related set of fire safety equipment 4305 is at least partly determined by at least one artificial intelligence program 4350, the artificial intelligence program 4350 further comprising at least one or more of machine learning, natural language processing, graphing algorithms, and set algorithms from which to combine one or more at least one related set of fire safety equipment 4305 from at least one set of fire safety equipment 4300, at least one user 3731 from the set of at least one user 4310, and at least one substantially Hamiltonian path 4200 oriented toward at least one or more of at least one goal based on maintenance speed, cost-effectiveness, maintenance quality, prioritization of resources, and other such outcomes.

In some embodiments of the decision-support system for documenting, monitoring, testing, inspecting, and maintaining fire safety equipment supported by the artificial intelligence program 4350, data is designed to be collected as the aforementioned data vectors wherein the data vector components can be categorized by at least one or more of the material, temporal, spatial, risk, skillset, and responsibility quality. In some embodiments of the decision-support system for documenting, monitoring, testing, inspecting, and maintaining fire safety equipment supported by the artificial intelligence program 4350, the at least one or more of the material, temporal, spatial, risk, skillset, and responsibility quality are used by the artificial intelligence program 4350 to create the at least one related set of fire safety equipment 4305.

As noted, different types of machine learning algorithms 4355 may be used, particularly as it relates to the substantially Hamiltonian path 4200 problem that underpins how given maintenance actions will take place. Further included is supervised learning, unsupervised learning, and reinforced learning, but preferred embodiments, where artificial intelligence is used, include evolutionary algorithms designed to explore large spaces and find approximate solutions and heuristic or metaheuristic algorithms designed to be rules-based and to find near-best solutions where calculations required to find the best solutions may be prohibitive to resource constraints such as time and computer processing power.

In some embodiments of the decision-support system for documenting, monitoring, testing, inspecting, and maintaining fire safety equipment supported by the artificial intelligence program 4350, at least one user interface presents at least one or more of the two-dimensional schematic image, the three-dimensional schematic image, the photographic image, the three-dimensional virtual image, and combinations of the images, the images designed to illustrate the places and at least one or more of the maintenance toolsets 4335 to service at least one or more of the at least one set of fire safety equipment 4300 and the at least one related set of fire safety equipment 4305.

In some embodiments of the decision-support system for documenting, monitoring, testing, inspecting, and maintaining fire safety equipment supported by the artificial intelligence program 4350, the location of the at least one user 3731 from the set of at least one user 4310 is monitored as the at least one user 3731 from the set of at least one user 4310 inspects or services the at least one related set of fire safety equipment 4305.

In some embodiments of the decision-support system for documenting, monitoring, testing, inspecting, and maintaining fire safety equipment supported by the artificial intelligence program 4350, the at least one set of fire safety equipment 4300 and the at least one related set of fire safety equipment 4305 is determined by the at least one or more of equipment type, equipment scope, equipment ownership, equipment responsibility, equipment user, equipment service schedule, equipment service provider, equipment cluster, related equipment, and the location of each piece of equipment.

In some embodiments of the decision-support system for documenting, monitoring, testing, inspecting, and maintaining fire safety equipment supported by the artificial intelligence program 4350, at least one or more sensor on at least one or more element of fire safety equipment permits at least one or more of self-maintenance and at least partially remote maintenance.

In some embodiments of the decision-support system for documenting, monitoring, testing, inspecting, and maintaining fire safety equipment supported by the artificial intelligence program 4350, data on each maintenance cycle for each the at least one user 3731 from the set of at least one user 4310 is designed to be collected and recorded, the recorded data stored for at least the period on the at least one computer processor and memory 3700 and is operationally accessible by at least one networked computerized device.

Figure 44B:
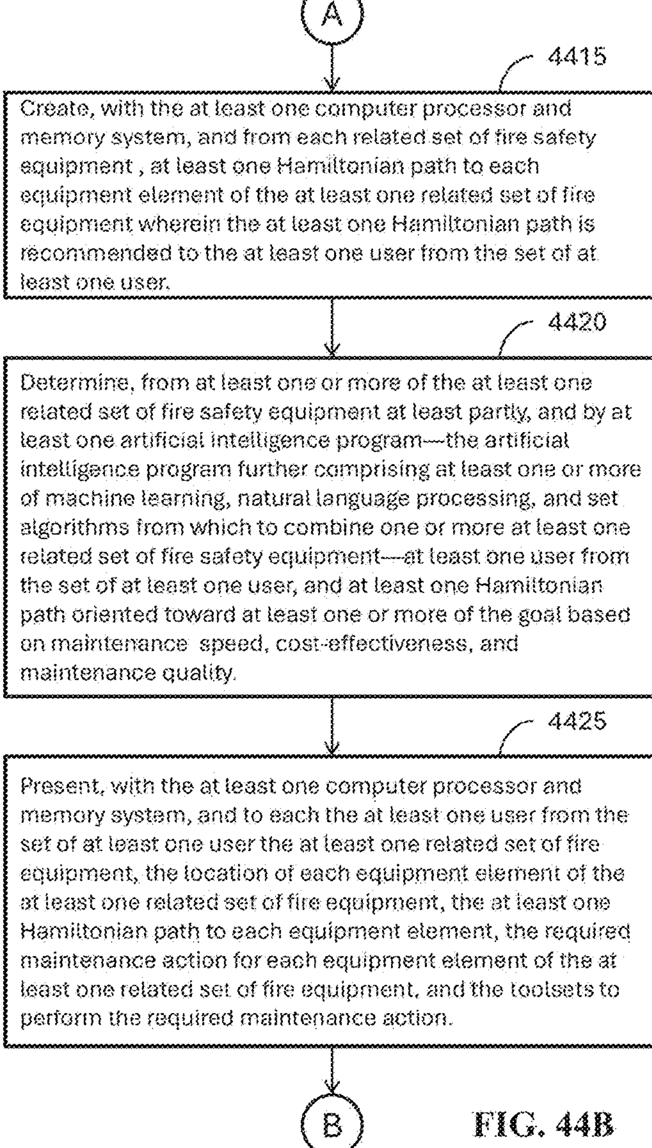
Figure 44C:
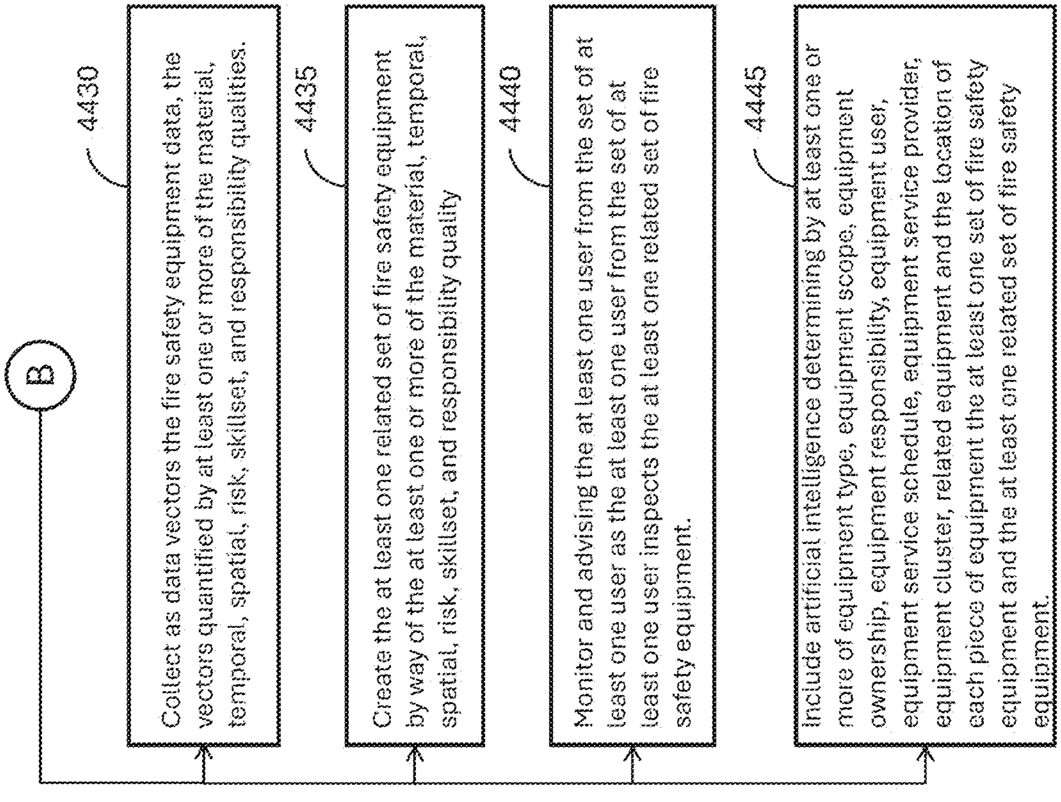

Referring now to FIGS. 44A-44C, a decision-support method for documenting, monitoring, testing, inspecting, and maintaining fire safety equipment includes the step of 4400, accessing the at least one computer processor and memory system 3700 accessible by way of the computer network and receiving data, information, and analysis about the status of the at least one set of fire safety equipment 4300. The method includes the step 4405, of creating, with the at least one computer processor and memory system 3700, and from the at least one set of fire safety equipment 4300, the at least one related set of fire safety equipment 4305 wherein there is at least one or more of the material, temporal, spatial, risk, skillset, and responsibility elements for maintaining the fire safety equipment in the at least one related set of fire safety equipment 4305, wherein each of the at least one related set of fire safety equipment 4305 includes the fire safety equipment that at least one user 3731 from the set of at least one user 4310 will maintain on one maintenance action. The method includes the step of 4410, determining the location of each equipment element of the at least one set of fire safety equipment 4300 and the at least one related set of fire safety equipment 4305 by way of the at least one or more of Global Positioning Data, sensors, and maps. The method includes the step of 4415, creating, with the at least one computer processor and memory system 3700, and from each related set of fire safety equipment 4305, at least one substantially Hamiltonian path 4200 to each equipment element of the at least one related set of fire safety equipment 4305 wherein the at least one substantially Hamiltonian path 4200 is recommended to the at least one user 3731 from the set of at least one user 4310.

The method includes the step of 4420, determining, from at least one or more of the at least one related set of fire safety equipment 4305 at least partly, and by at least one artificial intelligence program 4350—the artificial intelligence program 4350 further comprising at least one or more of machine learning, natural language processing, graphing algorithms, and set algorithms from which to combine one or more of the at least one related set of fire safety equipment 4305—at least one user 3731 from the set of at least one user 4310, and at least one substantially Hamiltonian path 4200 oriented toward at least one or more of the at least one goal based on maintenance speed, cost-effectiveness, and maintenance quality. The method includes the step of 4425, presenting, with the at least one computer processor and memory system 3700, and to each the at least one user 3731 from the set of at least one user 4310 the at least one related set of fire safety equipment 4305, the location of each equipment element of the at least one related set of fire safety equipment 4305, the at least one substantially Hamiltonian path 4200 to each equipment element, the required maintenance action for each equipment element of the at least one related set of fire safety equipment 4305, and the maintenance toolsets 4335 to perform the required maintenance action.

The method may include the step of 4430, collecting as data vectors the fire safety equipment data, the vectors quantified by at least one or more of the material, temporal, spatial, risk, skillset, and responsibility qualities.

The method may include the step of 4435, creating the at least one related set of fire safety equipment 4305 by way of the at least one or more of the material, temporal, spatial, risk, skillset, and responsibility quality.

The method may include the step of 4440, monitoring and advising the at least one user 3731 from the set of at least one user 4310 as the at least one user 3731 from the set of at least one user 4310 inspects the at least one related set of fire safety equipment 4305.

The method may include the step of 4445, including artificial intelligence determining by at least one or more of equipment type, equipment scope, equipment ownership, equipment responsibility, equipment user, equipment service schedule, equipment service provider, equipment cluster, related equipment, and the location of each piece of equipment the at least one set of fire safety equipment 4300 and the at least one related set of fire safety equipment 4305.

The following patents are incorporated by reference in their entirety: U.S. Pat. Nos. 5,950,150A, 8,311,510B2, 8,311,510B2, 9,478,121B2, 9,672,486B2, 9,767,679B2, 10,166,421B2, 10,831,167B2, 10,885,771B2, 11,169,678B2, 11,232,702B2, US20080084291A1, US20090183123A1, US20120320058A1, US20170104823A1, US20210223767A1, WO2009105603, CN209248719U.

While the inventive concept has been described above in terms of specific embodiments, it is to be understood that the inventive concept is not limited to these disclosed embodiments. Upon reading the teachings of this disclosure many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A decision-support system for documenting, monitoring, testing, inspecting, and maintaining fire safety equipment comprising:

at least one computer processor and memory system accessible by way of a computer network, the at least one computer processor and memory system programmed to receive data, information, and analysis about the status of at least one set of fire safety equipment;

at least one user interface operatively coupled to the at least one computer processor and memory system;

the at least one computer processor and memory system adapted to create from the at least one set of fire safety equipment at least one related set of fire safety equipment wherein there is at least one or more of a material, temporal, spatial, risk, skillset, and responsibility element for maintaining fire safety equipment in at least one related set of fire safety equipment;

wherein each of the at least one related set of fire safety equipment includes fire safety equipment that at least one user from a set of at least one user;

wherein a location of each equipment element of the at least one set of fire safety equipment and the at least one related set of fire safety equipment is determined by at least one or more of Global Positioning Data, a sensor, a coordinate, and a map;

wherein the at least one computer processor and memory system is further adapted to create from each related set of fire safety equipment at least one substantially Hamiltonian path to each equipment element of the at least one related set of fire safety equipment wherein the at least one substantially Hamiltonian path is recommended to the at least one user from the set of at least one user; and wherein the at least one computer processor and memory system is adapted to provide to each the at least one user from the set of at least one user the at least one related set of fire safety equipment, the location of each equipment element of the at least one related set of fire safety equipment, the at least one substantially Hamiltonian path to each equipment element, the required maintenance action for each equipment element of the at least one related set of fire safety equipment, and maintenance toolsets to perform required maintenance actions.

2. The decision-support system for documenting, monitoring, testing, inspecting, and maintaining fire safety equipment of claim 1 wherein the at least one user interface presents at least one or more of a two-dimensional schematic image, a three-dimensional schematic image, a photographic image, a three-dimensional virtual image, and combinations of the images, the images adapted to illustrate places and at least one or more of the maintenance toolsets to at least one or more of the at least one set of fire safety equipment and the at least one related set of fire safety equipment.

3. The decision-support system for documenting, monitoring, testing, inspecting, and maintaining fire safety equipment of claim 1 wherein the location of the at least one user from the set of at least one user is monitored as the at least one user from the set of at least one user inspects the at least one related set of fire safety equipment.

4. The decision-support system for documenting, monitoring, testing, inspecting, and maintaining fire safety equipment of claim 1 wherein the at least one set of fire safety equipment and the at least one related set of fire safety equipment is determined by at least one or more of equipment type, equipment scope, equipment ownership, equipment responsibility, equipment user, equipment service schedule, equipment service provider, equipment cluster, related equipment, and the location of each piece of equipment.

5. The decision-support system for documenting, monitoring, testing, inspecting, and maintaining fire safety equipment of claim 1 wherein at least one or more sensor on at least one or more element of fire safety equipment permits at least one or more of self-maintenance and at least partially remote maintenance.

6. The decision-support system for documenting, monitoring, testing, inspecting, and maintaining fire safety equipment of claim 1 wherein data for each the at least one user from the set of at least one user is adapted to be collected and recorded, the recorded data stored for at least a pre-defined period on the at least one computer processor and memory and operationally accessible by at least one networked computerized device.

7. The decision-support system for documenting, monitoring, testing, inspecting, and maintaining fire safety equipment of claim 1 wherein at least one or more of material, temporal, spatial, risk, skillset, and responsibility elements are used to create each the at least one related set of fire safety equipment from the at least one set of fire safety equipment.

8. A decision-support system for documenting, monitoring, testing, inspecting, and maintaining fire safety equipment comprising:

at least one computer processor and memory system accessible by way of a computer network, the at least one computer processor and memory system programmed to receive data, information, and analysis about the status of at least one set of fire safety equipment;

at least one user interface operatively coupled to the at least one computer processor and memory system;

the at least one computer processor and memory system adapted to create from the at least one set of fire safety equipment at least one related set of fire safety equipment wherein there is at least one or more of a material, temporal, spatial, risk, skillset, and responsibility element for maintaining fire safety equipment in the at least one related set of fire safety equipment;

wherein each of the at least one related set of fire safety equipment includes fire safety equipment that at least one user from a set of at least one user will maintain on one maintenance action;

wherein a location of each equipment element of the at least one set of fire safety equipment and the at least one related set of fire safety equipment is determined by at least one or more of Global Positioning Data, a sensor, a coordinate, and a map;

wherein the at least one computer processor and memory system is further adapted to create from each related set of fire safety equipment at least one substantially Hamiltonian path to each equipment element of the at least one related set of fire safety equipment wherein the at least one substantially Hamiltonian path is recommended to the at least one user from the set of at least one user;

at least one or more of the at least one related set of fire safety equipment at least partly determined by at least one artificial intelligence program, the artificial intelligence program further comprising at least one or more of machine learning, natural language processing, graphing algorithms, and set algorithms from which to combine one or more at least one related set of fire safety equipment from at least one set of fire safety equipment, at least one user from a set of at least one users, and at least one substantially Hamiltonian path oriented toward at least one or more of a goal based on maintenance speed, cost-effectiveness, and maintenance quality; and wherein the at least one computer processor and memory system is adapted to provide to each at least one user from the set of at least one user the at least one related set of fire safety equipment, the location of each equipment element of the at least one related set of fire safety equipment, the at least one substantially Hamiltonian path to each equipment element of the related set of fire safety equipment, the required maintenance action for each equipment element of the at least one related set of fire safety equipment, and maintenance toolsets to perform required maintenance actions.

9. The decision-support system for documenting, monitoring, testing, inspecting, and maintaining fire safety equipment of claim 8 wherein data is adapted to be collected as data vectors wherein the data vector components can be categorized by at least one or more of a material, temporal, spatial, risk, skillset, and responsibility quality.

10. The decision-support system for documenting, monitoring, testing, inspecting, and maintaining fire safety equipment of claim 9 wherein the at least one or more of a material, temporal, spatial, risk, skillset, and responsibility quality are used by the at least one artificial intelligence program to create the at least one related set of fire safety equipment.

11. The decision-support system for documenting, monitoring, testing, inspecting, and maintaining fire safety equipment of claim 8 wherein at least one user interface presents at least one or more of a two-dimensional schematic image, a three-dimensional schematic image, a photographic image, a three-dimensional virtual image, and combinations of the images, the images adapted to illustrate the places and at least one or more of the maintenance toolsets to at least one or more of the at least one set of fire safety equipment and the at least one related set of fire safety equipment.

12. The decision-support system for documenting, monitoring, testing, inspecting, and maintaining fire safety equipment of claim 8 wherein the location of the at least one user from the set of at least one user is monitored as the at least one user from the set of at least one user inspects the at least one related set of fire safety equipment.

13. The decision-support system for documenting, monitoring, testing, inspecting, and maintaining fire safety equipment of claim 8 wherein the at least one set of fire safety equipment and the at least one related set of fire safety equipment is determined by at least one or more of equipment type, equipment scope, equipment ownership, equipment responsibility, equipment user, equipment service schedule, equipment service provider, equipment cluster, related equipment, and the location of each piece of equipment.

14. The decision-support system for documenting, monitoring, testing, inspecting, and maintaining fire safety equipment of claim 8 wherein at least one or more sensor on at least one or more element of fire safety equipment permits at least one or more of self-maintenance and at least partially remote maintenance.

15. The decision-support system for documenting, monitoring, testing, inspecting, and maintaining fire safety equipment of claim 8 wherein data on each maintenance cycle for each the at least one user from the set of at least one user is adapted to be collected and recorded, the recorded data stored for at least a pre-defined period on the at least one computer processor and memory and operationally accessible by at least one networked computerized device.

16. A decision-support method for documenting, monitoring, testing, inspecting, and maintaining fire safety equipment comprising:

accessing at least one computer processor and memory system accessible by way of a computer network and receiving data, information, and analysis about the status of at least one set of fire safety equipment;

creating, with the at least one computer processor and memory system, and from the at least one set of fire safety equipment, at least one related set of fire safety equipment wherein there is at least one or more of a material, temporal, spatial, risk, skillset, and responsibility element for maintaining fire safety equipment in the at least one related set of fire safety equipment, wherein each of the at least one related set of fire safety equipment includes fire safety equipment that at least one user from a set of at least one users will maintain on one maintenance action;

determining a location of each equipment element of the at least one set of fire safety equipment and the at least one related set of fire safety equipment by way of at least one or more of Global Positioning Data, a sensor, a coordinate, and a map;

creating, with the at least one computer processor and memory system, and from each related set of fire safety equipment, at least one substantially Hamiltonian path to each equipment element of the at least one related set of fire safety equipment wherein the at least one substantially Hamiltonian path is recommended to the at least one user from the set of at least one user;

determining, from at least one or more of the at least one related set of fire safety equipment at least partly, and by at least one artificial intelligence program, at least one user from a set of at least one users, and at least one substantially Hamiltonian path oriented toward at least one or more of a goal based on maintenance speed, cost-effectiveness, and maintenance quality, the artificial intelligence program further comprising at least one or more of machine learning, natural language processing, graphing algorithms, and set algorithms from which to combine one or more at least one related set of fire safety equipment; and presenting, with the at least one computer processor and memory system, and to each at least one user from the set of at least one user the at least one related set of fire safety equipment, the location of each equipment element of the at least one related set of fire safety equipment, the at least one substantially Hamiltonian path to each equipment element, the required maintenance action for each equipment element of the at least one related set of fire safety equipment, and maintenance toolsets to perform required maintenance actions.

17. The decision-support method for documenting, monitoring, testing, inspecting, and maintaining fire safety equipment of claim 16 further including collecting as data vectors the fire safety equipment data, the data vectors quantified by at least one or more of a material, temporal, spatial, risk, skillset, and responsibility qualities.

18. The decision-support method for documenting, monitoring, testing, inspecting, and maintaining fire safety equipment of claim 17 further including creating the at least one related set of fire safety equipment by way of the at least one or more of a material, temporal, spatial, risk, skillset, and responsibility quality.

19. The decision-support method for documenting, monitoring, testing, inspecting, and maintaining fire safety equipment of claim 16 further including monitoring and advising the at least one user from the set of at least one user as the at least one user from the set of at least one user inspects the at least one related set of fire safety equipment.

20. The decision-support method for documenting, monitoring, testing, inspecting, and maintaining fire safety equipment of claim 16 further including artificial intelligence determining by at least one or more of equipment type, equipment scope, equipment ownership, equipment responsibility, equipment user, equipment service schedule, equipment service provider, equipment cluster, related equipment, and the location of each piece of equipment the at least one set of fire safety equipment and the at least one related set of fire safety equipment.

* * * * *